United States Patent [19]
Carr et al.

[11] Patent Number: 5,430,362
[45] Date of Patent: Jul. 4, 1995

[54] ENGINE STARTING SYSTEM UTILIZING MULTIPLE CONTROLLED ACCELERATION RATES

[75] Inventors: Kenneth R. Carr, Redmond, Wash.; Gregory I. Rozman, Rockford, Ill.; Albert L. Markunas, Roscoe, Ill.; Michael J. Hanson, Loves Park, Ill.; Leland E. Weber, Rockford, Ill.; James A. Shippling, Erie, Pa.; Malcolm J. McArthur, Escondido, Calif.; Vijay K. Maddali; Paul E. Nuechterlein, both of Rockford, Ill.; Alexander Cook, Belvidere, Ill.; Vietson Nguyen; Mario R. Rinaldi, both of Rockford, Ill.

[73] Assignee: Sundstrand Corporation, Rockford, Ill.

[21] Appl. No.: 63,166

[22] Filed: May 12, 1993

[51] Int. Cl.[6] .................................. H02P 1/46
[52] U.S. Cl. ................................ 318/779; 318/139
[58] Field of Search ............ 318/1, 6, 8, 778, 779, 318/270, 139; 378/842-844

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,772,802 | 9/1988 | Glennon et al. | 290/31 |
| 4,808,903 | 2/1989 | Matsui et al. | 318/800 |
| 4,831,510 | 5/1989 | Dummermuth et al. | 318/603 X |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |

(List continued on next page.)

FOREIGN PATENT DOCUMENTS 2206751 1/1989 United Kingdom .

OTHER PUBLICATIONS

Liang et al., "d-q Analysis of a Variable Speed Doubly AC Excited Reluctance Motor", Electric Machines and Power Systems, 19:125-138, Hemisphere Publishing Corporation 1991.

(List continued on next page.)

*Primary Examiner*—William M. Shoop, Jr.
*Assistant Examiner*—Brian Sircus
*Attorney, Agent, or Firm*—Jeffery J. Makeever

[57] ABSTRACT

A control for operating an electromagnetic machine in a starting mode of operation wherein the main armature winding of the machine receives electrical power from a controllable power source during the starting mode of operation, comprises a circuit for detecting a magnitude of a parameter of power applied to the main armature winding relative to a stationary frame of reference, a position sensor for detecting rotor position of the electromagnetic machine, a converter responsive to angular position indication for converting the detected parameter magnitude into field and torque producing components relative to a rotating frame of reference, and a circuit responsive to the field and torque producing components for controlling the power source during operation in the starting mode. This control includes an igniter for igniting a prime mover. Further, the control is operable during a first phase prior to ignition of the prime mover for causing the electromagnetic machine to provide motive power to the prime mover so as to accelerate the prime mover at a first predetermined rate, is operable during a second phase subsequent to the first phase so as to accelerate the prime mover at a second predetermined rate, is operable during this second phase for providing fuel to the prime mover to facilitate ignition thereof, and is operable during a third phase subsequent to the ignition of the prime mover so as to accelerate the prime mover at a third predetermined rate to a self-sustaining speed.

20 Claims, 45 Drawing Sheets

U.S. PATENT DOCUMENTS

| | | | |
|---|---|---|---|
| 4,933,623 | 6/1990 | Fox | 322/25 |
| 4,935,686 | 6/1990 | Stacey | 318/801 |
| 4,937,508 | 6/1990 | Rozman | 318/254 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |
| 5,029,263 | 7/1991 | Rozman | 318/714 |
| 5,040,366 | 8/1991 | Schulze | 60/39.08 |
| 5,047,699 | 9/1991 | Rozman | 318/254 |
| 5,051,670 | 9/1991 | De Piola | 318/434 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,110,264 | 5/1992 | Murry | 417/45 |
| 5,113,125 | 5/1992 | Stacey | 318/721 |
| 5,123,239 | 6/1992 | Rodgers | 60/39.02 |
| 5,132,604 | 7/1992 | Shimane et al. | 322/10 |
| 5,140,245 | 8/1992 | Stacey | 318/723 |
| 5,170,108 | 12/1992 | Peterson et al. | 318/469 |
| 5,202,616 | 4/1993 | Peters et al. | 318/254 |
| 5,283,471 | 2/1994 | Radd | 290/46 |
| 5,298,838 | 3/1994 | Peters et al. | 318/138 |
| 5,309,081 | 5/1994 | Shah et al. | 322/10 |
| 5,319,289 | 6/1994 | Austin et al. | 318/254 |

OTHER PUBLICATIONS

E. Iizuka, et al., *IEEE Transactions on Industry Applications*, vol. 1A–21, No. 4, May/Jun. 1985.

Furuhashi, et al., *IEEE Transactions on Industrial Electronics*, vol. 39, No. 2, Apr. 1992.

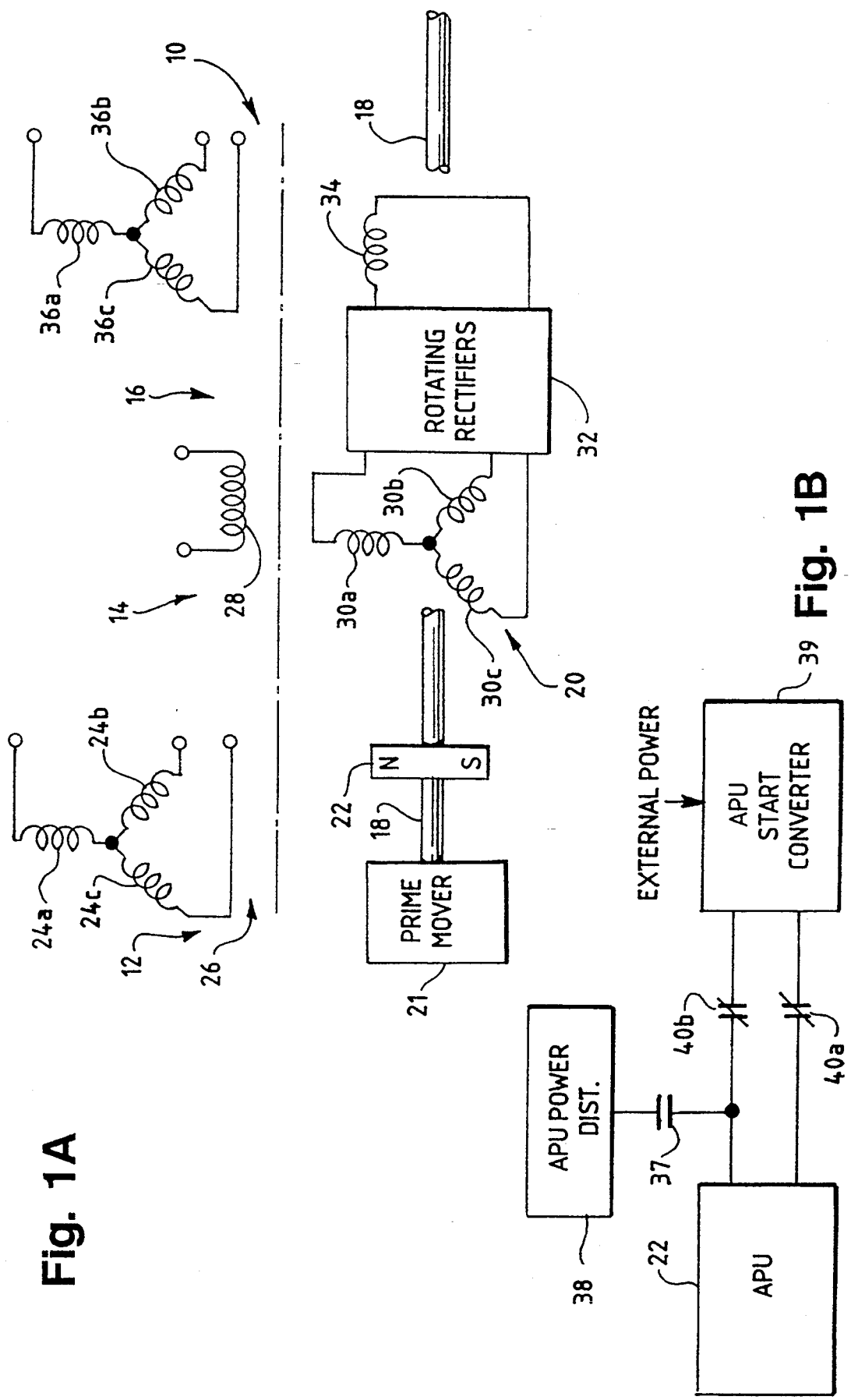

| COUNT | STATE | T1 | T2 | T3 | T4 | T5 | T6 |
|---|---|---|---|---|---|---|---|
| 0 | ST1 | 1 | 0 | 0 | 0 | 0 | 1 |
| 1 | ST2 | 1 | 1 | 0 | 0 | 0 | 0 |
| 2 | ST3 | 0 | 1 | 1 | 0 | 0 | 0 |
| 3 | ST4 | 0 | 0 | 1 | 1 | 0 | 0 |
| 4 | ST5 | 0 | 0 | 0 | 1 | 1 | 0 |
| 5 | ST6 | 0 | 0 | 0 | 0 | 1 | 1 |

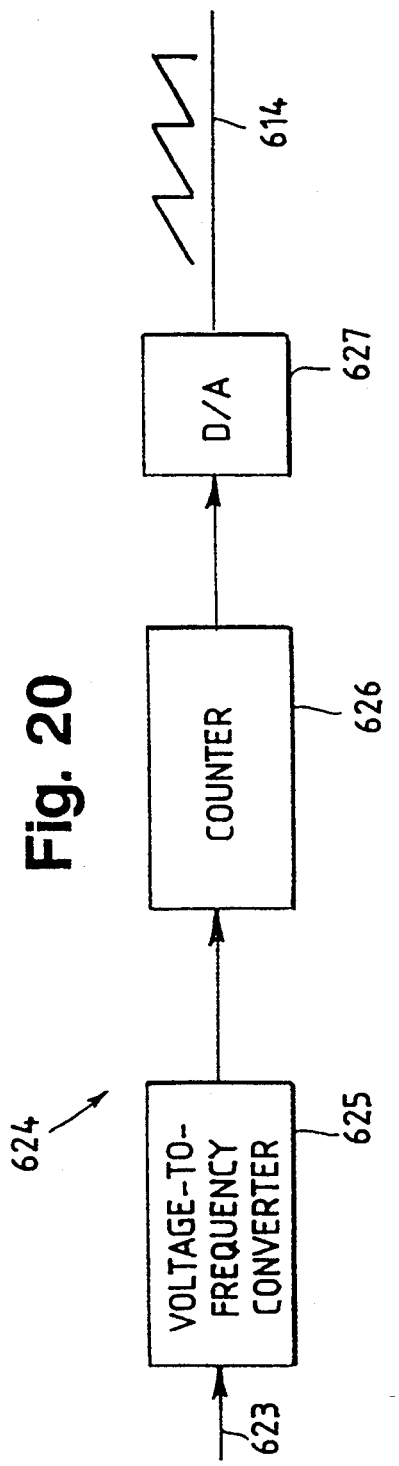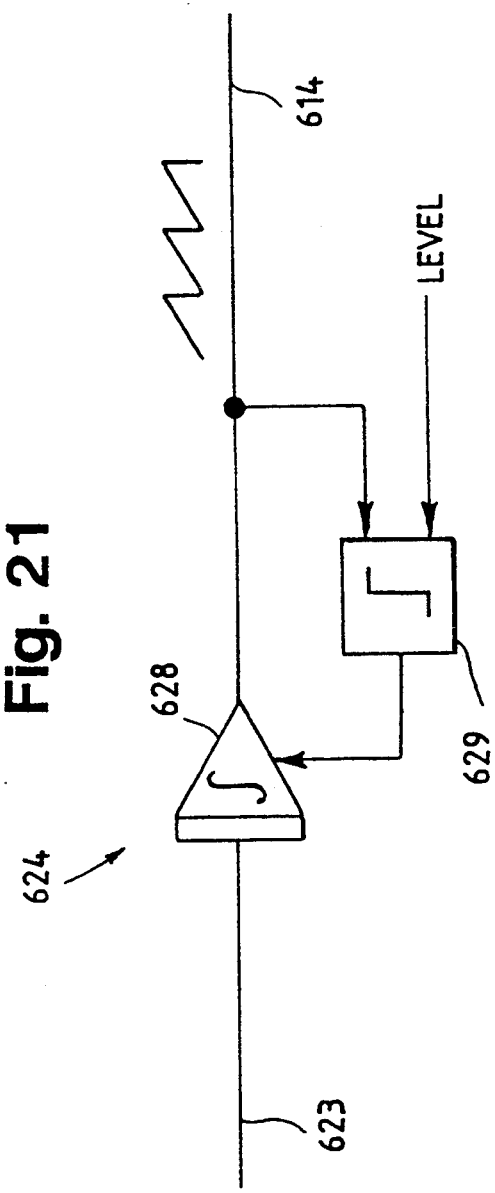

ENGINE STARTING SYSTEM UTILIZING MULTIPLE CONTROLLED ACCELERATION RATES

TECHNICAL FIELD

The present invention relates generally to electromagnetic machines, and more particularly to a starting system incorporating an electromagnetic machine which is operated to start an engine.

BACKGROUND ART

An auxiliary power unit (APU) system is often provided on an aircraft and is operable to provide auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a brushless, synchronous generator is coupled to and driven by the gas turbine engine during operation in a generating mode whereupon the generator develops electrical power.

As is known, an electromagnetic machine may be operated as a motor to convert electrical power into motive power. Thus, in those applications where a source of motive power is required for engine starting, such as in an APU system, it is possible to omit the dedicated starter motor and operate the generator as a motor during the starting sequence to accelerate the engine to self-sustaining speed. This capability is particularly advantageous in aircraft applications where size and weight must be held to a minimum.

The use of a generator in starting and generating modes in an aircraft application has been realized in a variable-speed, constant-frequency (VSCF) power generating system. In such a system a brushless, three-phase synchronous generator operates in the generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

The generator of such a VSCF system is operated as a motor in the starting mode to convert electrical power supplied by an external AC power source into motive power which is provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion field windings via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

In order to properly accelerate the generator and prime mover during operation in the starting mode, it is necessary to properly commutate or switch the currents among the armature windings of the generator. In the past, proper commutation was achieved using an absolute position sensor, such as a resolver, a synchro, an optical encoder or hall effect devices. For example, in Lafuze, U.S. Pat. No. 3,902,073 three Hall sensors are mounted in an air gap of a PMG 120 electrical degrees apart with respect to permanent magnet rotor pole pairs. As the rotor of the PMG rotates, the voltage output of each Hall sensor switches on and off as a function of the rotor position thereby generating three square wave voltages spaced apart by 120 electrical degrees. The outputs from the Hall sensors are representative of the position of the PMG rotor and are used to control switching elements in cyclo-converters to switch current to armature windings of a main generator portion.

Use of an external absolute position sensor entails considerable expense in the position sensor itself and associated electronics, and further results in extra wires and the need for an extra assembly step to install the components. Also, operational parameters often limit the accuracy of the sensor.

In view of the foregoing difficulties, other approaches have been taken in an effort to detect rotor position without the need for absolute position sensors. In the case of a brushless DC motor control, a back EMF approach has been used to detect rotor position. The back EMF of the motor is defined by the following equation:

$$E_{emf} = K\omega \sin\alpha$$

where K is a constant, $\omega$ is the angular speed of the motor and $\alpha$ is the electrical phase angle of the rotor. From the foregoing equation, it can be seen that if back EMF can be detected, rotor electrical phase angle can be determined and thus proper commutation of the armature windings of the motor can be achieved. The back EMF voltage can be detected using either of two methods, referred to as the direct method and the indirect method.

The direct method can be used to directly measure phase back EMF voltage only when the phase winding is not energized by the inverter connected thereto and when the winding is not short circuited either by closed switches in the inverter or by conducting flyback diodes in the inverter. Such conditions can be realized when a 120 degree commutation algorithm is utilized. In this case, a voltage reading is taken after a short delay following switching of the phase winding off to ensure complete current decay by the free-wheeling diodes. This direct technique is described in a paper entitled "Microcomputer Control for Sensorless Brushless Motor" by E. Iizuka et al., *IEEE Transactions on Industry Application*, Vol. IA-21, No. 4, May/June 1985.

The indirect method is based on estimating the back EMF from the motor terminal voltage and phase currents. This method is suitable for both 120 and 180 degree commutation algorithms. One technique that uses this method is described in a paper entitled "Position—and—Velocity Sensorless Control for Brushless DC Motor Using an Adaptive Sliding Mode Observer" by Furuhashi et al., *IEEE Transactions on Industrial Electronics*, Vol. 39, No. 2, April 1992.

Because the back EMF voltage of a motor is zero at standstill and the signal to noise ratio is small at lower speeds, the reliable determination of rotor position by detecting back EMF is limited at low rotor speeds.

A method of using a permanent magnet generator as a position sensor for motor/generator start is described in Stacey U.S. Pat. No. 5,140,245. A standard brushless generator is equipped with a PMG which is used as an emergency electric power source and as a source of control power during a normal or generating mode of operation. The PMG develops a multi-phase output which is supplied to a high resolution phase-locked loop having a binary counter which develops an output signal representing shaft position. This method, however, is limited to the situation where the number of PMG rotor poles is equal to or less than the number of poles on the main generator portion rotor so that ambiguous position readings are avoided.

SUMMARY OF THE INVENTION

According to one aspect of the present invention, a control for operating an electromagnetic machine in a starting mode of operation includes means for detecting a magnitude of a parameter of power applied to a main armature winding relative to a stationary frame of reference and a position sensor for detecting rotor position of the electromagnetic machine including means coupled to a set of PMG armature phase windings for deriving a number of interval pulses per revolution of a motive power shaft connected to the rotor from the PMG phase outputs, means coupled to the deriving means for measuring time periods between adjacent interval pulses and means coupled to the measuring means for transforming the measured time periods into an indication of the angular position of the motive power shaft. A converter is coupled to the position sensor and is responsive to the angular position indication for converting the detected parameter magnitude into field and torque producing components relative to a rotating frame of reference and means are coupled between the converter and the power source and responsive to the field and torque producing components for controlling the power source during operation in the starting mode such that the rotor is rotated.

According to a further aspect of the present invention, a control for operating an electromagnetic machine in a starting mode of operation includes means for detecting a magnitude of a parameter of AC power supplied to the electromagnetic machine relative to a stationary frame of reference and a position sensor for detecting rotor position of the electromagnetic machine including means coupled to the set of main armature windings for deriving a number of interval pulses relating to the revolution of the motive power shaft from a parameter of the AC power, means coupled to the deriving means for measuring time periods between adjacent interval pulses and means coupled to the measuring means for transforming the measured time periods into an indication of the angular position of the motive power shaft. A converter is coupled to the position sensor and responsive to the angular position indication for converting the detected parameter magnitude into field and torque producing components relative to a rotating frame of reference. Means are coupled between the converter and the power source and responsive to the field and torque producing components for controlling the power source during operation in the starting mode such that the rotor is rotated.

According to yet another aspect of the present invention a starting system control for controlling an electromagnetic machine having a rotor and a set of main armature windings to start a prime mover which is connected to the electromagnetic machine by a motive power shaft includes means for sensing a terminal voltage of the electromagnetic machine to determine a back EMF voltage induced within one of the armature windings and means coupled to the sensing means for developing an indication of rotor speed and an indication of rotor position in accordance with the back EMF voltage. Means are provided for determining the direction of rotation of the motive power shaft and means are responsive to the indications of the rotor speed, the rotor position and the determined direction of rotation of the motive power shaft for operating the electromagnetic machine in one of a plurality of operating modes including a braking mode, a plugging mode and a motoring mode to bring the prime mover up to a self-sustaining speed. First means are operable during a first phase of the motoring mode prior to ignition of the prime mover for causing the electromagnetic machine to provide motive power to the prime mover so as to accelerate the prime mover at a first predetermined rate while second means are operable during a second phase of the motoring mode subsequent to said first phase for causing the electromagnetic machine to provide motive power to the prime mover so as to accelerate the prime mover at a second predetermined rate. Means are operable during the second phase of the motoring mode for providing fuel to the prime mover to facilitate ignition thereof and third means are operable during a third phase of the motoring mode subsequent to the ignition of the prime mover for causing the electromagnetic machine to provide motive power to the prime mover so as to accelerate the prime mover at a third predetermined rate.

According to any of the embodiments, each controllable power source may comprise an inverter coupled to the main armature winding to supply power to the main armature winding during the starting mode of operation wherein a DC link is connected to the inverter and wherein the DC link provides a DC link current to the inverter during the starting mode of operation. A controller is coupled to the DC link for controlling the magnitude of the DC link current provided to the inverter by the DC link during the starting mode of operation whereby the rotor is accelerated with respect to said main armature winding.

Also in accordance with any of the embodiments, the control includes means for igniting a prime mover and the electromagnetic machine is operated to bring the prime mover up to self-sustaining speed and further includes first means operable during a first phase prior to ignition of the prime mover for causing the electromagnetic machine to provide motive power to the prime mover so as to accelerate the prime mover at a first predetermined rate, second means operable during a second phase subsequent to the first phase for causing the electromagnetic machine to provide motive power to the prime mover so as to accelerate the prime mover at a second predetermined rate and means operable during the second phase for providing fuel to the prime mover to facilitate ignition thereof. Third means are operable during a third phase subsequent to the ignition of the prime mover for causing the electromagnetic machine to provide motive power to the prime mover so as to accelerate the prime mover at a third predetermined rate.

The foregoing controls are effective to bring a prime mover up to self-sustaining speed in an efficient and reliable manner, even when starting power is limited, such as when starting power is supplied by a battery or other limited power source.

BRIEF DESCRIPTION OF THE DRAWINGS

FIG. 1A comprises a combined block and schematic diagram of a brushless, synchronous generator;

FIG. 1B comprises a block diagram of an APU system together with a start converter;

FIG. 20 comprises a block diagram of the voltage-to-angle converter of FIG. 19;

FIG. 21 comprises an alternative embodiment for the voltage-to-angle converter of FIG. 19;

DESCRIPTION OF THE PREFERRED EMBODIMENTS

Figure 2A:
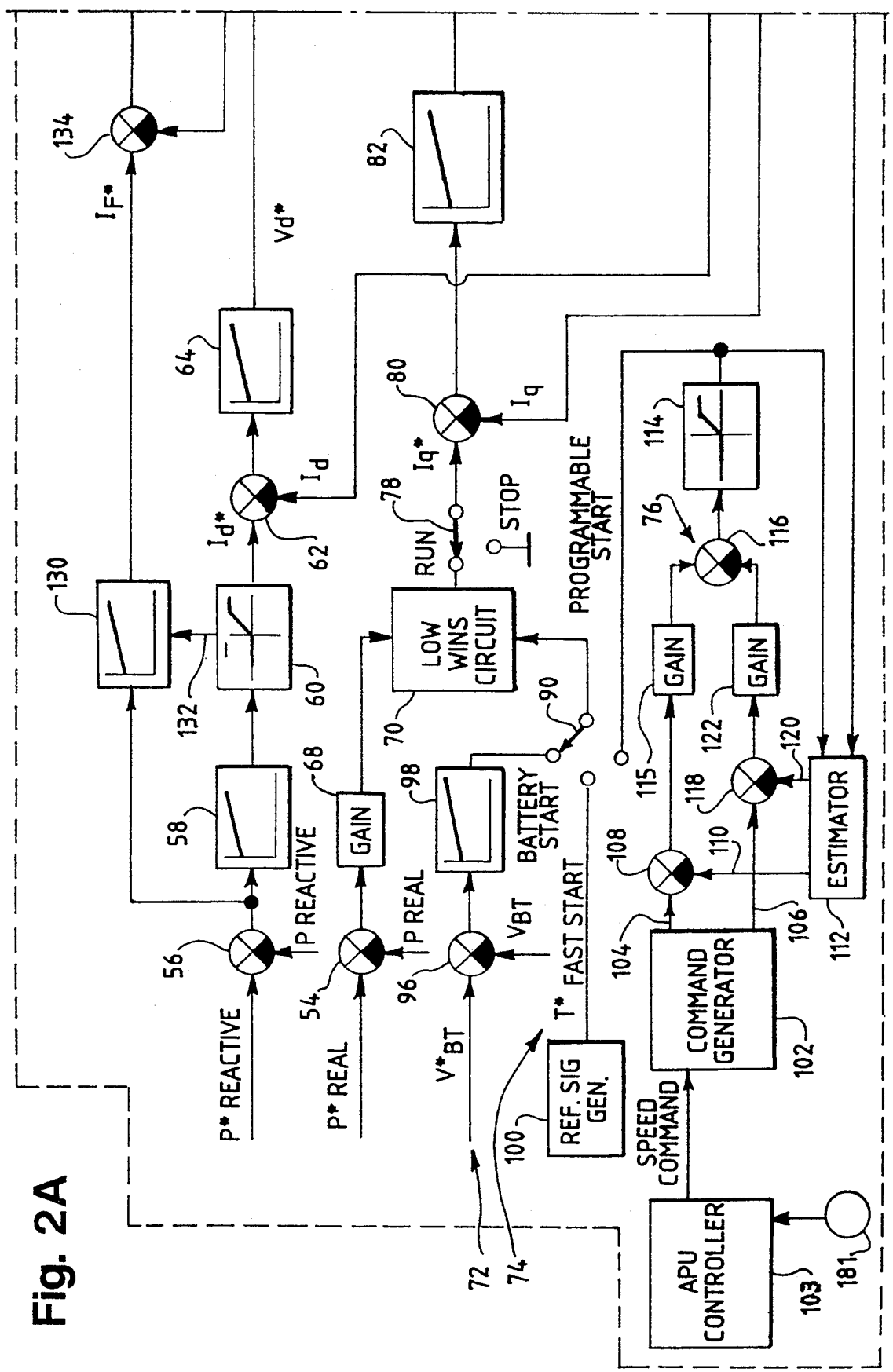
FIGS. 2A and 2B, when joined at the dashed lines, together comprise a block diagram of a starting system control according to a first embodiment of the present invention.

Referring now to FIG. 1A, a brushless, synchronous generator 10 includes a permanent magnet generator (PMG) 12, an exciter portion 14 and a main generator portion 16. The generator 10 further includes a motive power shaft 18 interconnecting a rotor 20 of the generator 10 and a prime mover 21, such as a gas turbine engine. In a specific application of the present invention, the generator 10 and the prime mover 21 together may comprise an aircraft auxiliary power unit (APU), although the present invention is equally useful in other prime mover/generator applications.

The rotor 20 carries one or more permanent magnets 22 which form poles for the PMG 12. Rotation of the motive power shaft 18 causes relative movement between the magnetic flux produced by the permanent magnet 22 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. Three-phase main generator portion armature windings 36a–36c are disposed in the stator 26.

During operation in a generating mode, at least one, and preferably all three of the PMG armature windings 24a–24c are coupled through a rectifier and voltage regulator (not shown) to the exciter portion field winding 28. As the motive power shaft 18 is rotated, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional. As seen in FIG. 1B, the AC voltages are supplied through a contactor set 37 to an APU power distribution network 38 and thence to one or more loads (not shown).

Often, it is desirable to use the brushless generator 10 as a motor to bring a prime mover 21 up to self-sustaining speed. This operation is accomplished by providing electrical power to the main generator portion field winding 34 via the exciter 14, providing AC power to the main generator portion armature windings 36a–36c and suitably commutating the currents flowing in the windings 36a–36c to cause the motive power shaft 18 to rotate. In a specific embodiment, the electrical power for the generator 10 is developed by an APU start converter 39 which receives external electrical power and which is connected by contactor sets 40a, 40b to the exciter field winding 28 and the armature windings 36a–36c, respectively. As noted in greater detail hereinafter, any one of a number of various controls and methods may be used to control the power supplied to the main generator field winding 34 via the exciter 14 and the power supplied to the armature windings 36a–36c.

Figure 2B:
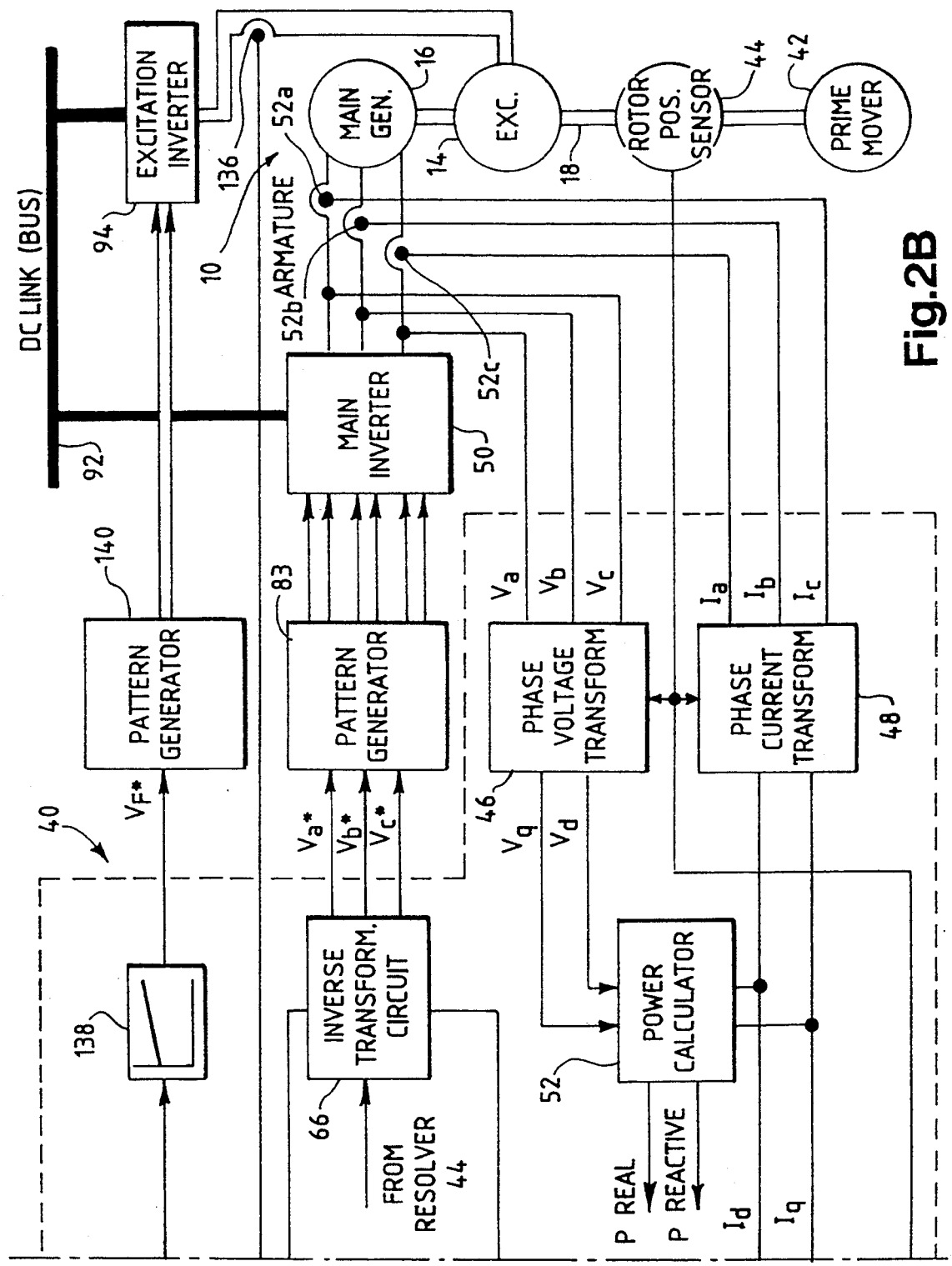

FIGS. 2A and 2B illustrate the exciter 14, the main generator 16 and the motive power shaft 18 of the generator 10 together with a first embodiment of a starting system control 41 for operating the generator 10 in a starting mode to convert electrical power into motive power for starting the prime mover 21. Referring to FIG. 2B, the starting system control 41 includes a rotor position detector 44 which may comprise a resolver or another type of detector which develops a signal representing the position of the motive power shaft 18, and hence the rotor 20. The rotor position signal is delivered to a phase voltage transformation circuit 46 and a phase current transformation circuit 48. The phase voltage transformation circuit 46 is responsive to phase voltages $V_a$, $V_b$ and $V_c$ developed by a first power source or power converter in the form of a pulse-width modulated (PWM) main inverter 50. The main inverter 50 is of the three-phase type and includes six controllable power switches and six flyback diodes connected in a conventional bridge configuration. The phase current transformation circuit 48 is responsive to signals $I_a$, $I_b$ and $I_c$ representing the magnitudes of phase currents developed by the main inverter 50, as detected by current sensors 52a–52c. The signals supplied to the circuits 46, 48 are expressed in terms relative to the stationary frame of reference of the stator 26. The circuits 46 and 48 are converters which implement Park's transformation to convert these signals into signals $V_d$, $V_q$ and $I_d$, $I_q$ in the d-q (or direct-quadrature) rotating frame of reference relative to the rotor 20.

The signals $V_d$, $V_q$ and $I_d$, $I_q$ are provided to a power calculator 52 which computes real and reactive power delivered to the generator according to the following equations:

$$P_{real} = I_d V_d + I_q V_q$$

$$P_{reactive} = -I_q V_d + I_d V_q$$

Referring to FIG. 2A, the signals representing the real and reactive power magnitudes are supplied to summers 54, 56, which subtract such signals from signals representing a commanded real power and a commanded reactive power, respectively. The output of the summer 56 is conditioned by a proportional-integral regulator 58, limited by a limiter 60 and supplied as a field command signal to a non-inverting input of a summer 62. An inverting input of the summer 62 receives the signal $I_d$ developed by the phase current transformation circuit 48 (FIG. 2B). The summer 62 develops an error signal representing the deviation of the field producing component developed by the main inverter 50 from a commanded field component magnitude and the error signal is conditioned by a proportional-integral (PI) regulator 64 and supplied to a first input of an inverse transformation circuit 66.

The output of the summer 54, representing the deviation of the real power magnitude from a commanded power magnitude, is processed by a gain unit 68 and is provided to a selector comprising a low wins circuit 70. The low wins circuit 70 further receives an input from one of three start circuits 72, 74 and 76, described in greater detail hereinafter. The low wins circuit 70 supplies the signal having the least magnitude through a run-stop switch 78 to a non-inverting input of a summer 80. The signal provided by the low wins circuit 70 represents a commanded torque producing component $I_q^*$ to be developed by the main inverter 50. The signal $I_q$ representing the magnitude of the torque producing component actually produced by the main inverter 50 is supplied to an inverting input of the summer 80 and the resulting error signal, representing the deviation of the actual and commanded torque producing component magnitudes, is processed by a PI regulator 82 and supplied to a second input of the inverse transformation circuit 66 (FIG. 2B).

The inverse transformation circuit 66 is responsive to the output of the resolver 44 and converts the signals developed by the PI regulators 64, 82 into three voltage commands $V_a^*$, $V_b^*$ and $V_c^*$ relative to a stationary frame of reference. The commands $V_a^*$, $V_b^*$ and $V_c^*$ are provided to a pattern generator 83 (FIG. 2B) which in turn develops six switch control patterns for the six switches in the three phase main inverter 50.

The run-stop switch 78 is used in certain circumstances, such as a failed start attempt, when the excitation to the system is suspended and then reapplied. In such a case, the run-stop switch 78, when set to the stop position, suspends only the torque producing component command $I_q^*$ by setting it to zero so that no motive power is developed by the generator 10. By not also setting the field producing component $I_d^*$ to zero, time that would otherwise be required to regenerate the field during restart is saved. The run-stop switch 78 is optional, and the particular manner in which it is implemented is not considered important to the invention.

The start circuit 72 develops a start signal which is provided by a switch 90 to the low wins circuit 70 in the event that DC power is to be supplied by a battery (not shown) over a DC bus 92 (FIG. 2B) to the main inverter 50 and a PWM excitation inverter 94 coupled to the field winding 28 of the exciter 14. A signal $V_{BT}$ representing the actual magnitude of battery voltage is supplied to a summer 96 which subtracts such signal from a commanded battery voltage signal $V_{BT}^*$. The resulting error signal is processed by a PI regulator 98 and is supplied by the switch 90 to the low wins circuit 70 as the start signal. This start signal ensures that the acceleration of the rotor matches the battery impedance so that the power drawn from the battery during the starting mode of operation does not exceed a level which would cause the battery voltage to drop to a level which would impair the operation of other loads connected thereto.

It should be noted that the excitation inverter 94 may be of the half-bridge or full-bridge type. In the former case (seen in FIG. 7 and described hereinafter), the inverter 94 includes two controllable power switches coupled to opposite ends of the field winding 28 together with four diodes. In the latter case a pair of controllable power switches and associated flyback diodes are coupled to each end of the field winding 28.

As seen in FIG. 2A, the start circuit 74 comprises a reference signal generator 100 which develops a start signal that is supplied by the switch 90 to the low wins circuit 70 in the event that a fast start cycle is to be implemented. The reference signal generator 100 develops a waveform of appropriate waveshape, such as a stepped waveform, that quickly rises from zero volts up to a constant level of appropriate magnitude which in turn causes the main inverter 50 and the excitation inverter 94 to bring the generator 10 and the prime mover 42 up to a desired speed in as rapid a fashion as possible.

The start circuit 76 provides a programmable start signal to the switch 90 and the low wins circuit 70. A command generator 102 is responsive to a speed command signal generated by an APU controller 103. In response to the speed command signal, the command generator 102 develops a speed reference signal on a line 104 and a position reference signal on a line 106. The signal on the line 104 is supplied to a summer 108 which in turn subtracts a signal appearing on a line 110 therefrom. The signal on the line 110 is developed by an estimator 112 which is in turn responsive to the resolver output signal and a signal developed by a limiter 114 of the start circuit 76. The signal on the line 110 represents the estimated speed of the rotor 20. The summer 108 develops a speed error signal which is processed by a gain unit 115 and is supplied to a noninverting input of a summer 116.

The signal on the line 106 is supplied to a noninverting input of a summer 118 and a signal developed on a line 120 by the velocity estimator 112 and representing the estimated position of the rotor 20 is subtracted therefrom. The resulting position error signal is processed by a gain unit 122 and is supplied to an inverting input of the summer 116. The summer 116 subtracts the compensated position error signal from the compensated speed error signal to develop a torque command signal which is limited by the limiter 114. The resulting limited torque command signal is supplied by the switch 90 to the low wins circuit 70. The command generator 102 and the velocity estimator 112 are described in greater detail hereinafter in connection with FIG. 3.

The reactive power error signal is supplied by the summer 56 to a PI regulator 130 which also receives an enable signal on a line 132 from the limiter 60. The output of the regulator 130 represents a commanded field current magnitude $I_F^*$ for the exciter 14 and is supplied to a noninverting input of a summer 134. An inverting input of the summer 134 receives a signal representing the current magnitude $I_F$ supplied by the excitation inverter 94 to the exciter field winding 28 as detected by a current sensor 136, FIG. 2B. The resulting field current error signal is processed by a PI regulator 138 (FIG. 2B) to produce a voltage command which is supplied to a pattern generator 140. The pattern generator 140 develops appropriate patterns for the switches in the inverter 94 to cause the exciter field current to approach the commanded current magnitude.

If desired, the elements 56, 58, 60 and 130 may be omitted from the circuit of FIG. 2A and a fixed command $I_d^*$ may be supplied to the summer 62. In addition, a function generator which is responsive to rotor speed to produce an excitation command may be coupled to the summer 134 to accomplish field weakening.

Figure 3:
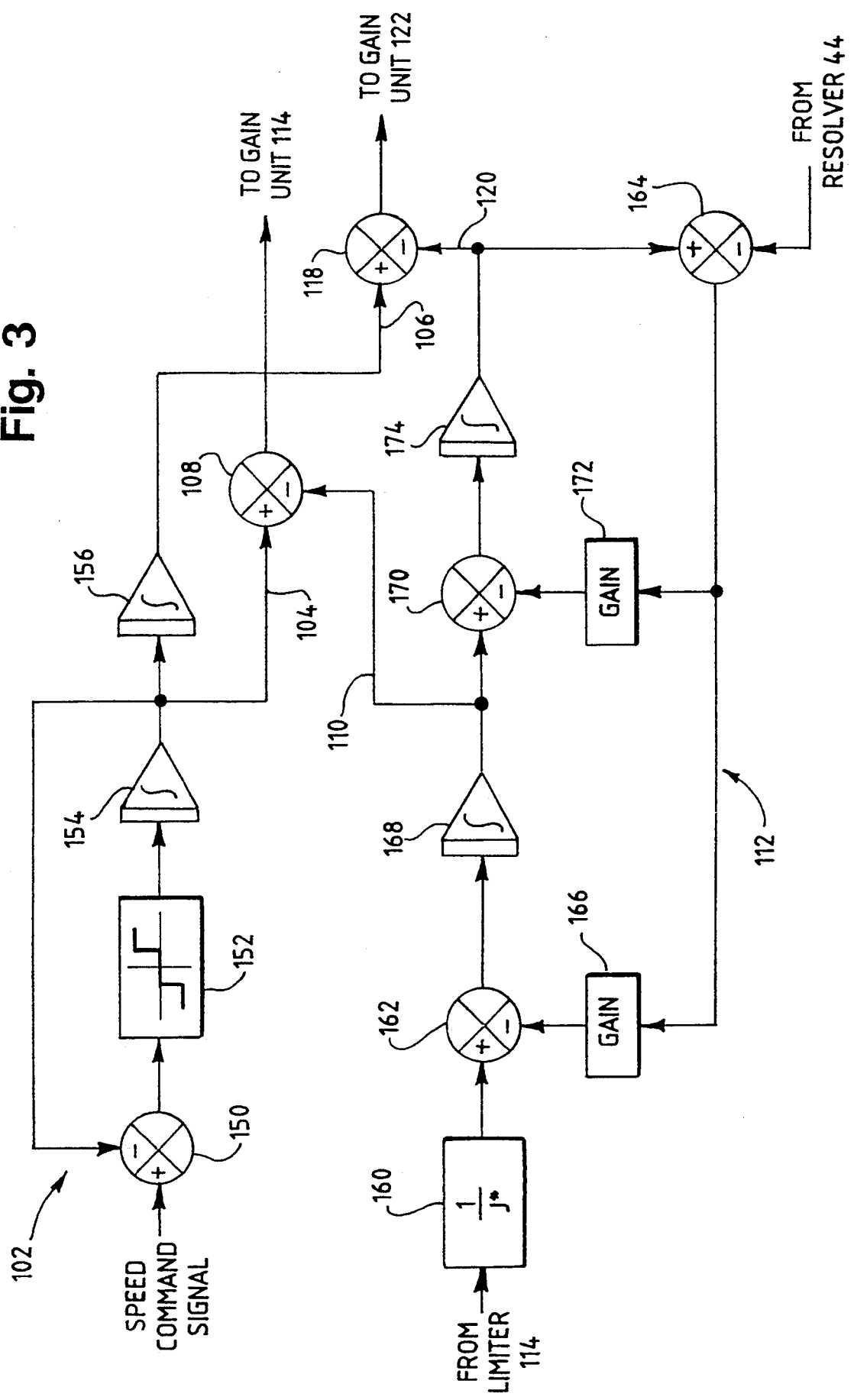
FIG. 3 comprises a block diagram of the command generator and velocity estimator of FIG. 2A.

Referring now to FIG. 3, the command generator 102 and the velocity estimator 112 are shown in greater detail together with the summers 108 and 118. The speed command signal is supplied to a noninverting input of a summer 150 that develops an output which is processed by a function generator 152. The function generator 152 converts the error signal developed by the summer 150 into an acceleration reference signal which is integrated by an integrator 154 and supplied to a further integrator 156 and to the summer 108. The output of the integrator 154 is further supplied back to an inverting input of the summer 150, and hence the components 150, 152 and 154 comprise a closed-loop reference signal generator. The integrator 154 produces the speed reference signal which is provided to the noninverting input of the summer 108. The integrator 156 converts the speed reference signal into the position reference signal which is supplied over the line 106 to the noninverting input of the summer 118.

The output of the limiter 114 is supplied to a scaler 160 which multiplies the limiter signal with a signal representing the reciprocal of the inertia of the rotor 20. The resulting signal is provided to a noninverting input of a summer 162. The output of the rotor position sensor 44, which may contain noise that may affect system operation, is supplied to an inverting input of a summer 164 which further includes a noninverting input which receives the estimated position signal on the line 120. The resulting error signal developed by the summer 164 is processed by a gain unit 166 and is supplied to an inverting input of the summer 162. The output of the summer 162, which represents the estimated acceleration of the rotor 20, is integrated by an integrator 168 to produce the speed estimate signal on the line 110. The speed estimate signal is further supplied to a noninverting input of a summer 170. A gain unit 172 multiplies the error signal developed by the summer 164 and the resulting signal is provided to an inverting input of the summer 170. The output of the summer 170 is processed by a further integrator 174 which in turn produces the position estimate signal. The velocity estimator 112 avoids the noise problems associated with utilizing the output of the rotor position sensor 44 along with a simple differentiator.

It should be noted that some or all of the components of the control 40 may be implemented in whole or in part by a digital signal processor or any other suitable hardware and/or software, as desired.

During starting operation, the control operates the generator 10 in two modes, referred to as the maximum torque per amp mode and the unity power factor mode. At low speeds, e.g., when rotor speed is less than approximately 5500 RPM, the maximum torque per amp mode is implemented, which reduces starting times at lower speeds. At zero and low speeds, the field command signal $I_d^*$ is set by the limiter 60 to the value which provides the maximum torque per amp ratio, which value is a function of motor parameters. At increasing speeds, the reactive power increases. When the error signal at the output of the summer 56 becomes negative, the limiter 60 eventually allows the output of the PI regulator 58 to pass to the summer 62 and therefore increases the commutation angle which causes a reduction in torque. When an upper limit is reached by the limiter 60, an enable signal is provided over the line 132 to the regulator 130, enabling it to reduce the field command signal for the exciter. From this point, the field current supplied by the excitation inverter 94 is reduced inversely proportional to speed. The commutation angle is increased to maintain the required (commanded) reactive power level. When the commutation angle reaches the limit thereof, a field current command performs this function by reducing the exciter field current to satisfy reactive power requirements.

Figure 4:
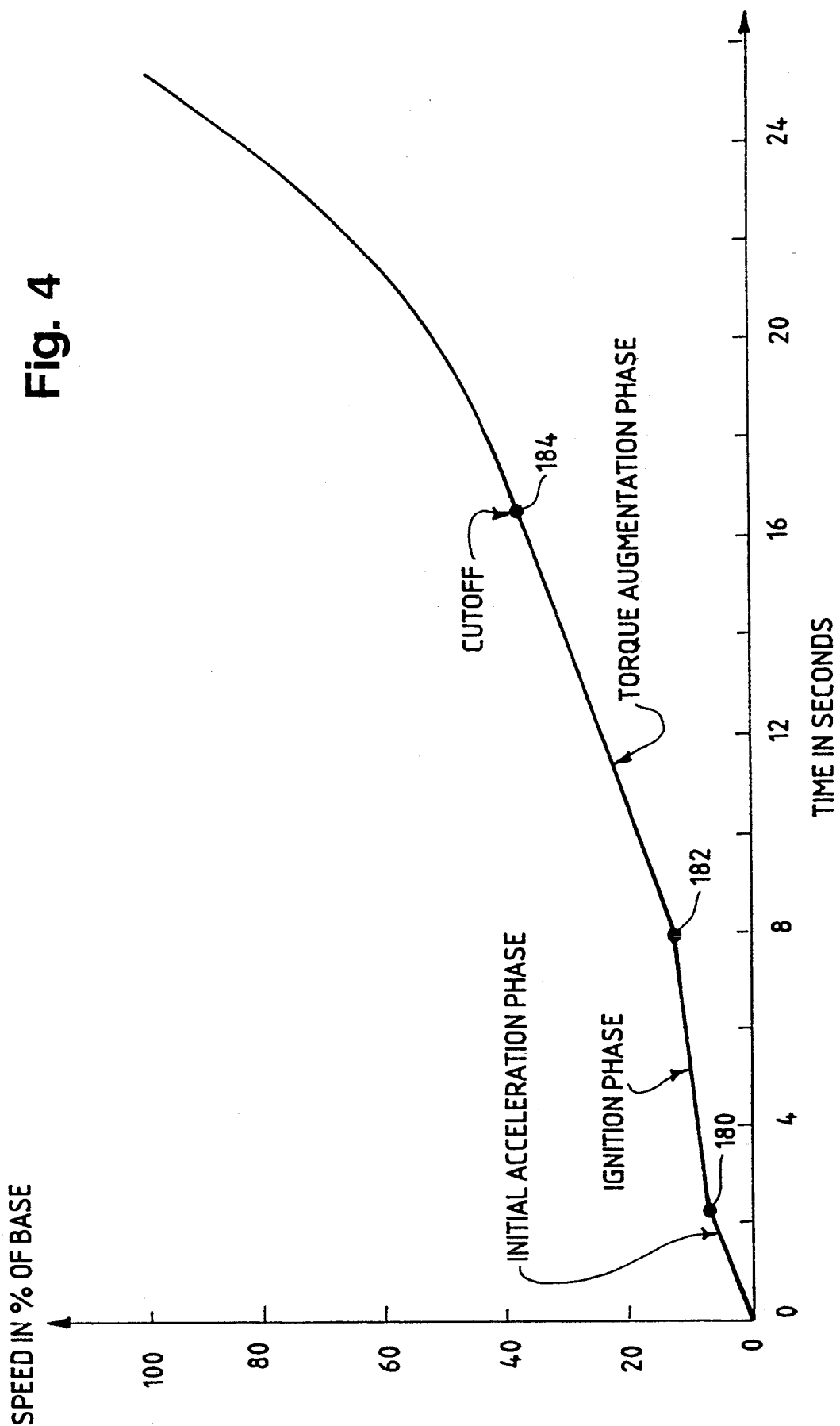
FIG. 4 comprises a graph illustrating the relationship between speed and time for a starting sequence effected by the control of FIGS. 2A and 2B.

The preferred starting method of the invention is accomplished with the switch 90 connected to the output of the limiter 114 of the programmable start circuit 76. As illustrated in FIG. 4, during the preferred starting mode of operation of the system, the prime mover is accelerated in a controlled fashion during each of three different phases: an initial acceleration phase, an ignition phase and a torque augmentation phase. During each of the phases, the speed of the prime mover is controlled by the speed command signal generated by the APU controller 103.

The initial acceleration phase begins upon commencement of start-up of the prime mover and ends when the prime mover has been accelerated to a predetermined speed. Preferably, that speed is the minimum speed at which ignition of the prime mover is likely to occur, e.g., about seven percent of rated operating speed, and is designated as point 180 in FIG. 4. During the initial acceleration phase, the magnitude of the speed command generated by the APU controller 103 increases at a first constant, predetermined rate so that the acceleration of the prime mover is substantially constant.

During the ignition phase, the prime mover is accelerated at a second constant, predetermined level which is lower than the acceleration level of the initial acceleration phase, and fuel and a source of ignition are supplied to the prime mover. The ignition phase begins at the minimum speed at which ignition is likely to occur and lasts until ignition of the prime mover, which is detected by an exhaust gas temperature sensor 181 (shown in FIG. 2A), which provides a signal to the APU controller 103 indicating the ignition of the prime mover.

If the prime mover fails to ignite within a predetermined period of time, e.g., five seconds, after the beginning of the ignition phase, at which point the prime mover reaches the maximum speed at which ignition is likely to occur, e.g., at twelve percent of rated operating speed, the ignition phase is aborted and the start sequence is repeated. When the ignition phase is aborted, the run-stop switch 78 is switched to its stop position, and subsequently to its run position when the start sequence is restarted.

Upon ignition, the torque augmentation phase begins at a point designated 182 in FIG. 4. During the torque augmentation phase, the speed of the prime mover is controlled to increase at a constant, predetermined rate, e.g., one percent per second, to reduce the risk that ignition will be lost from cooling of the prime mover due to excessive acceleration.

As the rotational speed of the prime mover increases during the torque augmentation phase, the amount of torque developed by the prime mover gradually increases. Since the acceleration of the prime mover is controlled at a constant level, the amount of torque provided by the generator 10 gradually decreases during this phase. At a particular point, the amount of torque provided by the generator is reduced to a very low value, e.g., five foot-pounds. When this point is reached, typically between about 55% and 90% of the rated operating speed of the prime mover, power to the generator is cut off, and the generator is converted from the starting mode to the generating mode. After cutoff, designated as point 184 in FIG. 4, the prime mover continues to accelerate to operating speed.

The cutoff point 184 may be determined by the APU controller 103 by comparing the power being supplied to the generator 10 by the main inverter 50 with a predetermined power versus torque and speed characteristic for the generator 10. Alternatively, the cutoff point 184 could be the point at which the current drawn by the generator 10 reaches a predetermined lower limit. The particular manner of determining the cutoff point is not considered important to the invention.

Figure 5:
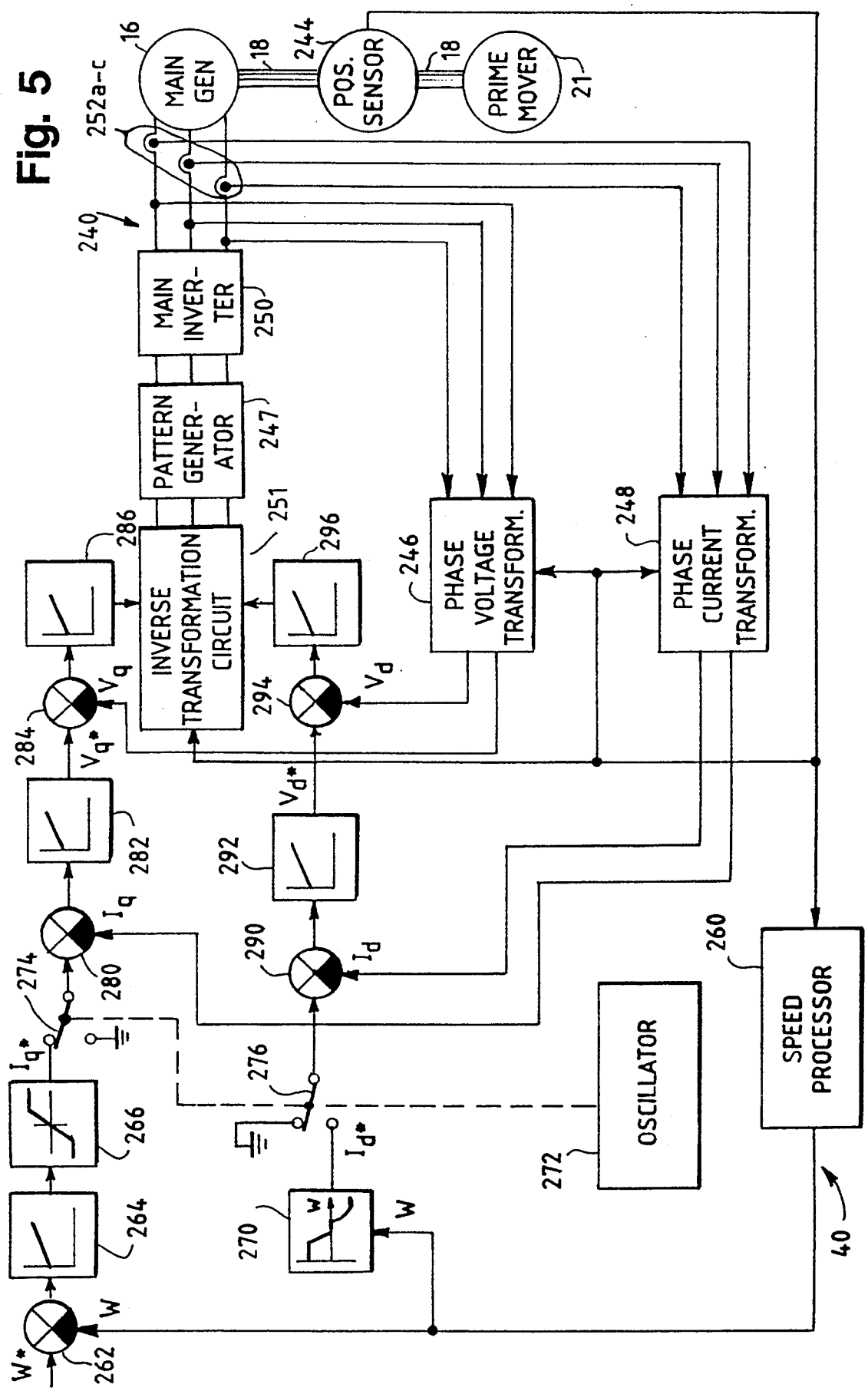
FIG. 5 comprises a block diagram of a starting system control according to another embodiment of the present invention.

FIG. 5 illustrates a starting system control 240 which may be used in lieu of the control 41 disclosed in FIGS. 2A and 2B above. The control 240 is capable of providing excitation for the main generator 16 through the armature windings 36a–36c, rather than through the exciter 14, although DC power may be applied to the exciter field winding. Accordingly, the control does not include an excitation inverter.

The starting system control 240 includes a rotor position sensor 244, a phase voltage transformation circuit 246, a phase current transformation circuit 248, a pattern generator 249, an inverter 250, an inverse transformation circuit 251 and current sensors 252a–252c identical to the elements 44, 46, 48, 83, 50, 100 and 52a–52c, respectively, of FIG. 2B.

The angular position signal generated by the position sensor 244 is supplied to a speed processor 260 which generates in a conventional manner a speed signal $\omega$ representing the sensed speed of rotation of the rotor 20. The speed signal generated by the speed processor 260 is compared with a speed command $\omega^*$, which represents the desired speed at any point in time, by a summer 262. The difference between the sensed and desired speed as determined by the summer 262 is provided as an error signal to a proportional-integral gain and compensation unit 264. The output of the gain and compensation unit 264 is limited by a limiter 266, which generates a quadrature current command, $I_q^*$, representing the desired quadrature current.

The output of the speed processor 260 is also provided to a function generator 270 which generates a direct current command, $I_d^*$, based upon the speed signal generated by the speed processor 260. At zero and relatively low speeds, as determined by the signal generated by the speed processor 260, the function generator 270 outputs a direct current command having a maximum positive value. At intermediate speeds when excitation is supplied by applying DC power to the exciter field winding 28, the function generator 270 outputs a direct current command to provide a near maximum torque-to-current ratio, and at higher speeds, the function generator 270 outputs a negative direct current command to provide phase advance in coordination with the weakening of the DC exciter field.

The above manner in which the magnitude of the direct current command $I_d^*$, is controlled assumes that DC excitation is provided to the exciter field winding 28 during operation in the starting mode. If DC excitation is not provided to the exciter field winding 28 during operation in this mode, the magnitude of the direct current command $I_d^*$, should be maintained at a constant level, instead of changing in magnitude as described above. Other variations in the manner in which the function generator 270 generates the direct current control command may be utilized.

At any given time during startup of the generator 10, the main generator portion 16 is alternately excited with purely direct current and purely quadrature current. The direct current builds the field in the main generator portion 16, whereas the quadrature current, which is applied before the field substantially decays, generates torque on the rotor 20.

The alternate direct and quadrature excitation provided to the main generator portion 16 is controlled by an oscillator 272 connected to a pair of switches 274, 276. The switch 274 selectively provides the quadrature current command $I_q^*$ to a summer 280, and the switch 276 selectively provides the direct current command $I_d^*$ to a summer 290.

The switches 274, 276 are simultaneously switched, and at any given time, one of the switches 274, 276 is connected to ground, and the other of the switches 274, 276 is connected to receive its respective command signal, $I_q^*$ or $I_d^*$. As a result, the main generator portion 16 is excited with either purely direct excitation or purely quadrature excitation.

The frequency and duty cycle of the oscillator 272, which determine at what rate the switches 274, 276 are switched and how long they remain in their two positions, respectively, may be selected based on the time constant of the main generator portion 16 so that the field generated within the main generator portion 16 (via connection of switch 274 to its command signal $I_q^*$) does not significantly decay during the starting mode.

For example, the oscillator 272 may have a fixed frequency of five hertz and a duty cycle of 50% throughout the starting mode of operation so that each of the switches 274, 276 is alternately provided in one position for 100 milliseconds and in the other position for 100 milliseconds. Other frequencies and duty cycles may be utilized.

The summer 280 which periodically receives the quadrature current command $I_q^*$, also receives the sensed quadrature current signal $I_q$ from the phase current transformation circuit 248. The summer 280 generates an error signal, representing the difference between the two signals, which is processed by a proportional-integral gain and compensation unit 282 to produce a quadrature voltage command $V_q^*$ That command signal is provided to a summer 284 along with the quadrature voltage signal $V_q$ generated by the voltage transformation circuit 246. The difference between the signals as determined by the summer 284 is provided to a proportional-integral gain and compensation unit 286.

The summer 290 which periodically receives the direct current command $I_d^*$ also receives the sensed direct current signal $I_d$ from the phase current transformation circuit 248. The summer 290 generates an error signal, representing the difference between the two signals, which is processed by a proportional-integral gain and compensation unit 292 to produce a direct voltage command $V_d^*$. That command signal is provided to a summer 294 along with the direct voltage signal $V_d$ generated by the voltage transformation circuit 246. The difference between the signals as determined by the summer 294 is provided to a proportional-integral gain and compensation unit 296.

The outputs of both the units 286 and 296, representing the desired quadrature and direct phase voltages, respectively, are provided to the inverse transformation circuit 251, which converts such signals into three voltage command signals $V_a^*$, $V_b^*$, and $V_c^*$ in a conventional manner. The three voltage commands are provided to the main inverter 250.

If desired, if power is to be supplied to the exciter 14 via the field winding 28 during operation in the starting mode, rather than DC power it may instead comprise AC power at 400 Hz with a peak-to-peak voltage of 400 volts. The power may be supplied from a power source other than the main inverter 50, if desired.

FIGS. 6–23 illustrate modifications to the abovedescribed circuitry for implementing alternative embodiments of the present invention. According to one aspect, during operation in the starting mode, in addition to the delivery of AC power by the main inverter 72 to the main generator portion armature windings 36a–36c as noted above, the exciter inverter 94 delivers combined AC and DC power to the exciter field winding 28. The exciter 14 acts as a rotary transformer having a primary winding comprising the field winding 28 and secondary windings comprising the armature windings 30a–30c so that AC power is induced in the armature windings 30a–30c. This AC power is rectified by the rotating rectifiers 32 and applied as DC power to the main generator portion field winding 34. Interaction of the resulting magnetic fields causes the rotor 20 to rotate relative to the stator 26 so that the motive power shaft 18 is accelerated.

According to this aspect, the frequency of the AC waveforms applied to the main generator portion armature windings 36a–36c is continuously and preferably uniformly increased during the start mode in a linear fashion. In addition, the magnitude of the AC voltage applied to the exciter field winding 28 is continuously decreased in a linear fashion during operation in the start mode until a first particular rotor speed is reached to prevent over excitation and thus limit the generator accelerating capability. Preferably, this AC power is maintained at a substantially constant frequency. Still further, the magnitude of the DC voltage applied to the exciter field winding 28 is preferably continuously and uniformly increased during operation in the starting mode until a second particular rotor speed is reached. Thereafter, the DC voltage magnitude is kept substantially constant until a third particular rotor speed is reached, following which the DC voltage magnitude is decreased with increasing speed.

Following operation in the starting mode, operation may commence in the generating mode, as described above.

Figure 6:
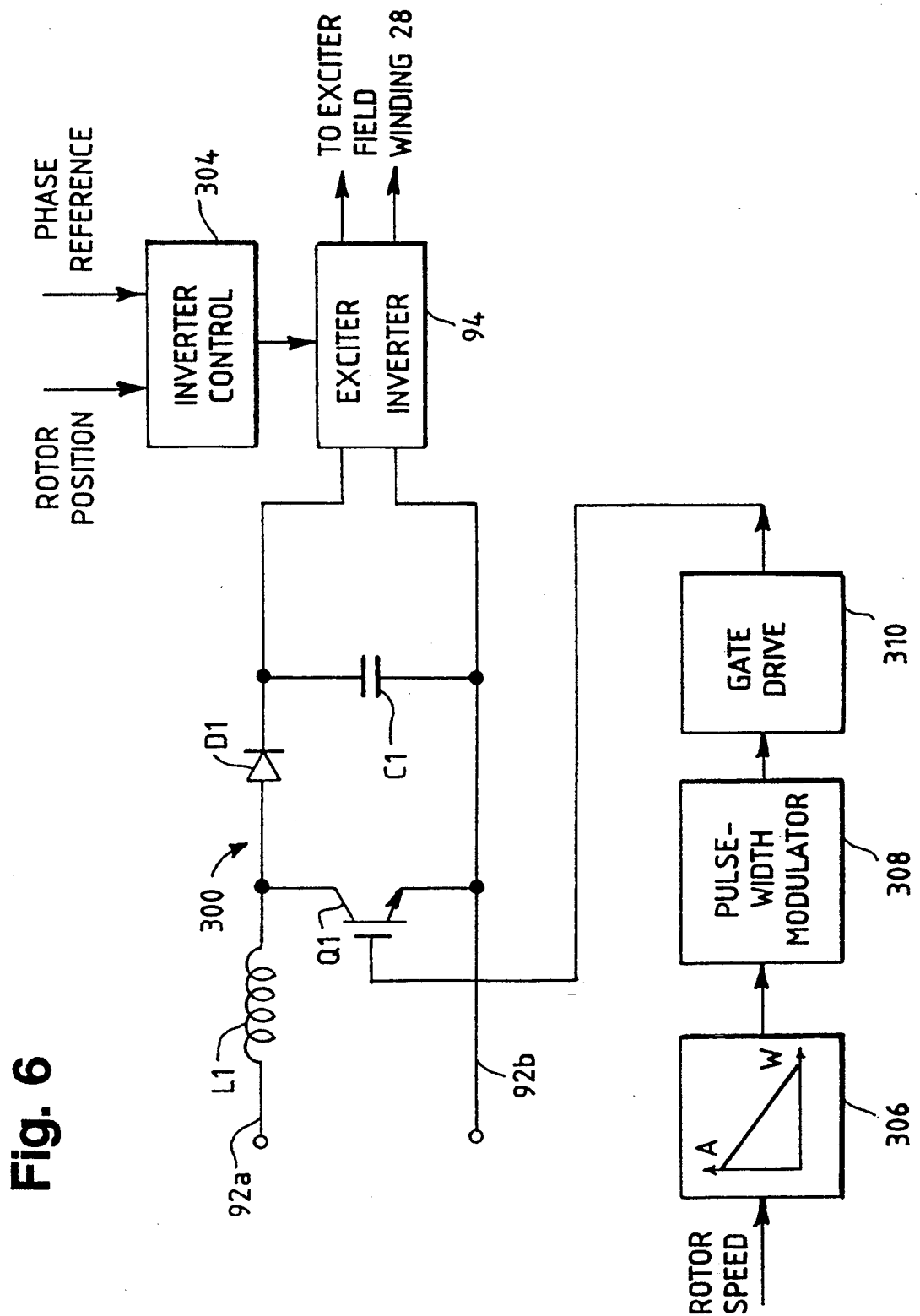
FIG. 6 comprises a combined block and schematic diagram of circuitry for controlling the application of power to the exciter field winding of FIG. 1.

Referring now to FIG. 6, the exciter inverter 94 receives DC power from a DC/DC boost converter 300 and is controlled by an inverter control 304 which replaces the components 130, 134, 138 and 140 of FIGS. 2A and 2B. The boost converter 300 includes an inductor L1, a controllable switch Q1, a diode D1 and a capacitor C1. The controllable switch Q1 is operated to cause the input voltage magnitude appearing on DC bus conductors 92a, 92b to be boosted to a level as needed to properly energize the exciter field winding 28. A function generator 306 is responsive to the speed of the rotor 20 and provides a linearly decreasing output with increasing rotor speed. A signal indicative of rotor speed may be developed as described herein. A pulse-width modulator 308 develops a pulse-width modulation (PWM) control signal comprising a series of pulses having widths which are dependent upon the output of the function generator 306. A gate drive circuit 310 develops a gate drive signal of appropriate magnitude for the controllable switch Q1 from the output of the pulse-width modulator 308.

The inverter control 304 is responsive to a rotor position signal and a phase reference signal, both of which are described in greater detail hereinafter.

Figure 7:
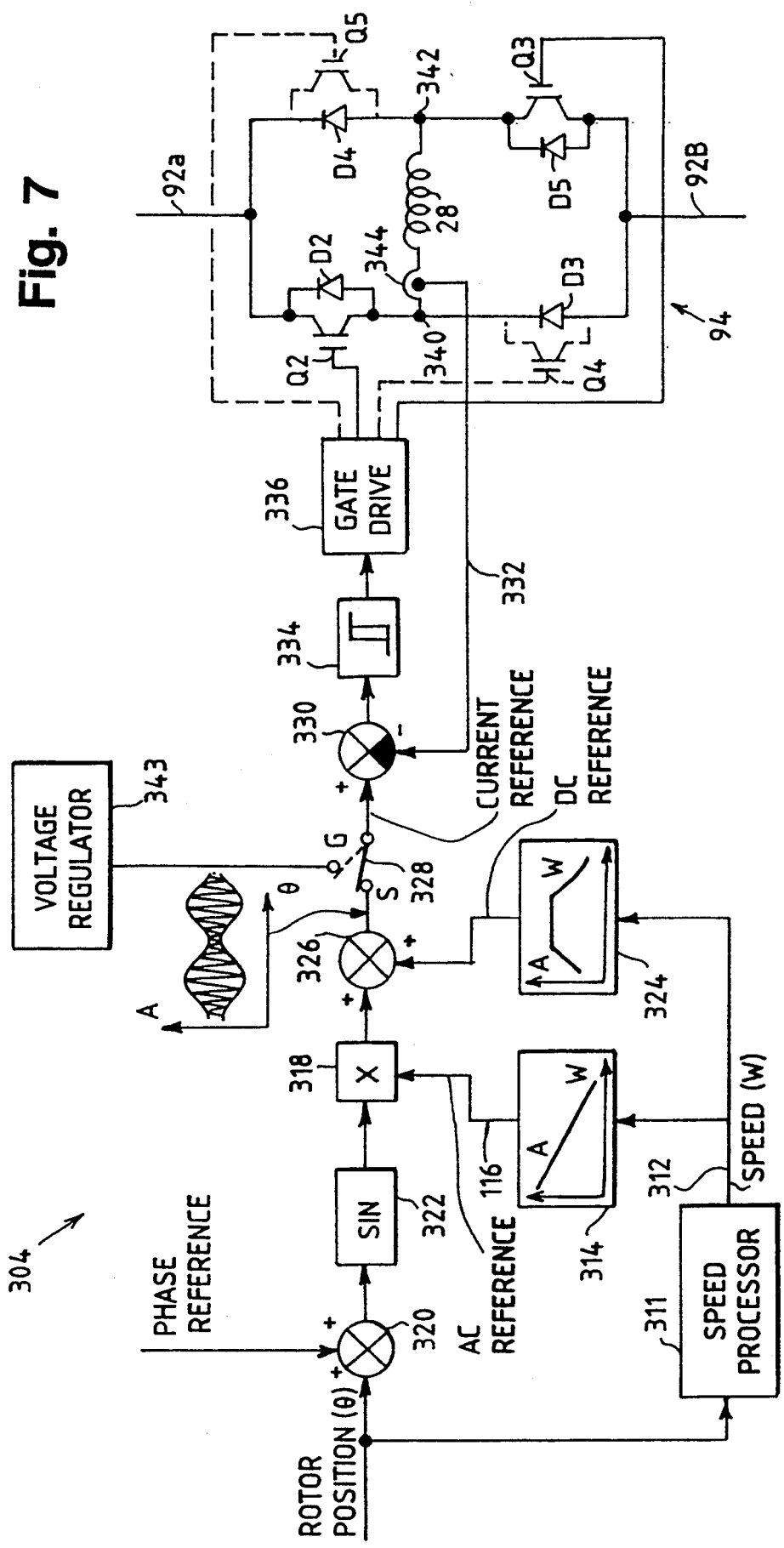
FIG. 7 comprises a combined block and schematic diagram of the inverter control and exciter inverter of FIG. 6.

FIG. 7 illustrates the inverter control 304 in greater detail. The rotor position signal is supplied to a speed processor 311 which develops a signal on a line 312 representing the speed of the rotor 20. A function generator 314, similar to the function generator 306 of FIG. 6, develops an output signal on a line 316 which linearly and continuously decreases with increasing rotor speed. A multiplier 318 modulates a sinusoidal signal developed by a summer 320 and a sine generator 322 with the output of the function generator 314. The summer 320 sums the rotor position signal with the phase reference signal and the sine generator 322 develops a sinusoidal signal at a phase displacement determined by the output of the summer 320.

A further function generator 324 develops a DC reference signal based upon the speed signal appearing on the line 312. The function generator 324 provides a substantially linearly increasing output as speed is increased up to the second particular rotor speed and thereafter provides a substantially constant output level until the third particular rotor speed is reached. Thereafter, the DC reference signal drops in magnitude. The DC reference signal is summed with the output of the multiplier 318 by a summer 326 and, during operation in the starting mode, the resulting signal is passed by a switch 328 to a further summer 330. The signal produced by the summer 326 comprises a current reference signal from which a current feedback signal developed on a line 332 is subtracted. The resulting current error signal is supplied to a comparator 334 which in turn produces control signals which are processed by a gate drive circuit 336 to derive gate drive signals. In the embodiment shown, the gate drive signals control first and second switches Q2, Q3 of the exciter inverter 94. The exciter inverter further includes diodes D1-D4 wherein the switches Q2, Q3 and the diodes D1-D4 are connected in a half-bridge configuration and wherein the exciter field winding 28 is connected across nodes 340, 342. A current sensor 344 provides the current feedback signal to the summer 330 described above.

If necessary or desirable, the exciter inverter may be converted to the full-bridge type. In this case, additional switches Q4 and Q5 (shown in dotted lines in FIG. 7) may be coupled across the diodes D2 and D3, respectively, in the event that bidirectional current through the exciter field winding 28 is desired or necessary.

As noted above, during operation in the starting mode, the switches Q2 and Q3 (and the switches Q4 and Q5, if used) are operated to provide AC and DC power to the exciter field winding 28. The magnitude of the AC voltage, which is preferably maintained at a constant frequency throughout the start sequence, decreases in a substantially linear fashion until a certain speed is reached. Thereafter, only DC power is supplied to the exciter field winding. During the time that AC and DC power are simultaneously supplied to the exciter field winding 28, the voltage developed across the exciter field winding 28 comprises an amplitude modulated sine wave superimposed on a DC level wherein the magnitude of the modulation decreases with increasing speed. In addition, the DC level on which the AC waveform is superimposed increases until the second particular rotor speed is reached following which the DC level remains a substantially constant level until the third particular rotor speed is reached. Thereafter, the DC level is decreased in magnitude to provide field weakening and thereby permit continued acceleration of the rotor 20. If desired, the comparator 334 may be replaced by a proportional plus gain unit together with a pulse-width modulator for developing appropriate control signals for the switches Q2 and Q3 (and, if used, the switches Q4 and Q5).

During operation in the generating mode, the switch 328 is moved to the position opposite that shown in FIG. 4, and hence the exciter inverter 102 receives the output of a voltage regulator 343.

Figure 8:
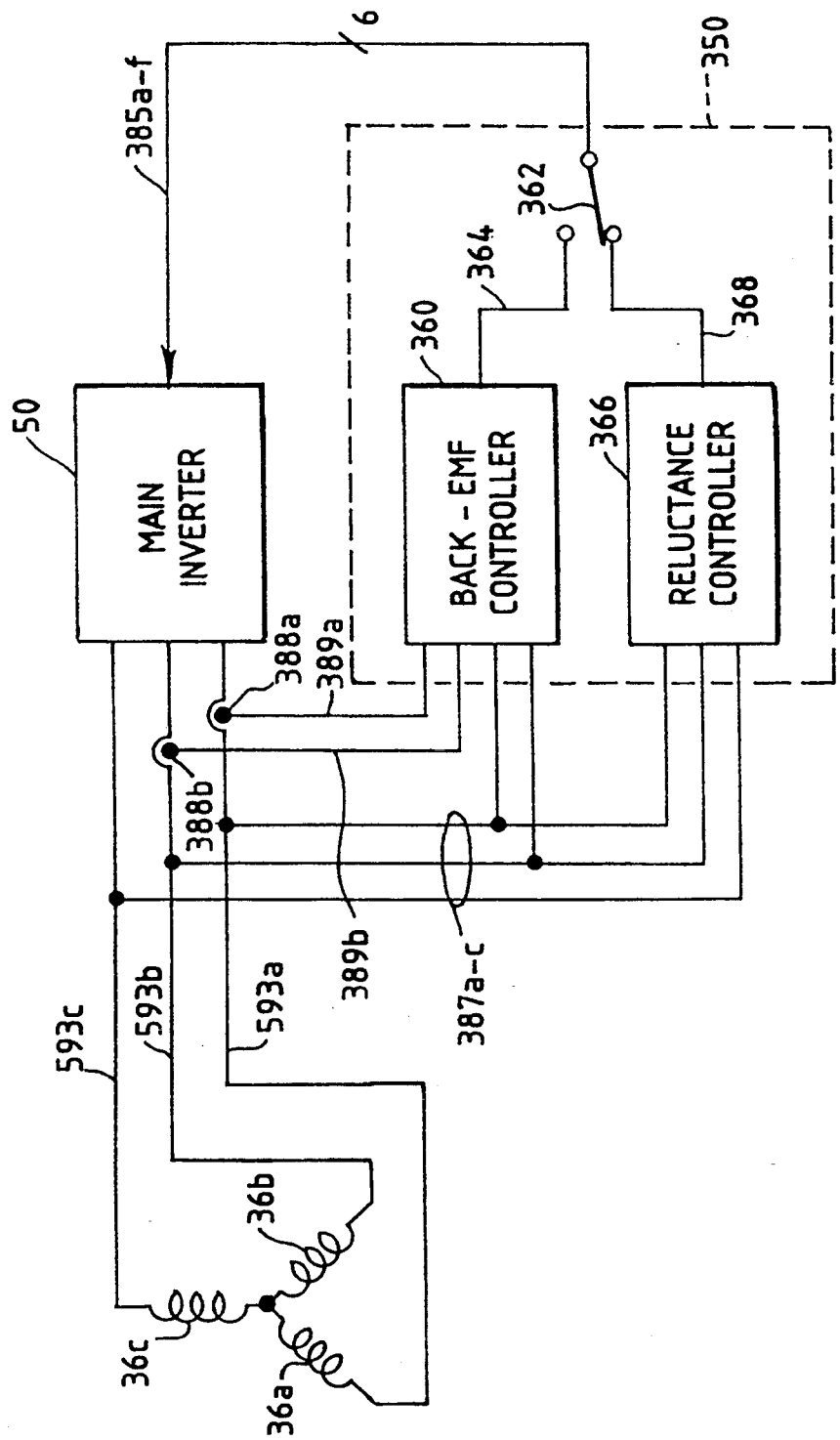
FIG. 8 comprises a combined block and schematic diagram of a set of armature windings, an inverter and a control for operating the main inverter.

FIG. 8 illustrates a block diagram of an alternate embodiment of a control 350 for operating the main inverter 50. The control 350 includes a back-EMF controller 360, a switch 362 coupled to the back-EMF controller 360 by a set of lines 364 and a reluctance controller 366 coupled to the switch 62 by a set of lines 368.

During operation in the starting mode, commutation or inverter drive signals are provided to the main inverter 50 over lines 385a-385f based on either the differential reluctance between the windings 36a-36c or the back EMF produced in the generator 10.

More specifically, during an initial portion of the starting mode, when the rotor 20 is at low speed and the magnitude of the back EMF generated in the windings 36a-36c is relatively small, the commutation signals are generated by the reluctance controller 366, and the switch 362 occupies the position shown in FIG. 8 to provide the commutation signals to the main inverter 50.

When a rotor speed threshold is reached and the magnitude of the back EMF is sufficiently large, the switch 362 is switched to connect the lines 364 to the main inverter 50 so that the commutation signals generated by the back-EMF controller 360 are used to drive the inverter 50.

The point at which the switch 362 is switched may be determined in a number of ways, such as when the magnitude of the back EMF reaches a predetermined threshold and/or when the rotor 20 reaches a predetermined rotational speed.

Figure 9:
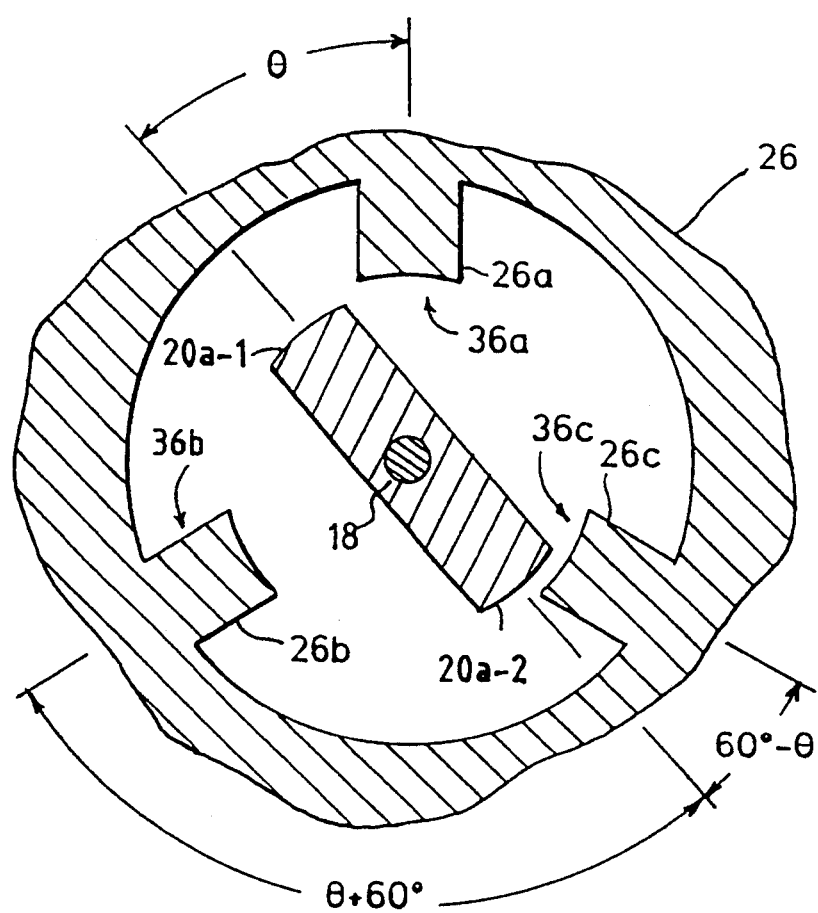
FIG. 9 comprises a simplified sectional view of the main generator portion of the generator shown in FIG. 1.

The reluctance controller 366 and its theory of operation is described in detail below in connection with FIGS. 9-16. Referring to FIG. 9, a cross section of a portion of a simplified version of the stator 26 and the rotor 20 are shown. The three phase windings 36a-36c are wound about stator poles 26a-26c while the field winding 34 is wound about a rotor pole 20a.

The rotor pole 20a has a first end 20a-1 and a second end 20a-2. As shown in FIG. 9, the first rotor end 20a-1 is aligned at an angle $\theta$ with respect to the phase winding 36a; the second rotor end 20a-2 is aligned at an angle $\theta + 60°$ with respect to the second phase winding 36b; and the second rotor end 20a-2 is aligned at an angle $60° - \theta$ with respect to the third phase winding 36c.

The reluctance, or magnetic path length, between various pairs of the three phase windings 36a-36c varies as a function of rotor position in accordance with the following equations:

$$R_{ac} = K_1 + K_2 \cos\theta \cos(60° - \theta), \quad [1]$$

$$R_{ab} = K_1 + K_2 \cos\theta \cos(\theta + 60°), \quad [2]$$

where $R_{ac}$ is the reluctance between the phase windings 36a, 36c, $R_{ab}$ is the reluctance between the phase windings 36a, 36b, $K_1$ is a first constant, $K_2$ is a second constant, and $\theta$ is the angle defined in FIG. 9.

The differential reluctance between various pairs of the three phase windings 36a-36c also varies as a function of rotor position. The differential reluctance is the difference between the reluctance between a first pair of windings and a second pair of windings. For example, the differential reluctance between phase windings 36b, 36c, referred to herein as $R_{b-c}$, is the difference between $R_{ab}$ and $R_{ac}$. It should be appreciated that the differential reluctance $R_{b-c}$ is zero when the rotor 20 is vertically aligned in FIG. 9. From equations [1] and [2] above, the differential reluctance $R_{b-c}$ is as follows:

$$R_{b-c} = R_{ab} - R_{ac} \quad [3]$$

$$R_{b-c} = K_1 + K_2 \cos\theta \cos(\theta + 60°) - K_1 - K_2 \cos\theta \cos(60° - \theta) \quad [4]$$

$$R_{b-c} = K_2[\cos\theta \cos(\theta + 60°) - \cos\theta \cos(60° - \theta)] \quad [5]$$

Equation [5] above can be further simplified to show that the differential reluctance $R_{b-c}$ is proportional to sin $2\theta$. The differential reluctances $R_{a-c}$ and $R_{a-b}$ can be shown to be proportional to sin $2(\theta - 60°)$ and sin $2(\theta + 60°)$, respectively.

Figure 10A:
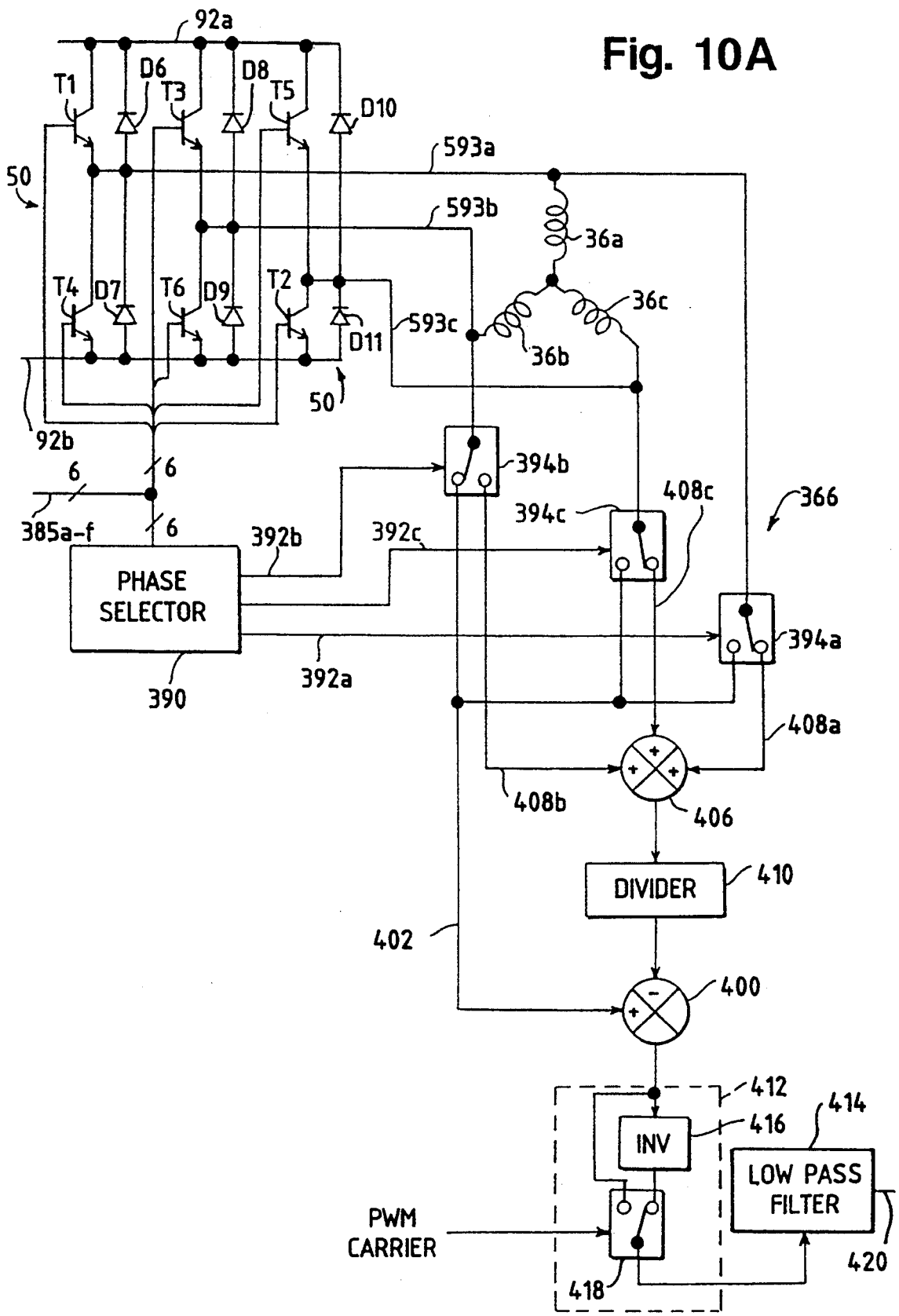
FIGS. 10A and 10B when joined at the similarly number lines, together comprise a combined block and schematic diagram illustrating in greater detail the elements shown in FIG. 8.

FIG. 10A illustrates the main inverter 50 when it is connected to the phase windings 36a-36c during the starting mode and a portion of the reluctance controller 366 which generates a rotor position signal based on the differential reluctance between successively selected pairs of phase windings 36a-36c. The inverter 50 includes six controllable transistor power switches T1 through T6 and six flyback diodes D6-D11 connected in a bridge configuration. The actuation of the power switches T1-T6 is controlled by the inverter drive signals provided via the lines 385a-385f, which signals are shown as waveforms WT1-WT6 in FIG. 11. The positive portions of the waveforms WT1-WT6 may be pulse-width modulated (not shown) by a PWM carrier signal having a much higher frequency than the fundamental frequency of the waveforms WT1-WT6.

The reluctance controller 366 includes a phase selector 390 which also receives the six drive signals WT1-WT6 on the lines 385a-385f and generates therefrom three switch actuator signals on three lines 392a-392c which are used to selectively activate three switches 394a-394c, each of which has an input connected to one of the phase windings 36a-36c. Each of the switches 394a-394c has a first output, shown at the bottom left portion of each switch, which is connected to the noninverting input of a summing amplifier 400 via a line 402. Each of the switches 194a-194c has a second output, shown at the bottom right portion of each switch, which is connected to one of three noninverting inputs of a summing amplifier 406 via one of three lines 408a-408c.

Figures 11, 13:
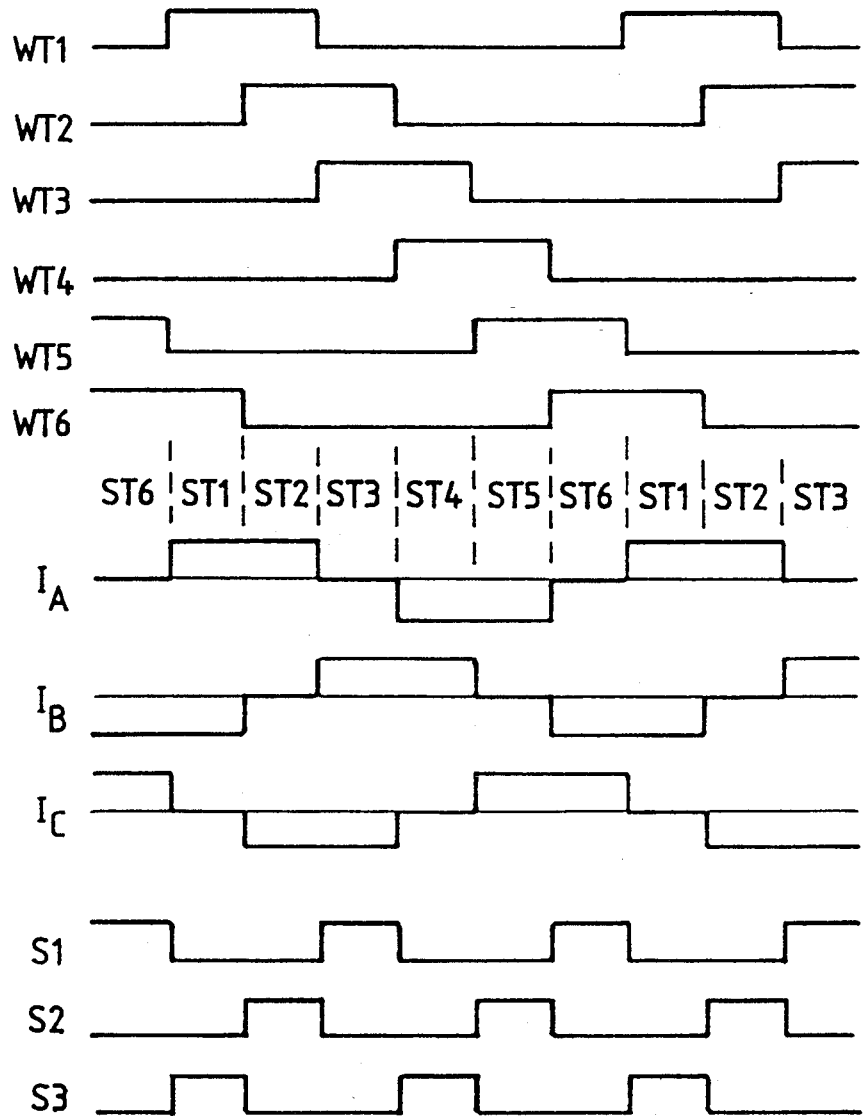

At any given time during the starting mode of operation, there is current flowing through exactly two of the three phase windings 36a-36c, with the third phase winding having no current passing therethrough, or being "unenergized." The currents passing through the phase windings 36a-36c are shown represented as $I_A$, $I_B$, $I_C$, respectively, in FIG. 11.

The phase selector 390 generates the switch actuator signals on the lines 392a-392c so that the voltage generated on the unenergized phase winding, resulting from transformer coupling of such winding to the energized phase windings, is provided to the noninverting input of the summing amplifier 400. This is accomplished by causing the switch 394 connected to the unenergized phase winding to connect its input to the output shown at the bottom left portion of the switch.

If the phase winding to which a switch 394 is connected is energized, the switch input is connected to the output shown at the bottom right portion of the switch, so that only the voltages on the two energized phase windings are provided to the noninverting inputs of the summing amplifier 406.

The switch positions as shown in FIG. 10A occur when the phase winding 36b is unenergized and the phase windings 36a, 36c are energized. The switch actuator signals generated by the phase selector 390 on the lines 392a-392c are designated S1-S3, respectively, in FIG. 11 and are shown with respect to the waveforms WT1-WT6 from which they are generated. The switch actuator signal S1 has a high value when neither waveform WT1 nor WT4 has a high value; the signal S2 has a high value when neither waveform WT3 nor WT6 has a high value; and the signal S3 has a high value when neither waveform WT2 nor WT5 has a high value.

The switches 394a-394c are repeatedly switched, as described above, so that the voltage on the unenergized winding is always provided to the noninverting input of the summing amplifier 400 via the line 402 and the voltages on the energized phase windings are always provided to the summing amplifier 406. The amplifier 406 sums the voltages of the two energized windings, and the sum is provided to a divider 410 which divides the sum by the number of energized phase voltages used to generate the voltage sum, which in this case is two, to generate an average phase voltage signal.

The voltage on the unenergized phase winding will have a relatively large DC component and a relatively small AC component with a phase or envelope representative of rotor position. For example, if the voltage difference between the lines 92a and 92b is 270 volts, the DC component of the unenergized phase voltage is approximately 135 volts, and the average of the voltages of the two energized phase windings is approximately 135 volts. The relatively small AC component of the unenergized phase voltage might be one volt peak-to-peak.

In order to extract the small AC component of the unenergized phase voltage, which contains the information regarding the angular position of the rotor 20 with respect to the stator 26, the average phase voltage signal generated by the divider 410 is provided to the inverting input of the summing amplifier 400, where it is subtracted from the unenergized phase voltage, resulting in the AC component of the unenergized phase voltage which is representative of rotor position.

As previously noted, the positive portions of the pulses of waveforms WT1–WT6 may be pulse-width modulated. As a result, the rotor position signal generated by the summing amplifier 400 has a frequency and phase the same as the PWM carrier frequency, but the envelope of the signal varies at a much lower frequency with a phase which is representative of rotor position.

To extract the lower frequency envelope from the rotor position signal, the output of the summing amplifier 400 is provided to a synchronous demodulator circuit comprising a multiplier 412 and a low pass filter 414. The multiplier 412 comprises a logical inverter 416 and a two-input switch 418. A first input of the switch 418 is connected to receive the rotor position signal from the amplifier 400, and a second output of the switch 418 is connected to receive an inverted rotor position signal from the inverter 416. The switch 418 is switched at the frequency of the PWM carrier signal to alternately provide at its output the uninverted and inverted rotor position signal. This particular multiplier circuit 412 is used in the case of a square-wave PWM carrier signal. Other types of multiplier circuits and synchronous demodulator circuits could instead be used.

Figure 10B:
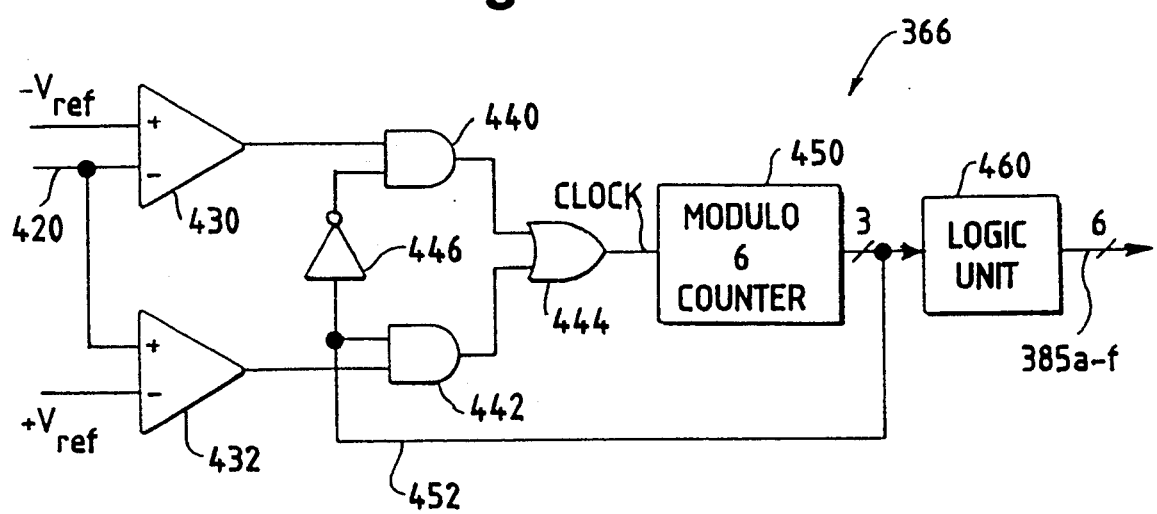

The demodulated rotor position signal is generated on a line 420 and provided to a portion of the reluctance controller 366, shown in FIG. 10B, which converts the rotor position signal into a clock signal and generates from that clock signal the six drive signals WT1–WT6 for controlling the transistor power switches $T_1$–$T_6$ of the main inverter 50. Referring to FIG. 10B, the rotor position signal on the line 420 is provided to the negative input of a first comparator 430 and the positive input of a second comparator 432. The first comparator 430 determines when the magnitude of the rotor position signal is more negative than a predetermined negative voltage $-V_{ref}$ and the second comparator 432 determines when the magnitude of the rotor position signal is greater than a predetermined positive voltage $+V_{ref}$.

The clock signal is generated from the output of the comparators 430, 432 by a 1-of-2 data selector comprising a pair of AND gates 440, 442, an OR gate 444, and an inverter 446. A first binary data select signal is provided to the AND gate 442 via a line 452 and a second binary data select signal is provided to the AND gate 440 via the inverter 446 connected to the line 452. The data select signals, which at all times are complemented with respect to each other, are generated from the least-significant bit (LSB) of a counter 250 so that the data select signals values switch each time the count of the counter increases by one.

Figure 12:
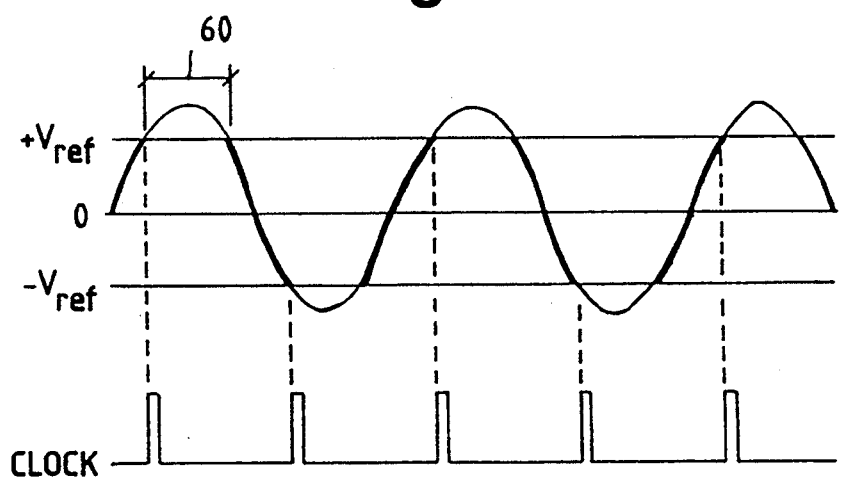
FIGS. 11 and 12 comprise waveform diagrams and FIG. 13 comprises a state table illustrating the operation of the control of FIGS. 10A and 10B.

The rotor position signal, the $+V_{ref}$ and $-V_{ref}$ signals, and the clock signal generated by the OR gate 444 are shown in FIG. 12. The rising edge of each pulse of the clock signal is triggered alternately by the magnitude of the rotor position signal reaching the predetermined $+V_{ref}$ and $-V_{ref}$ signals. The rising edge of each clock pulse triggers the counter 450 to increase the count, causing the binary value of the least significant bit to change and the magnitudes of the data select signals to switch high and low states. As a result, the AND gate 440 or 442 that generated the high binary value (when either the $+V_{ref}$ or $-V_{ref}$ magnitude was exceeded) is no longer selected, and the clock signal magnitude falls to zero shortly after each rising edge.

The actual shape of the rotor position signal generated on the line 420 approximates the waveform produced by horizontally joining together the bold portions of the sinusoidal signal shown in FIG. 12, which fall between the $+V_{ref}$ and $-V_{ref}$ thresholds, so that an approximate triangular waveform is created. The magnitude of the actual rotor position signal does not substantially exceed the $+V_{ref}$ and $-V_{ref}$ thresholds because, when the rotor position signal reaches each threshold, the drive signals on the lines 385a–385f cause the rotor 20 to be advanced 60 electrical degrees shortly thereafter. The magnitudes of the $+V_{ref}$ and $-V_{ref}$ thresholds should be selected so that the horizontal "spacing" between the bold portions of the rotor position signal corresponds to 60 electrical degrees, as shown in FIG. 12. The magnitudes of the $+V_{ref}$ and $-V_{ref}$ thresholds may be selected to be a predetermined percentage of the voltage across the DC link conductors 92a, 92b, the percentage being based upon generator parameters.

In the preferred embodiment, the counter 450 is a modulo-six counter having a three-bit binary output. The output of the counter 450 is provided to a logic unit 460 which generates the six transistor drive signals WT1–WT6 in accordance with the counter output and as seen in the table shown in FIG. 13.

When the generator 10 is initially started, the counter 450 can be initialized with one of six initial counts so that an initial set of drive signals is generated on the lines 385a–385f. If the counter 450 does not increment within a predetermined period of time, meaning that the initial set of drive signals did not cause any torque to be produced by the rotor 20, the counter 450 can be loaded with another one of the six initial counts until the correct count is loaded. The loading of the initial counts could be performed by a digital signal processor coupled to the counter 450.

The 1-of-2 selector, the counter 450, the logic unit 460, and/or other features of the described embodiment could be implemented by a digital signal processor or other processor executing a computer program.

Figure 14:
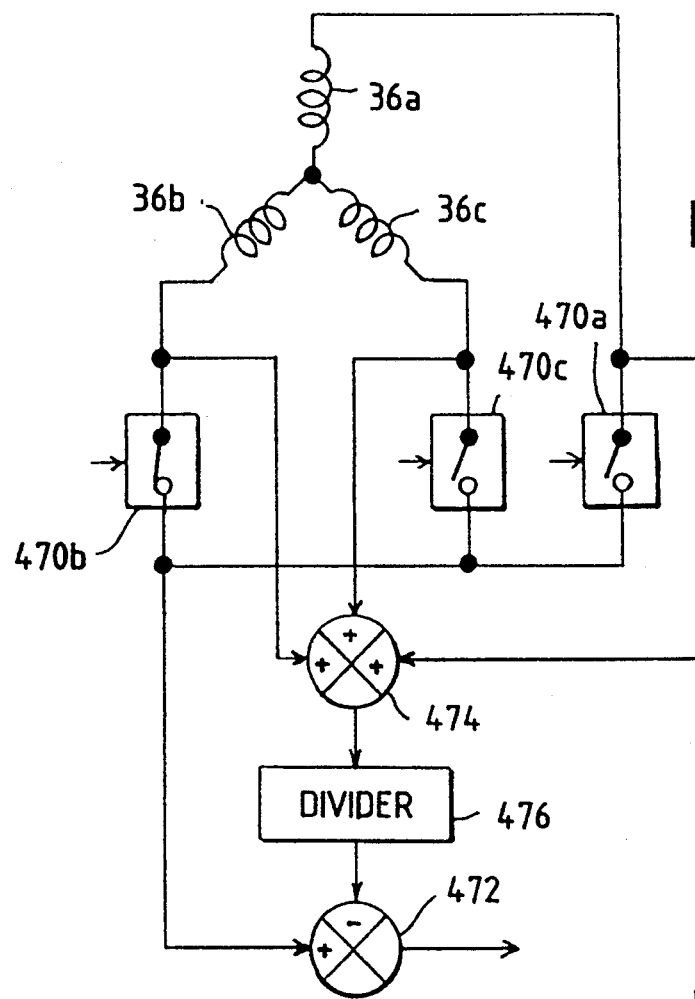
FIGS. 14–16 are combined block and schematic diagrams illustrating alternative embodiments of the inverter control shown in FIGS. 10A and 10B.
Figure 15:
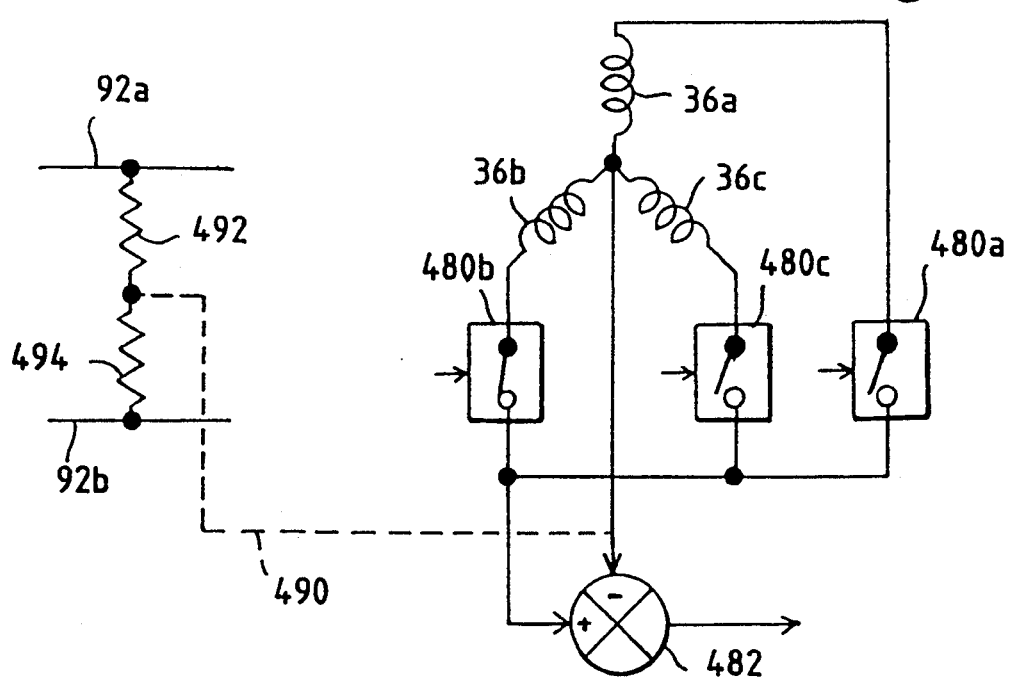

A portion of a alternative embodiment is shown in FIG. 14. In this embodiment, the phase windings 36a–36c are connected to three switches 470a–470c, respectively, each of which has a single output connected to the noninverting input of a summing amplifier 472. The switches 470a–470c are switched such that the unenergized phase winding is connected to the noninverting input of the summing amplifier 472. Each of the phase windings 36a–36c is also connected to a respective noninverting input of a summing amplifier 474, which generates a signal representing the sum of the phase winding voltages. The phase voltage sum is provided to a divider 476, which divides the phase voltage sum by three to generate a signal representing the average phase voltage. The average phase voltage is provided to the inverting input of the amplifier 472 whereby that voltage is subtracted from the voltage at the unenergized phase winding. The output of the summing amplifier 472 is provided to the multiplier circuit 412 of FIG. 10A. A portion of a further alternative embodiment is shown in FIG. 15. In this embodiment, the phase windings 36a–36c are connected to three switches 480a–480c, respectively, which are switched so that the unenergized phase winding is connected to the noninverting input of a summing amplifier 482. The junction of the phase windings 36a–36c is connected to the inverting input of the amplifier 482 so that the voltage at the junction of the windings is subtracted from the voltage at the unenergized phase winding. The output of the summing amplifier 482 is provided to the multiplier circuit 412 of FIG. 10A.

As a further alternative, shown in the left-hand portion of FIG. 15, instead of connecting the inverting input of the amplifier 482 to the junction of the phase windings 36a–36c, the inverting input could be coupled, via dotted line 490, to a junction between a pair of identical resistors 492, 494 connected across the DC link conductors 92a, 92b so that the inverting input of the amplifier 482 receives a signal representing one-half the voltage across the DC link conductors 92a, 92b.

Figure 16:
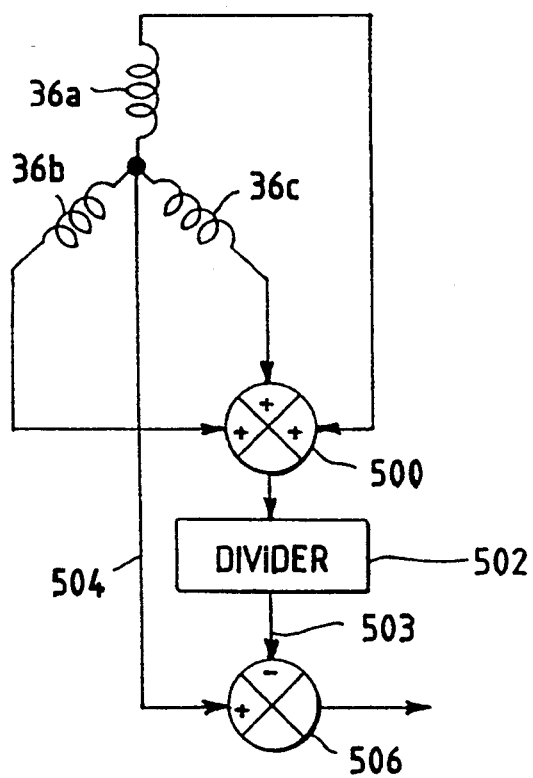

A portion of a yet another alternative embodiment is illustrated in FIG. 16. In this embodiment, rotor position is detected based on inductance sensing instead of differential reluctance sensing. The voltages on all three phase windings 36a–36c are provided to a summing amplifier 500, which generates a signal representing the voltage sum. The voltage sum signal is provided to a divider 502, which divides the voltage sum signal by three to generate an average phase voltage signal on a line 503. The voltage at the junction of the wye-connected windings 36a–36c is provided via a line 504 to the noninverting input of a summing amplifier 506. The summing amplifier 506 generates a rotor position signal by subtracting the average phase voltage signal on the line 503 from the junction voltage on the line 504. It should be noted that the average phase voltage signal on the line 503 could be generated in other ways. For example, it could be generated by dividing the sum of the voltages on the energized phase windings by two, or it could be generated by dividing the DC link voltage by two.

Figure 17:
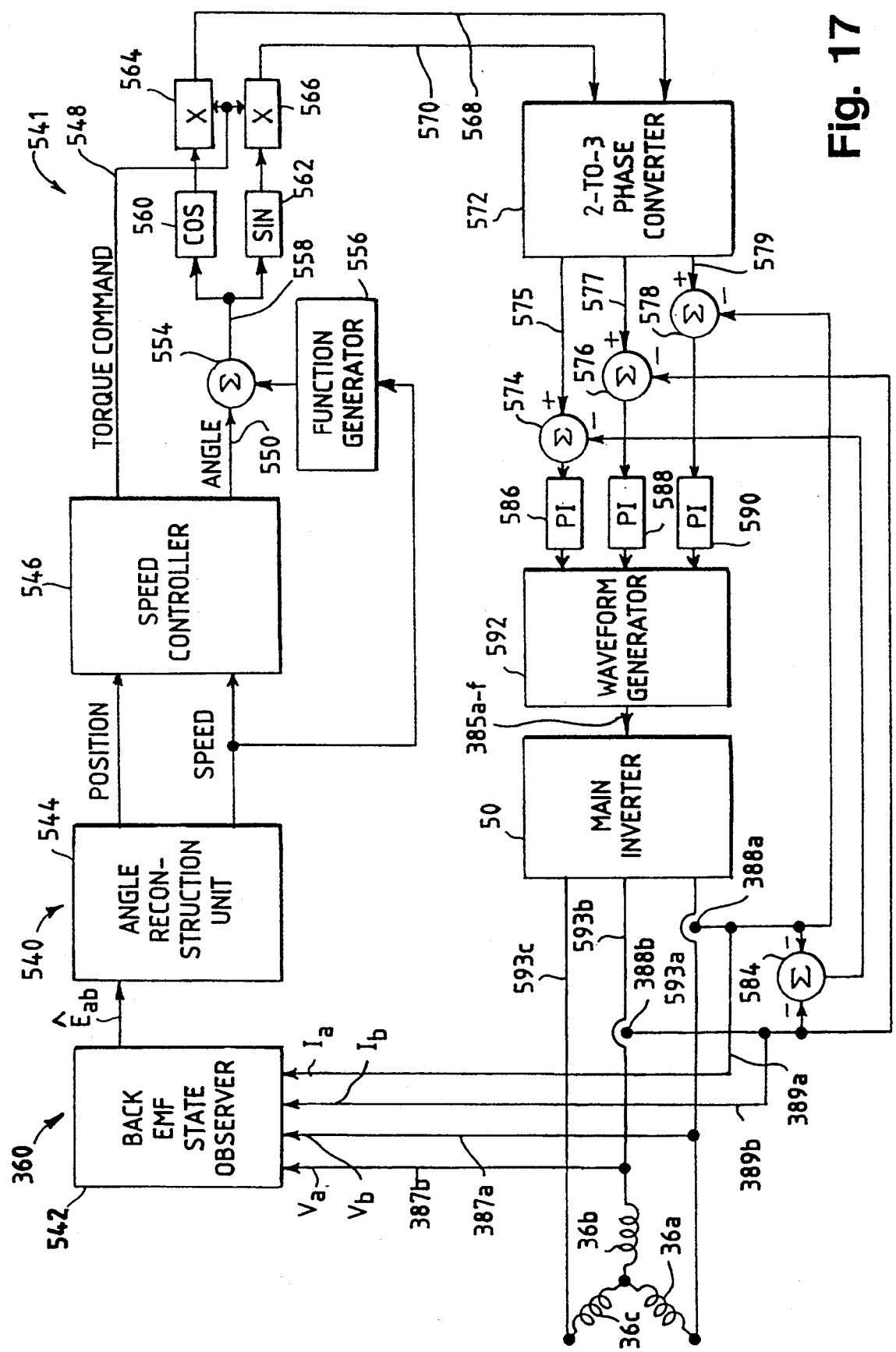
FIG. 17 comprises a combined block and schematic diagram of a further control for operating the main inverter.

The structure and operation of the back-EMF controller 360 is described below in connection with FIGS. 17–23. Referring first to FIG. 17, the back-EMF controller 360 includes a rotor position detector 540 and a starting system control 541 for operating the generator 10 in a starting mode to convert electrical power into motive power. The rotor position detector 540 includes a back EMF state observer 542 and an angle reconstruction unit 544. The back EMF state observer 542 is responsive to the phase voltage signals $V_a$ and $V_b$ on the lines 387a, 387b and the phase current signals $I_a$ and $I_b$ on the lines 389a, 389b and produces a back EMF estimate signal $\hat{E}_{ab}$ indicative of the back EMF voltage. The angle reconstruction unit 544 responds to the back EMF estimate signal $\hat{E}_{ab}$ to develop signals representing the position and speed of the motive power shaft 18 which are delivered to a speed controller 546.

The speed controller 546 develops a torque command signal on a line 548 representing the commanded torque to be produced by the generator 10 and a further signal on a line 550 representing the mechanical position of the motive power shaft 18. The signal on the line 550 is summed with a phase advance signal by a summer 554. The phase advance signal is developed by a function generator 556 and is dependent upon the speed of the motive power shaft 18 as detected by the angle reconstruction unit 544. The function generator 556 provides increasing phase advance as speed increases in a high speed range. The summer 554 develops an electrical angle command signal on a line 558 which is supplied to first and second functional blocks 560, 562 which generate a cosine waveform signal and a sine waveform signal, respectively, each of which has the same frequency as the electrical angle command signal on the line 558.

Second and third multipliers 564, 566 are coupled to the functional blocks 560, 562, respectively, and multiply the outputs thereof with the torque command signal on the line 548. The output signals generated by the multipliers 564, 566 are provided to a 2-to-3 phase converter 572 via a pair of lines 568, 570. The phase converter 572 converts those signals into three-phase sinusoidal current signals which are in turn supplied to three summers 574, 576, and 578 via lines 575, 577, and 579, respectively.

Each of the summers 574, 576, and 578 sums one of the three-phase current signals produced by the phase converter 572 with a signal representing the magnitude of a phase current of the AC power to obtain an error signal. In the case of the summers 576 and 578, the phase current magnitudes are detected by current sensors 388a, 388b while the phase current magnitude for the summer 574 is obtained by a summer 584 which adds (in a negative sense) the magnitudes developed by the current sensors 388a, 388b. The error signals are processed by gain and compensation units 586, 588, and 590, preferably of the proportional-integral type, and are provided to a waveform generator 592 which generates the commutation signals and provides them to the main inverter 50.

The back EMF state observer 542 estimates the back EMF voltage produced by the generator 10 while it is operating in the starting mode. During the starting mode, currents flow in the armature phase windings 36a–36c according to the following current state equation:

$$\frac{d(I_{ab})}{dt} = \frac{1}{L}(V_{ab} - E_{ab} - RI_{ab})$$

Where:
$V_{ab}$ is the line-to-line voltage;
$E_{ab}$ is the line-to-line back EMF voltage across lines 593a and 593b (seen in FIGS. 8, 10A and 17);
$I_{ab}$ is the difference between the current signals $I_a$ and $I_b$ produced by current sensors 388a, 388b, respectively;
L is the armature winding inductance; and
R is the armature winding resistance.

Although the above formula can be implemented by differentiating the currents flowing in the main generator portion armature windings 36a–36c, known differentiation processes are vulnerable to noise. To avoid differentiation, the back EMF state observer 542 is configured as shown in FIG. 18.

Figure 18:
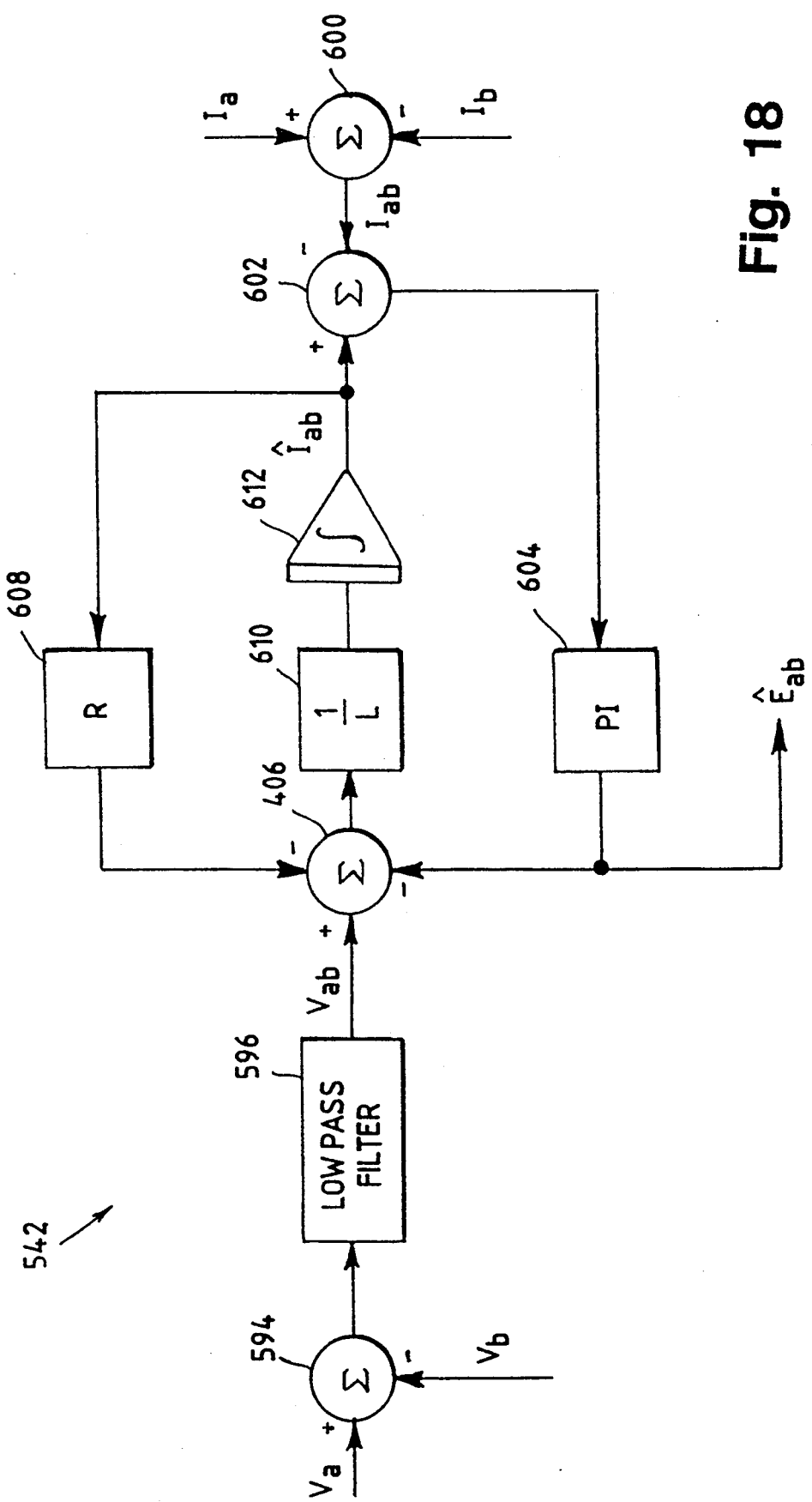
FIG. 18 comprises a block diagram of the back-EMF state observer of FIG. 17.

Referring to FIG. 18, the voltages $V_a$ and $V_b$ appearing at the lines 593a and 593b, respectively, are delivered to a summer 594, an output of which is passed through a low pass filter 596 to produce the line-to-line voltage signal $V_{ab}$. The current signal $I_b$ is subtracted from the current signal $I_a$ by a summer 600 to produce the current magnitude signal $I_{ab}$. The current magnitude signal $I_{ab}$ is delivered to an inverting input of a summer 602 while a current estimate signal $\hat{I}_{ab}$, produced as described below, is delivered to a non-inverting input of the summer 602. The output of the summer 602 is delivered to a conditioner 604, which preferably comprises a proportional-integral type compensator, but which could also comprise a nonlinear controller. The conditioner 604 produces the back EMF estimate signal $\hat{E}_{ab}$ and delivers such signal to an inverting input of a summer 606 and to the angle reconstruction unit 544 of FIG. 17. The current estimate signal $\hat{I}_{ab}$ is delivered to a conditioner 608 preferably comprising a gain unit with a gain value of R and having an output coupled to an inverting input of the summer 606. The summer 606 subtracts the current estimate signal $\hat{I}_{ab}$ as conditioned by the conditioner 608 and the back EMF estimate signal $\hat{E}_{ab}$ from the line-to-line voltage signal $V_{ab}$ developed by the low pass filter 596. An output signal developed by the summer 606 is conditioned by a conditioner 610, preferably comprising a gain unit having a gain value of 1/L, and integrated by an integrator 612 to produce the terminal current estimate signal $\hat{I}_{ab}$.

Although the back EMF state observer 542 is shown implemented by analog components, it should be noted that the back EMF state observer 542 could, instead, be implemented by a microprocessor suitably programmed to perform the functions described above.

Figure 19:
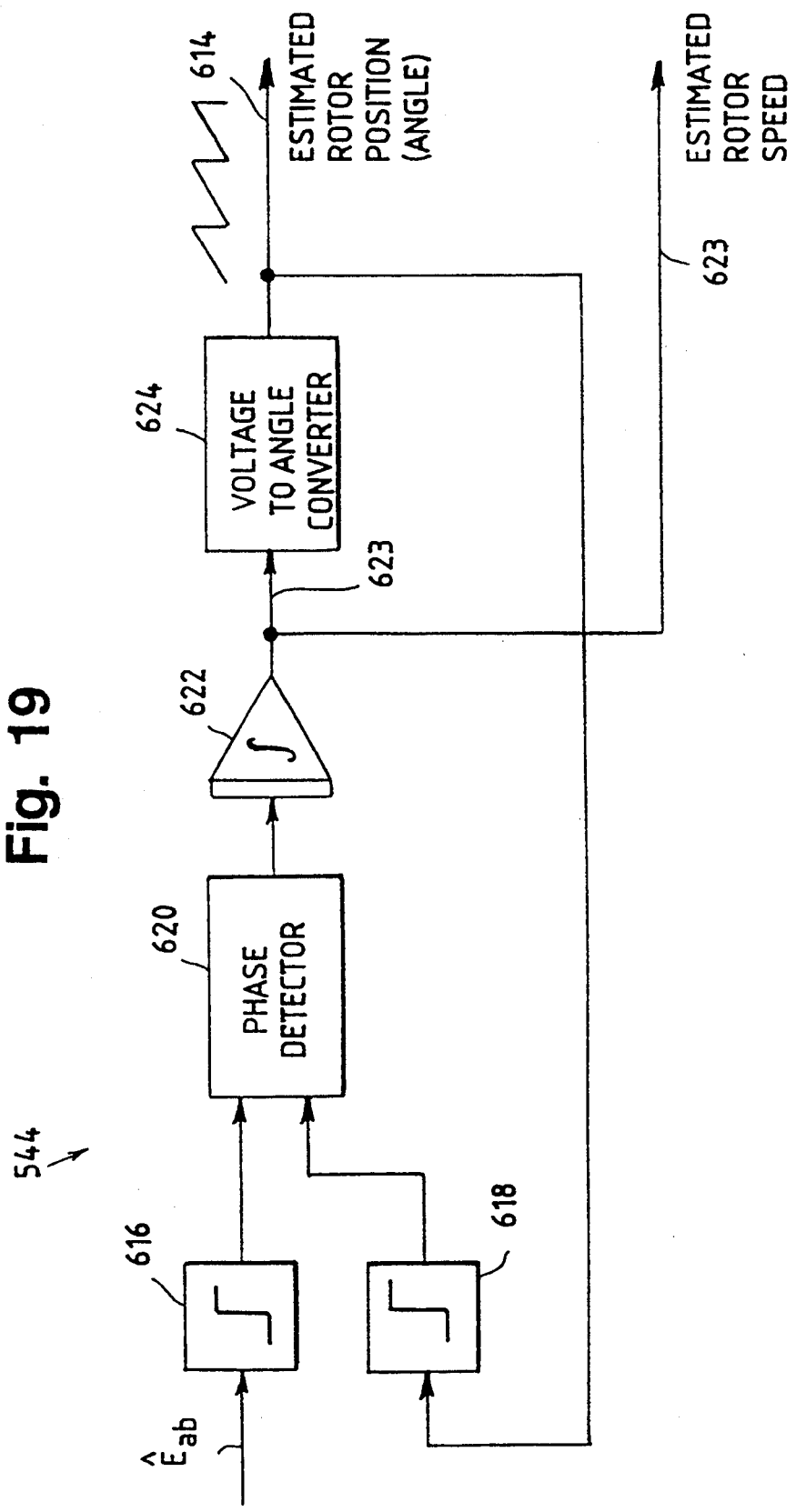
FIG. 19 comprises a block diagram of the angle reconstruction unit of FIG. 17.

Referring now to FIG. 19, a first embodiment of the angle reconstruction unit 544 is shown in greater detail. This embodiment comprises a phase-locked loop which responds to the back EMF estimate signal $\hat{E}_{ab}$ to develop the indication of the angular position of the motive power shaft 18 at an output 614. Zero crossing detectors 616 and 618 detect the zero crossings of the back EMF estimate signal $\hat{E}_{ab}$ and the angular position indication developed at the output 614 to produce square wave signals which are delivered to a phase detector 620. The phase detector 620 compares the outputs of zero crossing detectors 616 and 618 to produce an error signal indicative of the phase difference between the back EMF estimate signal $\hat{E}_{ab}$ and the angular position indication. The integrator 622 integrates the error signal and the integrated error signal is passed via a line 623 to a voltage-to-angle converter 624, which preferably comprises a voltage-controlled oscillator. The voltage-to-angle converter 624 produces a ramp signal having a magnitude that is indicative of the angular position of the motive power shaft 18.

The signal generated on the line 623, which is generated by the integration of the phase errors detected by the phase detector 620, has a magnitude that increases with frequency. Thus, the signal on the line 623 is representative of the estimated speed of the motive power shaft 18.

FIG. 20 illustrates a first embodiment of the voltage-to-angle converter 624 shown schematically in FIG. 19. The converter 624 includes a voltage-to-frequency (V/F) converter 625 connected to receive the speed signal output by the integrator 622 (FIG. 19). Based on the magnitude of the speed signal, the V/F converter 625 generates an output signal of a particular frequency that is provided to the count input of a counter 626. The count signal generated by the counter 626 is provided to a digital-to-analog (D/A) converter 627, which generates a ramp signal having a magnitude related to rotor position. In operation, as the magnitude of the speed signal on the line 623 increases, the frequency of the signal generated by the V/F converter 625 increases, thus increasing the rate at which the counter 625 counts and increasing the frequency of the ramp signal generated by the D/A converter 27. Preferably, the counter 626 is of the modulo type and hence automatically resets when its count reaches a predetermined value, thus causing the downward portions of the ramp signal to occur automatically.

FIG. 21 illustrates a second embodiment of the voltage-to-angle converter 624 shown schematically in FIG. 19. The converter 624 includes an integrator 628 connected to receive the speed signal output by the integrator 622 (FIG. 19). The integrator 628 generates a ramp signal having a magnitude related to rotor position. The integrator 628 is periodically reset by the output of a level comparator 629 when the integrator output reaches a predetermined level, which causes the downward sloping portions of the ramp signal.

Figure 22:
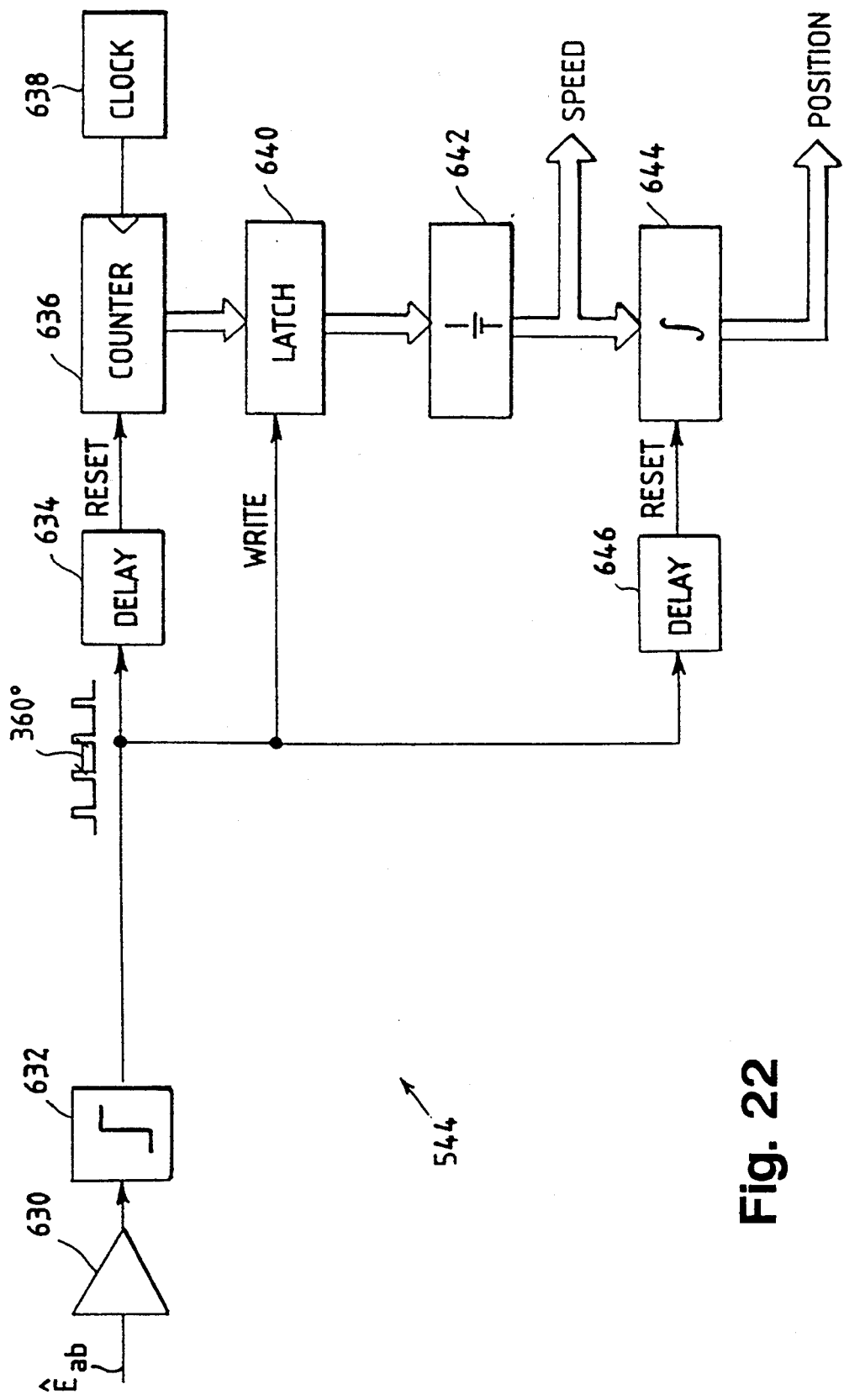
FIG. 22 comprises an alternative embodiment for the angle reconstruction unit of FIG. 17.

Referring now to FIG. 22, an alternative embodiment of the angle reconstruction unit 544 is shown in greater detail. The back EMF estimate signal $\hat{E}_{ab}$ is supplied to an interface amplifier 630 and a zero crossing detector 632 which produces a narrow pulse each time the $\hat{E}_{ab}$ signal rises upwardly through the zero axis, which occurs every 360 electrical degrees. The output of the zero crossing detector 632 is provided to a delay circuit 634 which in turn provides a reset signal to a counter 636. The counter 636 accumulates clock pulses produced by a clock 638 and is reset every 360° of the back EMF estimate signal $\hat{E}_{ab}$. The output of the counter 636 represents the time that elapses between consecutive pulses produced by the zero crossing detector 632. The falling edge of each pulse comprises a write command to a latch 640 which latches the output of the counter 636. The output of the latch 640 is inverted, i.e., the reciprocal thereof is calculated, by a circuit 642, which generates a signal having a magnitude that is representative of the speed of the motive power shaft 18, and thus of the rotor 20.

The speed signal generated by the circuit 642 is supplied to an integrator 644, which integrates the speed signal to generate a signal having a magnitude that is representative of the angular position of the motive power shaft 18, and thus of the rotor 20. The integrator 644 is reset every 360° of rotation of the rotor 20 via a reset signal generated by a delay circuit 646 connected to receive the 360°-spaced pulses generated by the zero crossing detector 632 so that a ramp-shaped position signal is generated.

Figure 23:
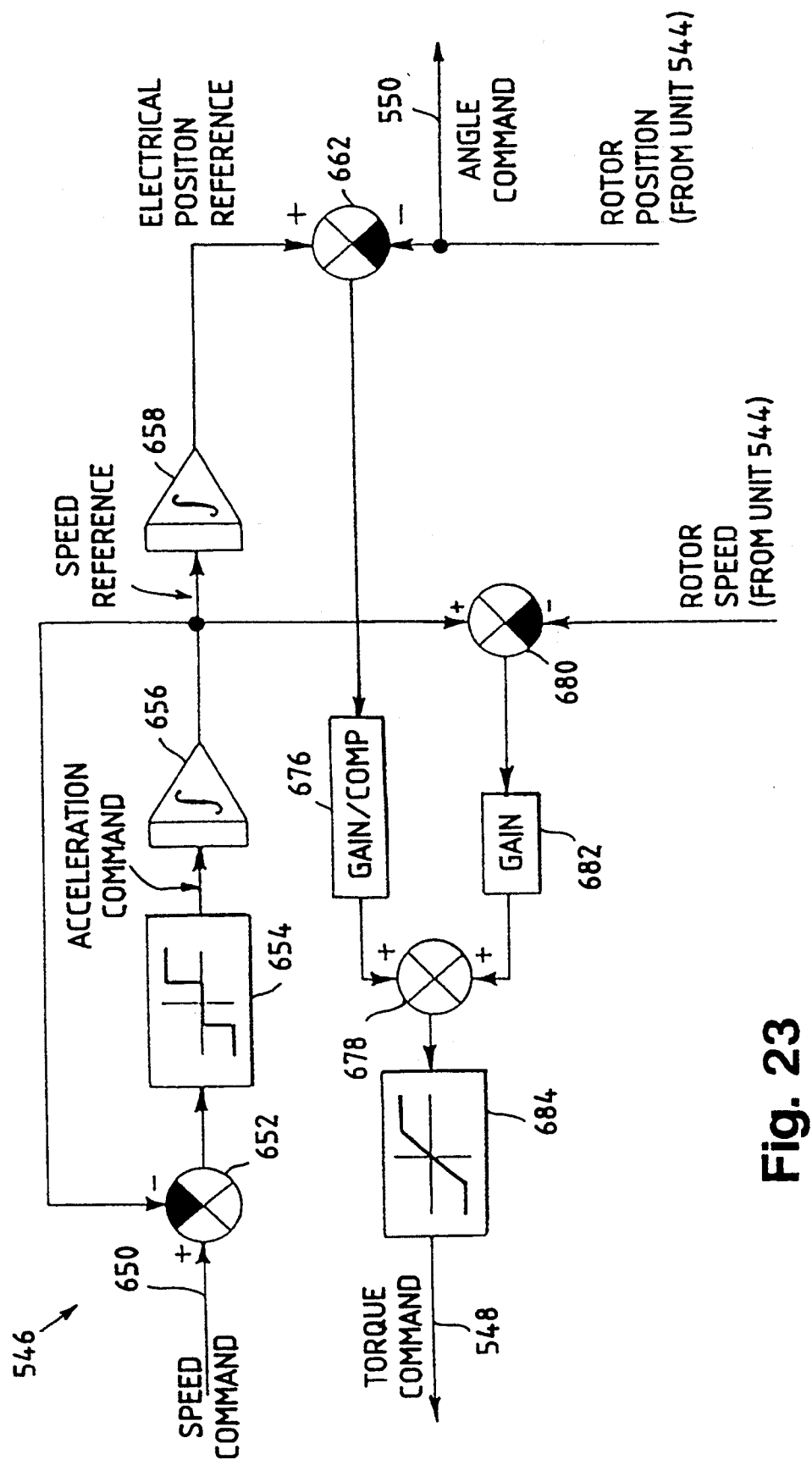
FIG. 23 comprises a block diagram of the speed controller of FIG. 17.

FIG. 23 illustrates in greater detail the speed controller 546 shown schematically in FIG. 17. In response to the rotor speed and rotor position signals generated by the angle reconstruction unit 544, the speed controller 546 generates an angle command and a torque command.

As seen in FIG. 23, a speed command signal is provided via a line 650 to the non-inverting input of a summer 652. The speed command may comprise a step voltage from a first voltage to a second, higher voltage or may comprise any other type of waveform as desired. The output of the summer 652 is coupled to a function generator 654 which develops an acceleration command signal which is, in turn, integrated by an integrator 656 to produce a speed reference signal. The speed reference signal is fed back to an inverting input of the summer 652, and hence the elements 652, 654, and 656 comprise a closed-loop circuit.

The speed reference signal is integrated by an integrator 658 to develop a position reference signal which is provided to the non-inverting input of a summer 662. The rotor position signal from the angle reconstruction unit 544 of FIG. 17 is also provided to an inverting input of the summer 662. The summer 662 produces a position error signal indicative of the difference between the derived position reference signal and the actual rotor position developed by the angle reconstruction unit 544. The position error signal is provided to a gain and compensation unit 676 which is preferably of the proportional-integral type, and is supplied to a first input of a summer 678.

A speed error signal is developed by a summer 680 which subtracts the rotor speed signal developed by the angle reconstruction unit 544 of FIG. 17 from the speed reference signal developed by the integrator 656. The speed error signal is processed by a gain unit 682 and is summed with the output of the gain and compensation unit 676 by the summer 678. A limiter 684 provides limiting for the output of the summer 678 and develops a current limited torque command signal on the line 548 of FIG. 17.

Figure 24:
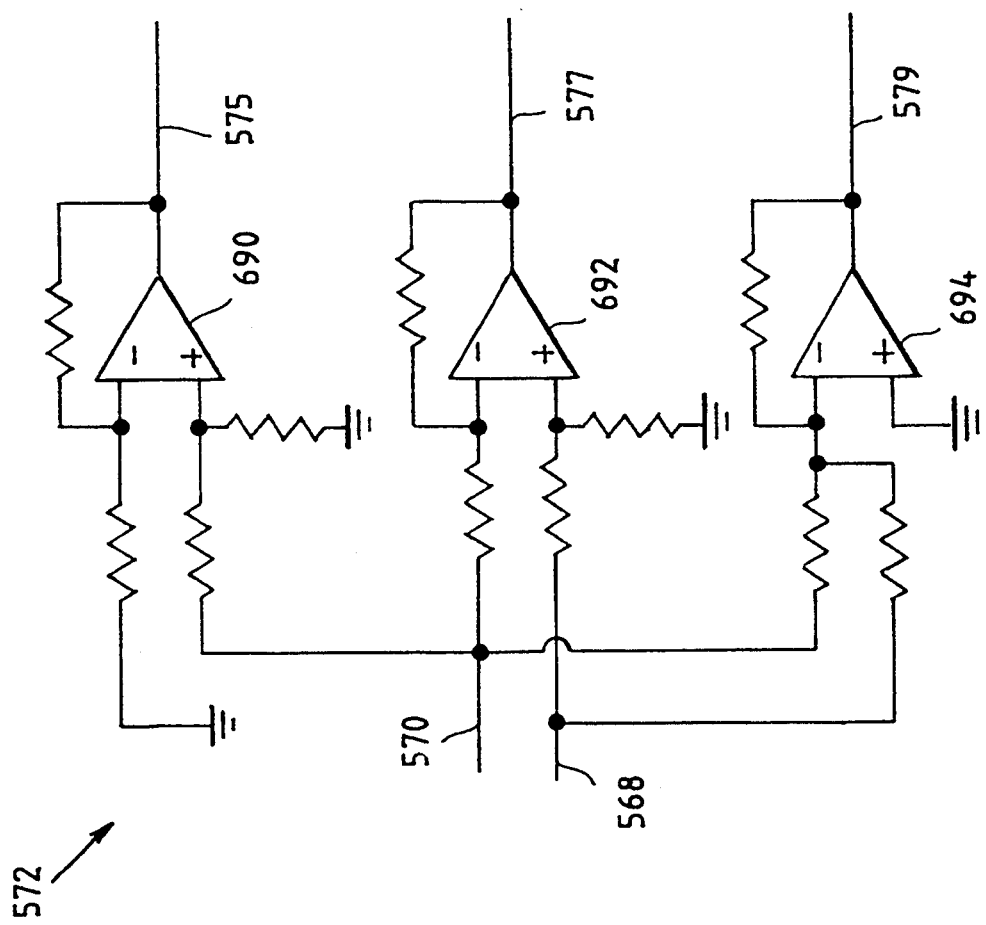
FIG. 24 comprises a schematic diagram of the two-to-three phase converter of FIG. 17.

FIG. 24 illustrates in greater detail the phase converter 572 shown schematically in FIG. 17. The converter 572 includes three operational amplifiers 690, 692, 694 and associated biasing circuitry connected to the lines 568, 570 which generate outputs on the lines 575, 577, 579.

Figure 25:
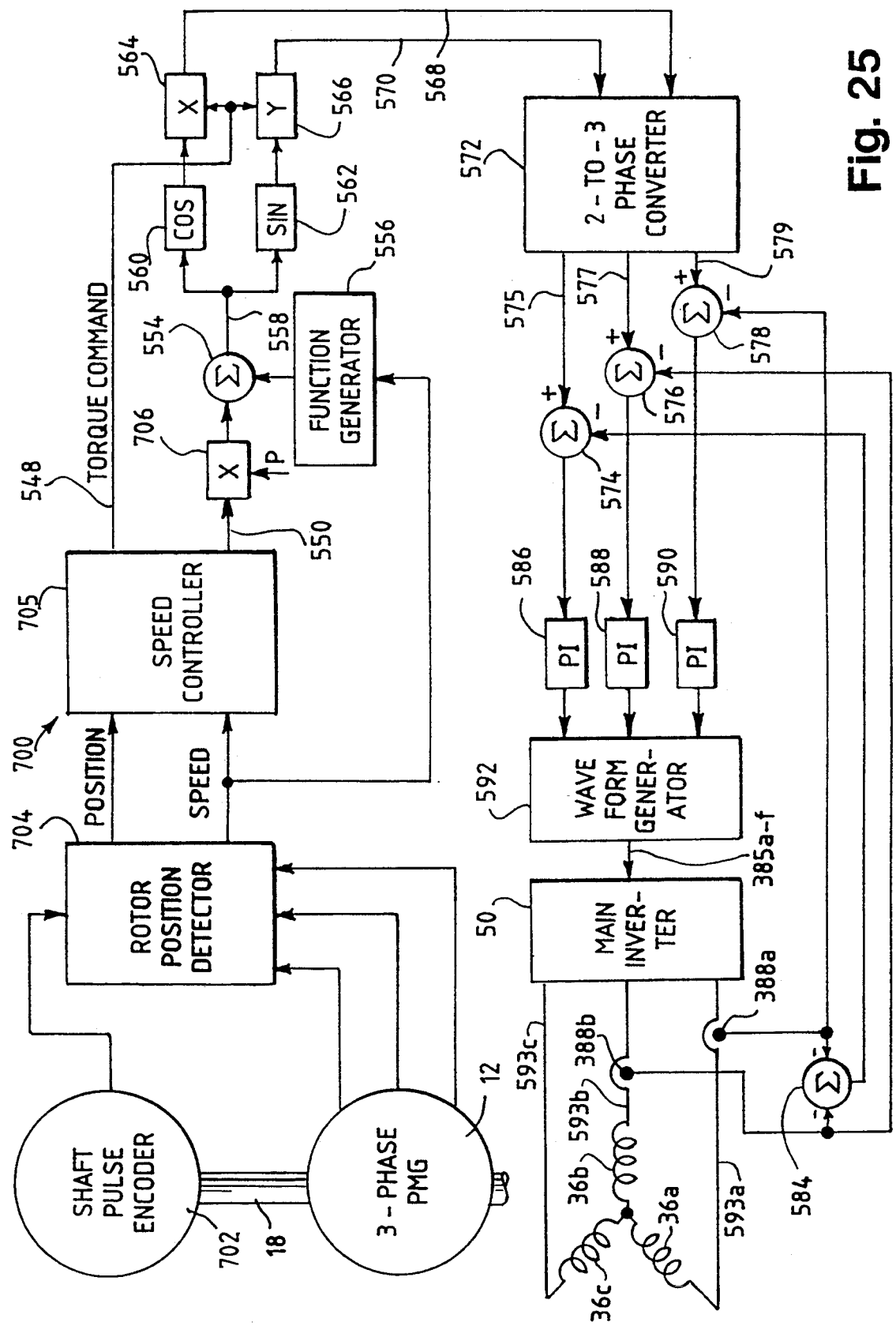
FIG. 25 comprises an alternative embodiment of a control for operating the main inverter.

FIG. 25 illustrates modifications to the controller 360 of FIG. 17 to implement a control 700 according to a further embodiment of the present invention. It should be noted that the control 700 is capable of reliably operating the main inverter 50 regardless of rotor speed, and hence the control 700 can be used in place of the entire control 350 of FIG. 8, if desired, or may be used in place of the controller 360 only. Elements common to FIGS. 25 and 17 are assigned like reference numerals.

The starting system 700 includes a shaft pulse encoder 702 which is mounted on the motive power shaft 18 and which develops a cycle pulse once per revolution of the motive power shaft 18. The shaft pulse encoder 702 may comprise a magnetic pick-up which senses a lobe or other projection of magnetic material mounted on the motive power shaft 18. Alternatively, any other component capable of producing the cycle pulse may be used. Advantageously, the shaft pulse encoder may be simple in design and inexpensive. The phase outputs developed by the armature windings 24a-24c of the PMG 12 and the output of the shaft pulse encoder 702 are supplied to a rotor position detector 704 which develops signals representing the position and speed of the motive power shaft 18 and delivers such signals to a speed controller 705. Like the speed controller 546 of FIG. 17, the speed controller 705 develops the torque command signal on the line 548 representing the commanded torque to be produced by the generator 10 and the further signal on the line 550 representing the mechanical position of the motive power shaft 18. The signal on the line 550 is multiplied by a multiplier 706 with a signal representing the number of pairs of poles of the main generator rotor, and the resulting signal is summed with a phase advance signal by the summer 554. The phase advance signal is developed by the function generator 556 and is dependent upon the speed of the motive power shaft as detected by the rotor position detector 704. As noted previously, the function generator 556 provides increasing phase advance as speed increases in a high speed range. The summer 554 develops an electrical angle command signal on a line 558 which is supplied to the first and second functional blocks 560, 562 described previously.

The balance of the circuitry of FIG. 25 is otherwise identical to that shown in FIG. 17 except that no attempt is made to sense the phase a and phase b voltages and currents for the rotor position detector 704.

Figure 26:
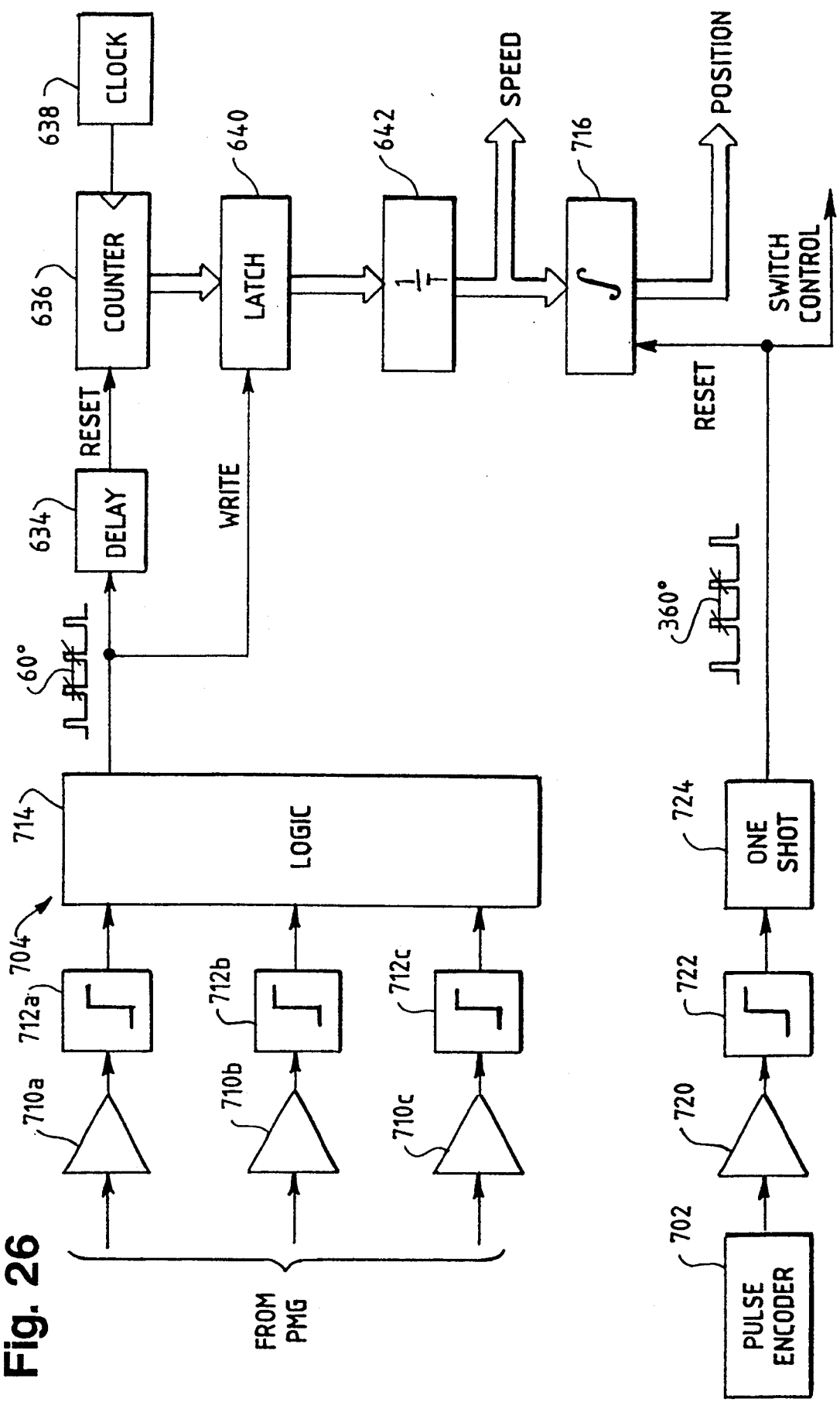
FIG. 26 comprises a block diagram of the rotor position detector of FIG. 25.
Figure 27:
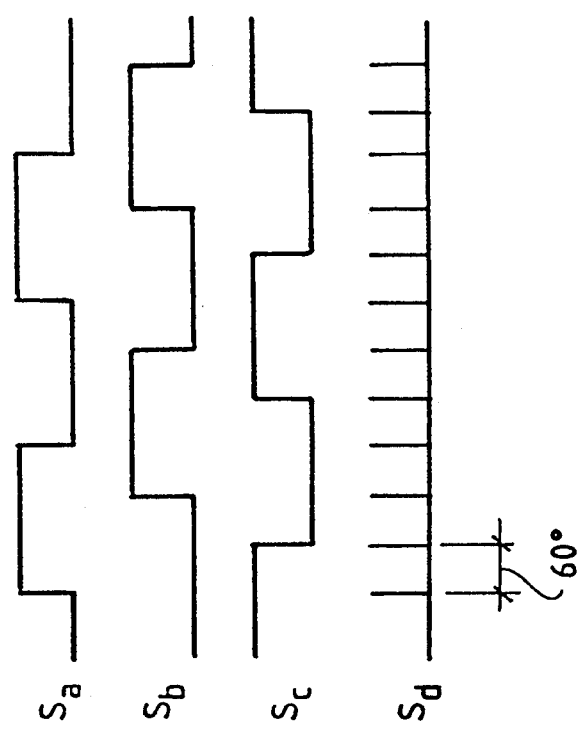
FIG. 27 comprises a series of waveform diagrams illustrating operation of the control of FIG. 26.

FIG. 26 illustrates modifications to the unit 544 of FIG. 22 to implement the rotor position detector 704 wherein elements common to FIGS. 22 and 26 are assigned like reference numbers. The PMG phase outputs are supplied through interface amplifiers 710a-710c and zero crossing detectors 712a-712c to a logic circuit 714. FIG. 27 illustrates the three waveforms $S_a$, $S_b$, and $S_c$ representing the outputs of the zero crossing detectors 712a-712c, respectively. From the waveforms Sa-Sc, the logic circuit 714 develops a signal $S_d$ which, as shown in FIG. 27, consists of a narrow pulse every 60 electrical degrees. The waveform $S_d$ is provided by the logic circuit 714 to the delay circuit 634. As noted above, the delay circuit 634 provides the reset signal to the counter 636 which accumulates clock pulses produced by the clock 638. As also noted above, the counter 636 is periodically reset by the delay circuit 634; however, in contradistinction to the embodiment of FIG. 22, this resetting occurs every 60° with respect to the output waveforms of the PMG 12, and thus every 60° of rotation of the motive power shaft 18. The output of the counter 636 represents the time that elapses between each pulse in the waveform $S_d$. The falling edge of each pulse comprises a write command to the latch 640 which latches the output of the counter 636. The output of the latch 640 is inverted by the circuit 642 to obtain an indication of the speed of the motive power shaft 18. The output of the circuit 642 is supplied to an integrator 716 which integrates the speed signal to generate a signal representative of the position of the motive power shaft 18. The integrator 716 is reset once per full revolution of the motive power shaft 18 by the shaft pulse encoder 702, an interface amplifier 720, a zero crossing detector 722 and a one-shot 724.

Alternatively, instead of the reset signal provided to the integrator 716 being generated from a pulse developed by the shaft pulse encoder 702, the reset signal could be generated by a pulse generated from a sensing coil mounted on the stator of the permanent magnet generator 12.

Figure 28:
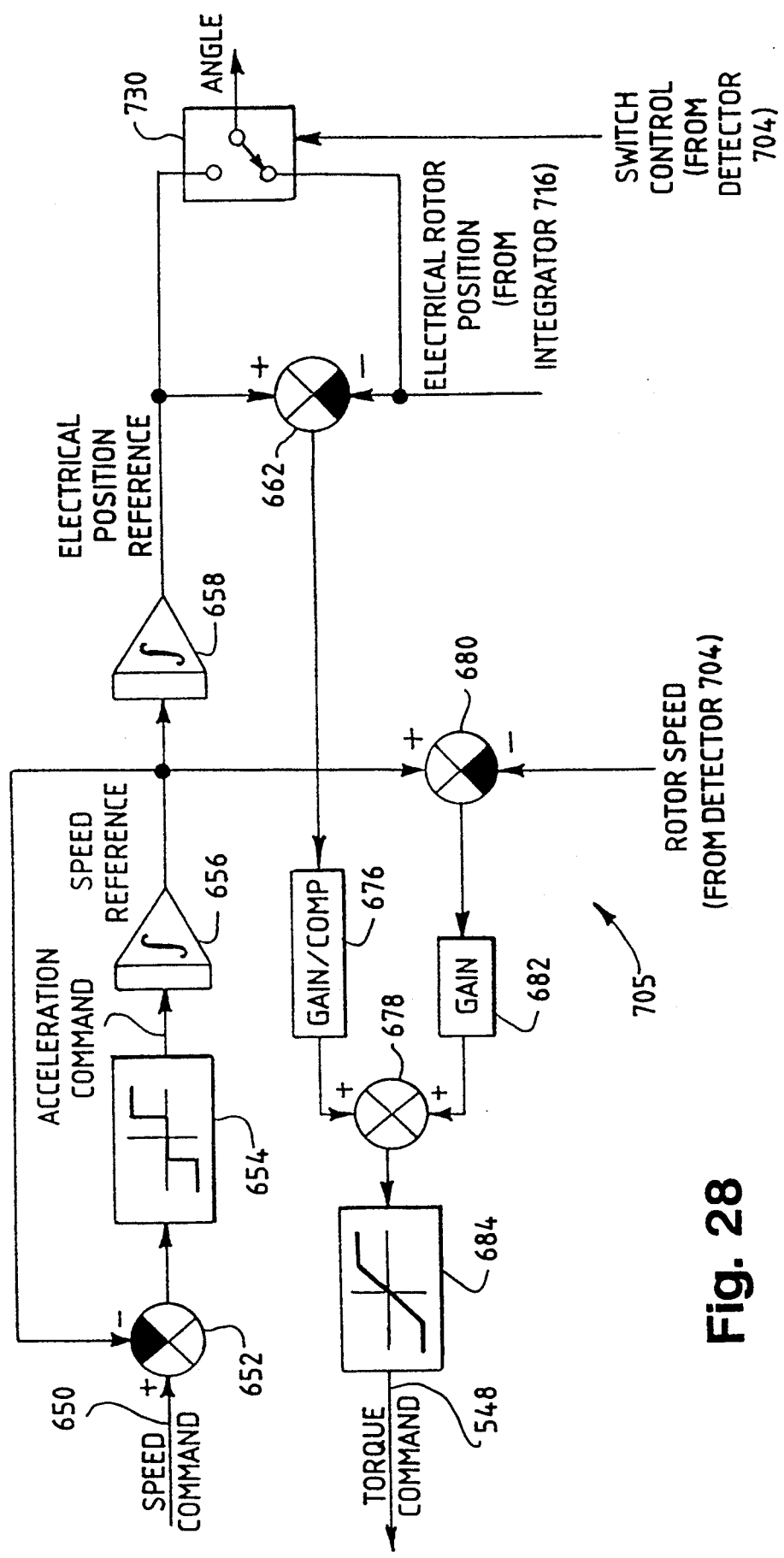
FIG. 28 comprises a block diagram of the speed controller of FIG. 25.

FIG. 28 illustrates the speed controller 705 in greater detail. The controller 705 is identical to the speed controller 546 of FIG. 23 except that the position reference signal developed by the integrator 658 is provided to a first input of a controllable switch 730 and to the non-inverting input of the summer 662. The position signal from the integrator 716 is provided to a second input of the controllable switch 730 and is further provided to the inverting input of the summer 662. At the initiation of a start-up sequence, at which time the speed of the motive power shaft 18 is zero, the switch 730 is set to a position which passes the output of the integrator 658 to the output of the switch 730, and thus to the multiplier 706 of FIG. 25. Also at this time, power is applied to the exciter portion 14, and hence to the main generator portion field winding 34, FIG. 1A, and power is also applied to the main generator armature windings 36a-36c. The motive power shaft 18 is thus accelerated and, once a particular point is reached, for example at the end of a full revolution of the motive power shaft 18 as detected by the encoder 702 and the elements 720–724 of FIG. 26, the controllable switch 730 is moved to the position shown in FIG. 28 and latched in such position so that the output of the integrator 716 of FIG. 26 is thereafter provided to the multiplier 706 of FIG. 25. The controllable switch 730 is latched in this state until a new command for a start-up sequence is initiated.

As should be evident from the foregoing discussion, the PMG 12 operates as an incremental encoder, while the shaft pulse encoder 42 provides an absolute rotor position indication.

Figure 29:
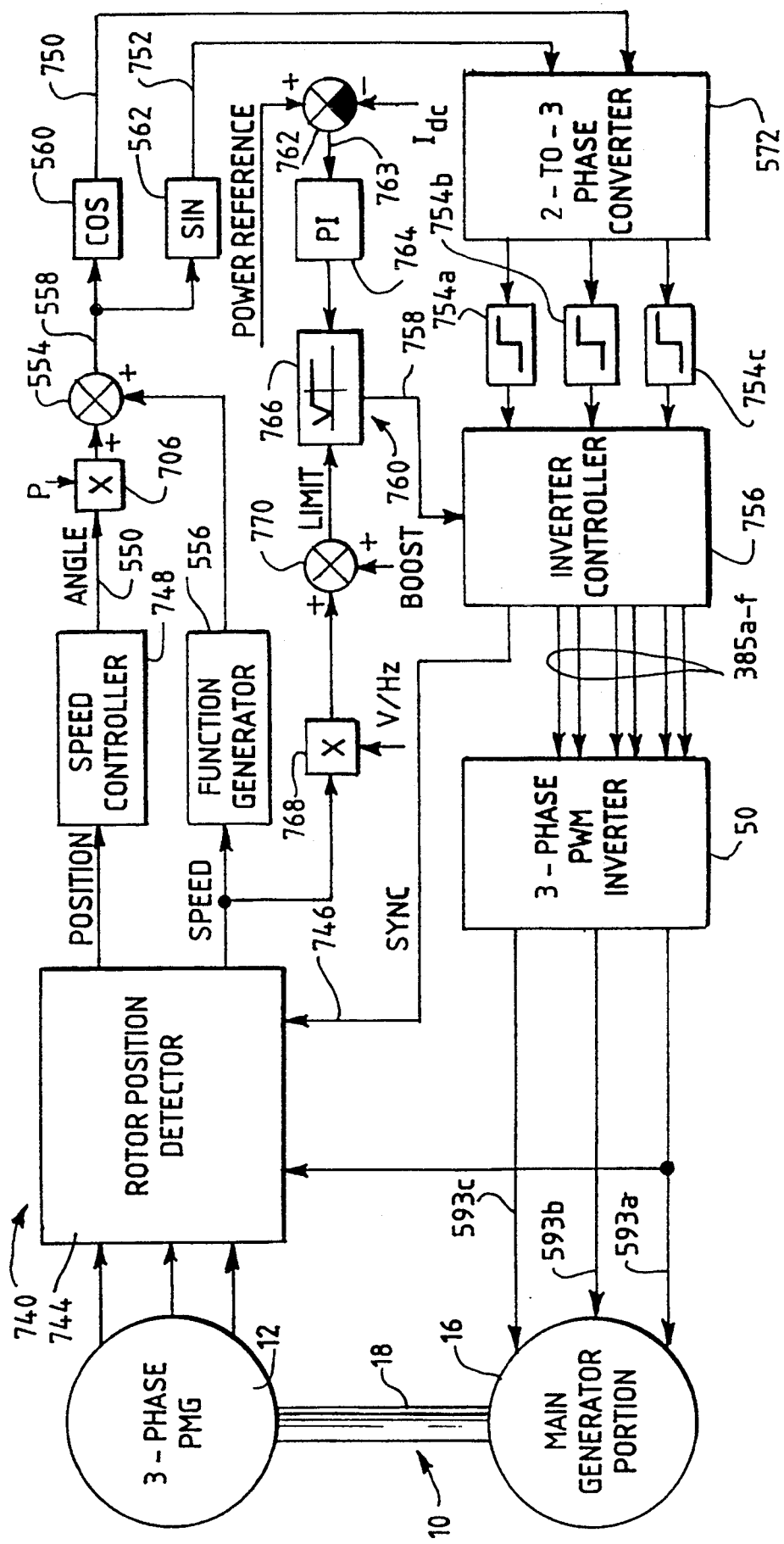
FIG. 29 comprises yet another alternative embodiment of a control for operating the main inverter.

FIGS. 29–33 illustrate still further embodiments of the present invention. Referring first to FIG. 29, which illustrates modifications to the embodiment of FIG. 25 and in which elements common to FIGS. 25 and 29 are assigned like reference numerals, a starting system control 740 includes a rotor position detector 744 which is responsive to the phase outputs developed by the PMG 12, a voltage developed on one of the lines 593a–593c coupled to the main generator portion armature windings 36a–36c and a synchronization signal developed on a line 746 by the starting system control 740 as described in detail below. The rotor position detector 744 develops signals representing the position and speed of the motive power shaft 18 and delivers the position signal to a speed controller 748. The speed controller 748 develops the signal on the line 550 representing the mechanical position of the motive power shaft 18. The signal on the line 550 is multiplied by the multiplier 706 with the signal representing the number of pairs of poles of the main generator, and the resulting signal is summed with the phase advance signal by the summer 554. The summer 554 develops the electrical angle command signal on the line 558 which is supplied to the first and second functional blocks 560, 562 which generate the cosine and sine waveform signals.

Figure 30:
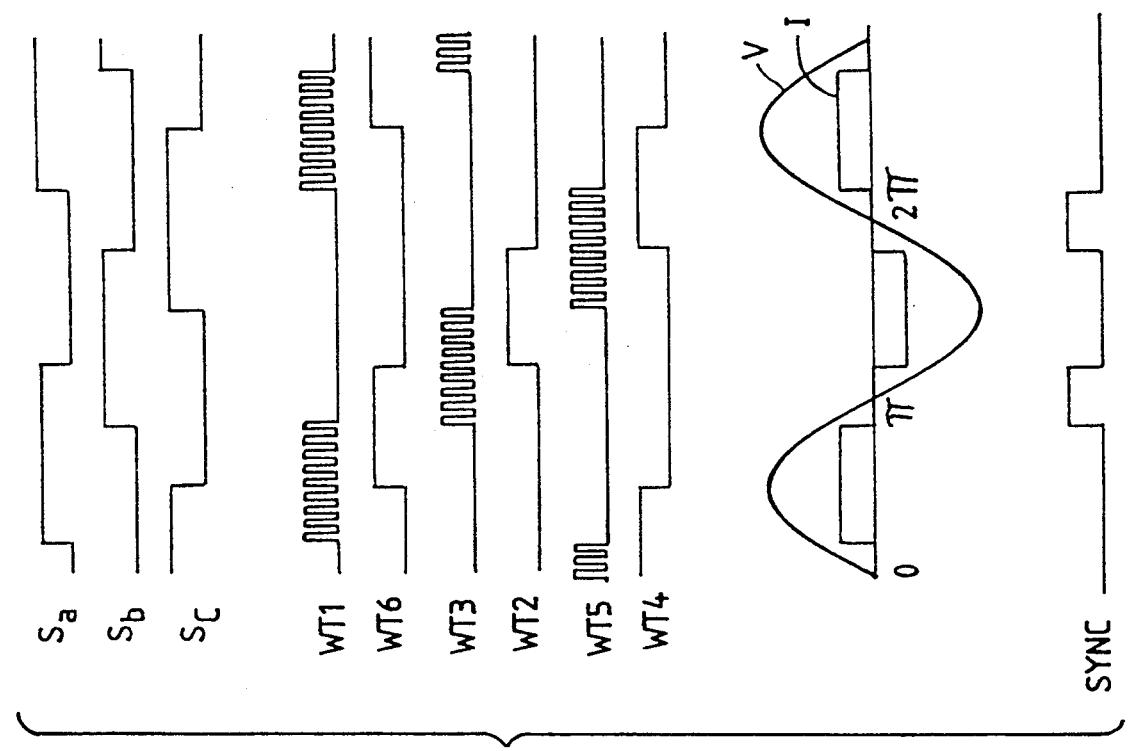
FIG. 30 comprises a series of waveform diagrams illustrating operation of the control of FIG. 29.

The cosine and sine signals are supplied over a pair of lines 750, 752 to the 2-to-3 phase converter 572. The resulting three-phase signals are in turn supplied to three zero crossing detectors 754a–754c. Each of the zero crossing detectors 754a–754c detects the zero crossings of one of the three-phase signals produced by the phase converter 572 to produce square-wave signals $S_a$, $S_b$, and $S_c$, respectively, which are shown in FIG. 30 and which are separated in phase by 120°. An inverter controller 756 responds to the signals $S_a$, $S_b$, and $S_c$ and to a power control signal delivered on a line 758 to produce on the lines 385a–385f inverter control waveforms WT1–WT6 which are shown in FIG. 30 and which control the switches $T_1$–$T_6$. As before, the inverter control waveforms WT1, WT3 and WT5 may be pulse-width modulated. If desired, the inverter control waveforms WT2, WT4 and WT6 may also be pulse-width modulated.

As also seen in FIG. 30, the synchronization signal comprises a series of positive pulses each coinciding with time periods during which the current flowing in one of the main generator portion armature windings 36a–36c is zero.

The widths of the PWM notches of the control waveforms WT1, WT3 and WT5 are controlled by a power control circuit 760. The power control circuit 760 includes a summer 762 which subtracts a signal representing the DC link current (which in turn represents the power delivered by the inverter 50 to the armature windings 36a–36c) from a power reference signal. The resulting power error signal is conditioned by a conditioner 764 which, preferably, comprises a proportional-integral type compensator but could, alternatively, comprise any type of gain and compensation unit. The output of the conditioner 764 is delivered to a controlled or adjustable limiter 766 which produces the power control signal on the line 758.

The limiter 766 is controlled in accordance with a limiter control signal. The speed indication produced by the rotor position detector 744 is delivered to a multiplier 768 and multiplied by a constant volts-per-hertz signal to produce a speed dependent voltage signal. The speed dependent voltage signal is summed with a constant boost voltage by a summer 770, which in turn produces the limiter control signal. The constant boost voltage signal is proportional to the IR voltage drop in the main generator portion control windings and allows the power control signal to overcome these losses at initial startup. Thereafter, as the speed indication developed by the rotor position detector 744 increases, the multiplier 768 produces a ramping signal which, when added to the boost voltage, increases the adjustable limit of the limiter 766 so that increasing power magnitudes can be delivered to the armature windings 36a–36c by the inverter 50.

Figure 31:
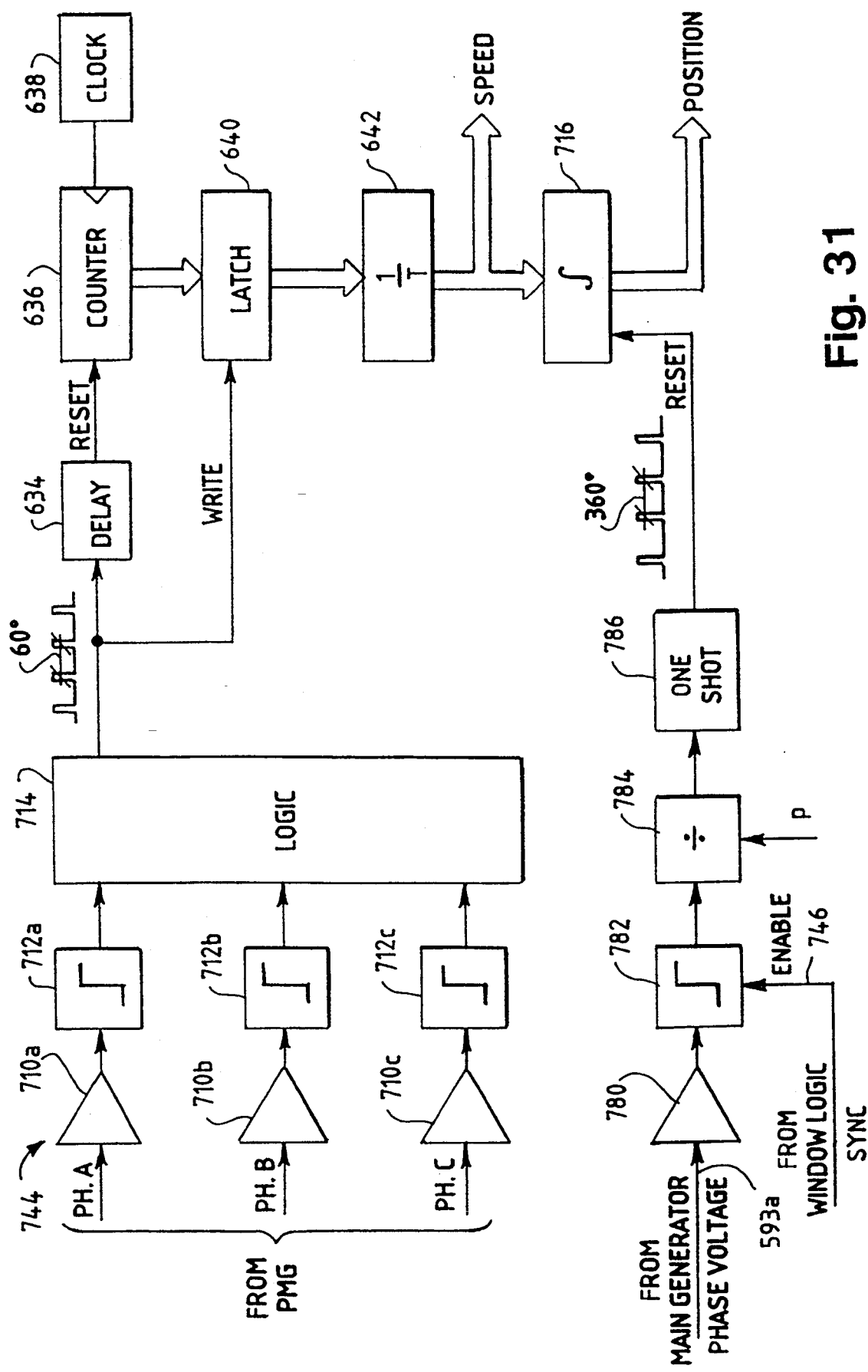
FIG. 31 comprises a block diagram of the rotor position detector of FIG. 29.

Referring now to FIG. 31, the rotor position detector 744 is shown in greater detail. The detector 744 is similar to the detector 704 of FIG. 26 and hence like elements are assigned like reference numerals. The detector 744 differs from the detector 704 in the manner that the integrator 716 is reset. Specifically, the integrator 716 is reset once per full revolution of the motive power shaft 18 by an input conditioner 780, preferably comprising a gain amplifier, a zero crossing detector 782, a frequency divider 784 and a one-shot 786. The input conditioner 780 scales one of the phase voltages from one of the main generator portion armature windings 36a–36c, e.g., the voltage appearing on the line 593a of FIG. 29. The synchronization signal on the line 746 enables the zero crossing detector 782 for a short period of time surrounding each expected zero crossing of the phase voltage V shown in FIG. 30 to provide a degree of noise immunity. The frequency divider 784 divides the frequency of the waveform produced by the zero crossing detector 782 by an amount equal to the number of poles in the main generator rotor and produces a signal to drive the one-shot 786 to reset the integrator 716 once every rotation of the motive power shaft 18.

Alternatively, the reset signal provided to the integrator 716 could be generated without the need to supply the synchronization signal to the zero crossing detector 782 by incorporating a low pass filter between the input conditioner 780 and the zero crossing detector 782. The cutoff frequency of the low pass filter would be selected to reject the PWM frequency (the high-frequency notches shown in the waveforms WT1, WT3, WT5 of FIG. 30) and harmonics thereof. In this alternative, the divider circuit 784 would divide by the number of poles divided by two, or P/2.

Figure 32:
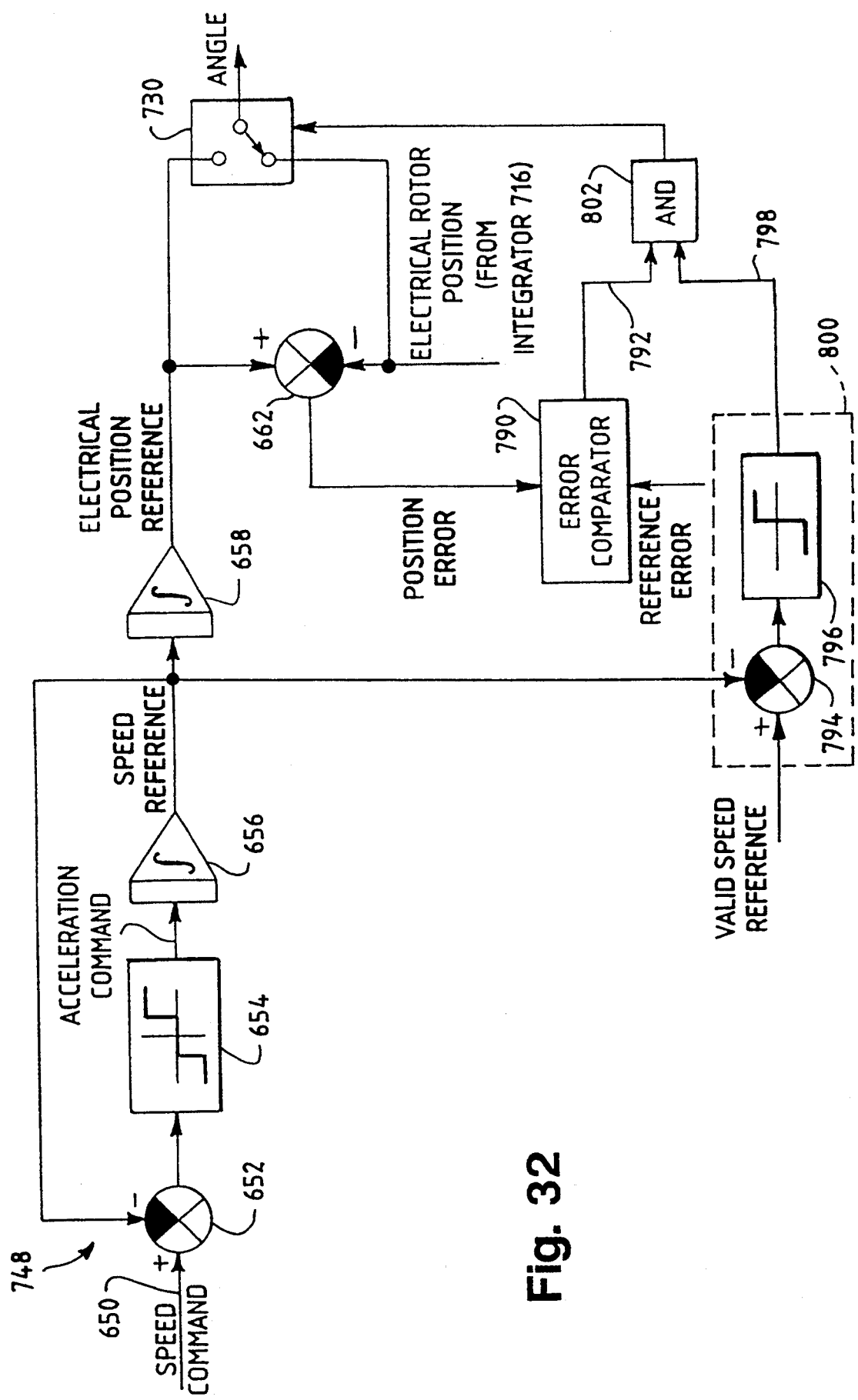
FIG. 32 comprises a block diagram of the speed controller of FIG. 29.

FIG. 32 illustrates the speed controller 748 in greater detail. The controller 748 comprises a modification of the controller 705 of FIG. 28 and hence like elements are assigned like reference numerals. The position reference signal is developed by the elements 652, 654, 656 and 658 and is supplied to the switch 730 and the summer 662 as before. The angular position indication comprising the position signal from the integrator 716 of FIG. 31 is also provided to the controllable switch 730 and is further provided to an inverting input of the summer 662. The summer 662 produces the position error signal indicative of the error between the derived position reference signal and the actual rotor position as developed by the integrator 716. The position error signal is provided to an error comparator 790 which compares the position error signal to an error reference and produces a high state signal on a line 792 when the position error signal is less than the error reference.

Furthermore, the speed reference signal produced by the integrator 656 is delivered to an inverting input of a summer 794 while a valid speed reference signal, indicative of the value at which the speed reference signal becomes a reliable representation of the speed of the motive power shaft, is delivered to a non-inverting input of the summer 794. The summer 794 produces a signal indicative of the difference between the speed reference signal and the valid speed reference signal. A zero crossing detector 796 detects when the speed reference signal equals or exceeds the valid speed reference signal and produces a high state output signal on a line 798 at such time. The summer 794 in conjunction with the zero crossing detector 796 thus comprise a speed comparator 800. The signals on the lines 792 and 798 are delivered to an AND gate 802 having an output which is coupled to and controls the controllable switch 730.

At the initiation of a start-up sequence, at which time the speed of the motive power shaft 18 is zero, the controllable switch 730 is set to the position which passes the output of the integrator 658 to the output of the switch 730, and thus to the multiplier 706 of FIG. 29. Also at this time, power is applied to the exciter portion 14, and hence to the main generation portion field winding 34 of FIG. 1A, and power is also applied to the main generator armature windings 36a-36c. The motive power shaft 18 is thus accelerated. When the error between the rotor position, as developed by the integrator 716 of FIG. 31, and the position reference signal, as derived by the integrator 658, is less than the error reference and when the speed reference signal produced by the integrator 656 is equal to or greater than the valid speed reference, the high-state signals on the lines 792 and 798 cause the AND gate 802 to move the controllable switch 730 to the position shown in FIG. 32. The controllable switch 730 is latched in such position so that the output of the integrator 716 of FIG. 31 is thereafter provided to the multiplier 706 of FIG. 29. The switch 730 remains latched until a new start-up sequence is initialized.

Figure 33:
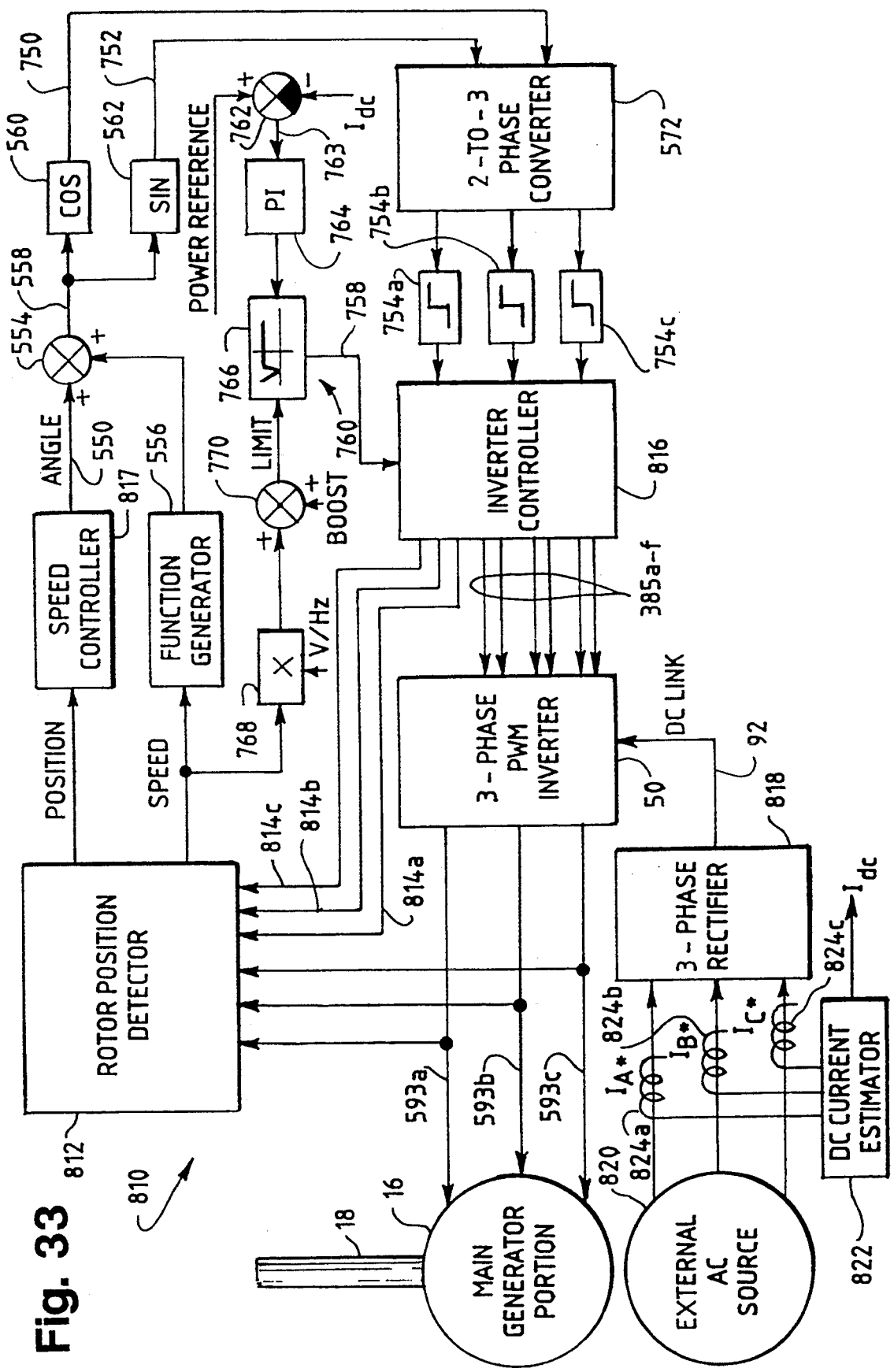
FIG. 33 comprises a block diagram of still another embodiment of a control for operating the main inverter.

FIG. 33 illustrates yet another embodiment of a starting system control 810 for operating the generator 10 in a starting mode to convert electrical power into motive power. Inasmuch as the control 810 of FIG. 33 is similar to the control 740 of FIG. 29, elements common to the two FIGS. are assigned like reference numerals. The starting system control 40 includes a rotor position detector 812 which receives the voltages developed on the lines 593a-593c coupled to the main generator portion armature windings 36a-36c of the main generator portion 16 and phase A, phase B and phase C synchronization signals developed on a series of three lines 814a-814c, respectively, by an inverter controller 816. The rotor position detector 812 develops a signal representing the angular position of the motive power shaft 18 and a signal representing the speed of the motive power shaft 18.

FIG. 30 illustrates the voltage and current waveforms developed on the line 593a as well as the phase A synchronization signal developed on the line 814a. The phase B and phase C voltage, current and synchronization signal waveforms are identical to those shown in FIG. 30, except that they are phase-shifted by 120° and 240°, respectively. Each phase synchronization signal is in a high state when neither of the inverter control waveforms associated with such phase is in a high state. As noted hereinafter, each phase synchronization signal selectively enables a comparator in the detector 812 to detect a phase voltage only when no current is flowing in an associated armature winding 36a-36c so that the winding phase voltage detected is equal to the back EMF voltage.

Figure 34:
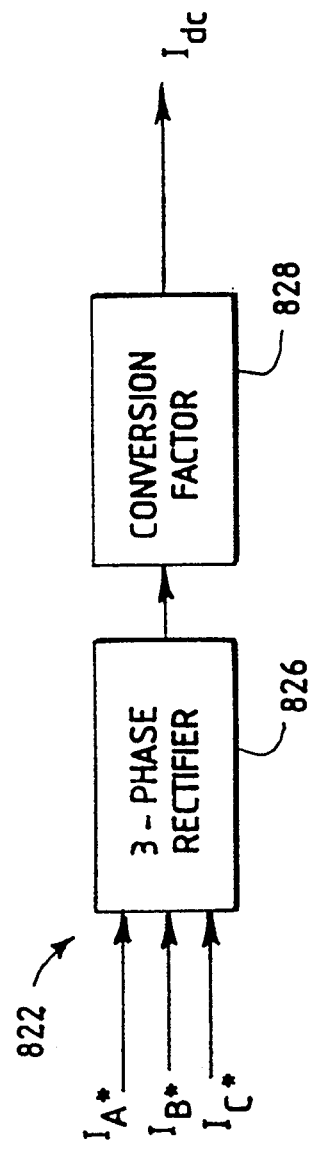
FIG. 34 comprises a block diagram of the DC current estimator of FIG. 33.

Referring again to FIG. 33 and as noted above, the inverter 50 receives DC power over a DC link 92. The DC link 92 may receive DC power from a three-phase rectifier 818 which is in turn coupled to an external AC source 820 or any other type of DC source. A DC current estimator 822 receives three current signals $I_A^*$, $I_B^*$, and $I_C^*$ generated by three current transformers 824a-824c coupled to the outputs of the AC power source 820 and develops a current estimate signal $I_{dc}$. As shown in FIG. 34, the DC current estimator may comprise a three-phase rectifier 826 coupled to a conversion factor circuit 828 such as a multiplier or scaling amplifier.

The remainder of the elements of FIG. 33 are identical to those shown in FIG. 29.

Figure 35:
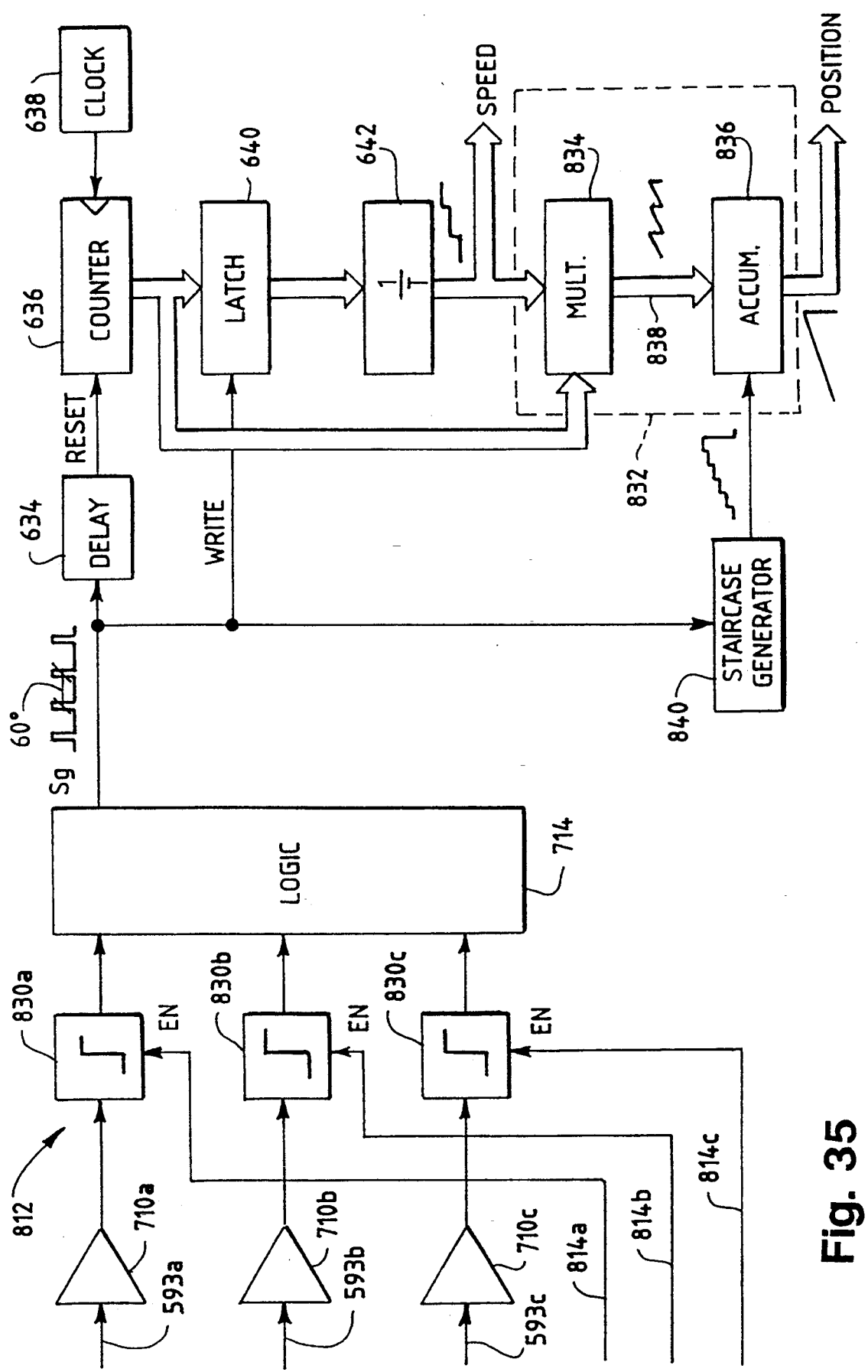
FIG. 35 comprises a block diagram of the rotor position detector of FIG. 33.

Referring now to FIG. 35, the rotor position detector 810 is shown in greater detail. Elements common to FIGS. 31 and 35 are assigned like reference numerals. The voltage waveforms provided to the main generator armature windings 36a-36c are supplied through the amplifiers 710a-710c and zero crossing detectors 830a-830c to the logic circuit 714. As noted above, each zero crossing detector 830a-830c is enabled for the period of time during which its respective synchronization signal provided on one of the lines 814a-814c has a high value.

The angular position of the motive power shaft 18, and thus the rotor 20, is determined by an integrator 832 comprising a multiplier 834 coupled to an accumulator 836. During each 60° period, the multiplier 834 multiplies the speed signal, which is constant for each period, with the output of the counter 636, which increases during the period, to generate a ramp signal on a line 838. The magnitude of that ramp signal falls to zero every 60° since the counter 636 is reset every 60°.

The output of the logic circuit 714 is also provided to a staircase generator 840 which generates a staircase signal that increases a constant amount each 60° period. The magnitude of the staircase signal at each 60° period represents the rotor position at the start of that period. Every 360° corresponding to one revolution of the rotor 20, the magnitude of the staircase signal falls back to zero.

The accumulator 836 continuously determines the rotor position by adding the current magnitude of the ramp signal generated by the multiplier 834 with the magnitude of the staircase signal for the current 60° period. The resulting position signal generated by the accumulator 836 is a ramp signal having a magnitude representing rotor position. The period of the ramp signal corresponds with 360°, one full revolution of the rotor 20. Other integrative techniques could alternatively be used, if desired.

Figure 37:
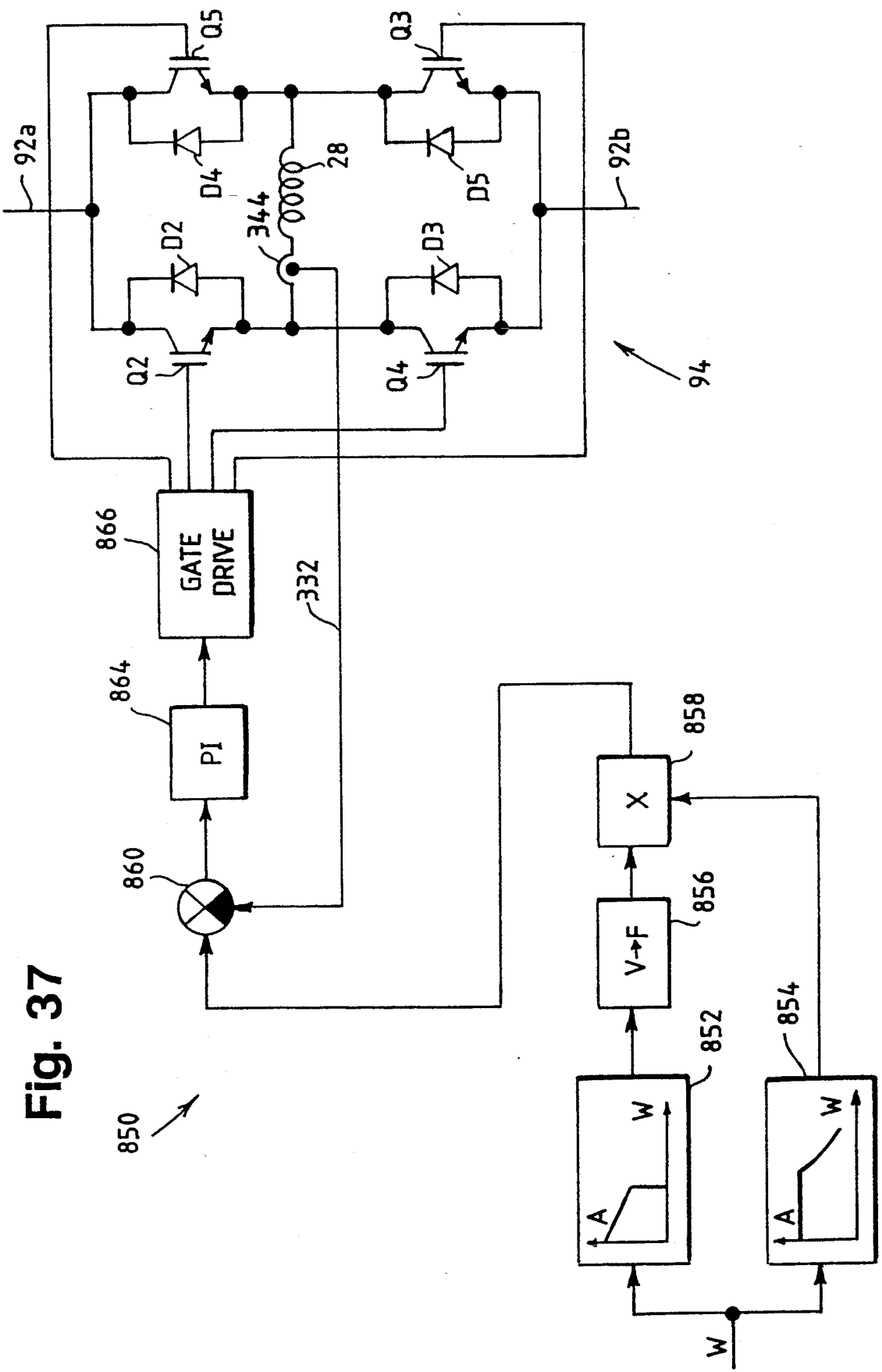
FIG. 37 comprises a combined block and schematic diagram of a control for operating the excitation inverter.

FIG. 37 illustrates an inverter control 850 which may be substituted for the inverter control 305 of FIG. 7. In this alternative embodiment the frequency of AC power applied to the exciter field winding 28 is continuously decreased in a linear fashion during operation in the starting mode until a particular rotor speed is reached. Thereafter, DC power is applied at a variable magnitude during the remainder of the start sequence to avoid any modulation between the excitation frequency of the exciter field winding 28 and that of the main generator portion armature windings 36a–36c.

Once a further particular rotor speed has been reached, which is typically the base speed of the generator, field weakening is necessary owing to the back EMF developed by the main generator portion. Accordingly, the DC voltage magnitude applied to the exciter field winding 28 is reduced at speeds equal to or greater than the further particular rotor speed so that further rotor acceleration is possible until the self-sustaining speed of the prime mover 21 is reached.

As seen in FIG. 37, a rotor speed signal $\omega$ is provided to a function generator 852 and a function generator 854. The rotor speed signal may be generated from a rotor position signal as described in more detail below. The function generator 852 generates an output voltage which is a function of the rotor speed signal $\omega$. The output voltage of the function generator 852 decreases linearly with rotor speed up to a predetermined rotor speed, at which point it drops to zero. The predetermined rotor speed may correspond to an electrical frequency of approximately 100–400 Hz (the corresponding angular rotor speed depends on the number of rotor poles). The voltage output from the function generator 852 is provided to a voltage-to-frequency V/F converter 856, which generates a frequency signal proportional to the magnitude of the voltage generated by the function generator 852. As a result, the (V/F) converter 856 generates an AC signal having a frequency that decreases linearly until the predetermined rotor speed is reached, at which point the AC signal becomes a DC signal.

In response to the rotor speed signal $\omega$, the function generator 854 generates a magnitude signal that remains constant until a predetermined rotor speed is reached, and thereafter decreases at speeds higher than the predetermined rotor speed.

The outputs of the converter 856 and the function generator 854 are provided to a multiplier 858, which generates a current reference signal having the frequency specified by the V/F converter 856 and the magnitude specified by the function generator 854.

The current reference signal generated by the multiplier 858 is provided to a noninverting input of a summer 860. The current feedback signal developed by the current sensor 344 and provided to an inverting input of the summer 860 via the line 332 is subtracted from the current reference signal to generate a current error signal. The error signal is supplied to a PI regulator 864 which in turn produces control signals which are processed by a gate drive circuit 866 to derive gate drive signals. The gate drive signals control the switches Q2–Q5 of the exciter inverter 94.

Frequently, at initial start-up, the prime mover 21 can be windmilling, i.e., rotating in a negative or positive direction in response to an external force. Under such a condition, the generator 10 may have to operate in a braking mode to slow the rotation of the prime mover 21 to a first speed, then operate in a plugging mode to cause the prime mover 21 to stop and thereafter operate in a motoring or starting mode to bring the prime mover 21 up to the self-sustaining speed in the proper direction. These operations are effected by providing DC power to the main generator portion field winding 34 via the exciter 14 and AC power to the main generator portion armature windings 36a–36c and suitably commutating the currents flowing in the armature windings 36a–36c to cause the motive power shaft 18 to rotate as desired. FIGS. 38–44 illustrate a starting system control 870 which is capable of accomplishing this operation.

Figure 38:
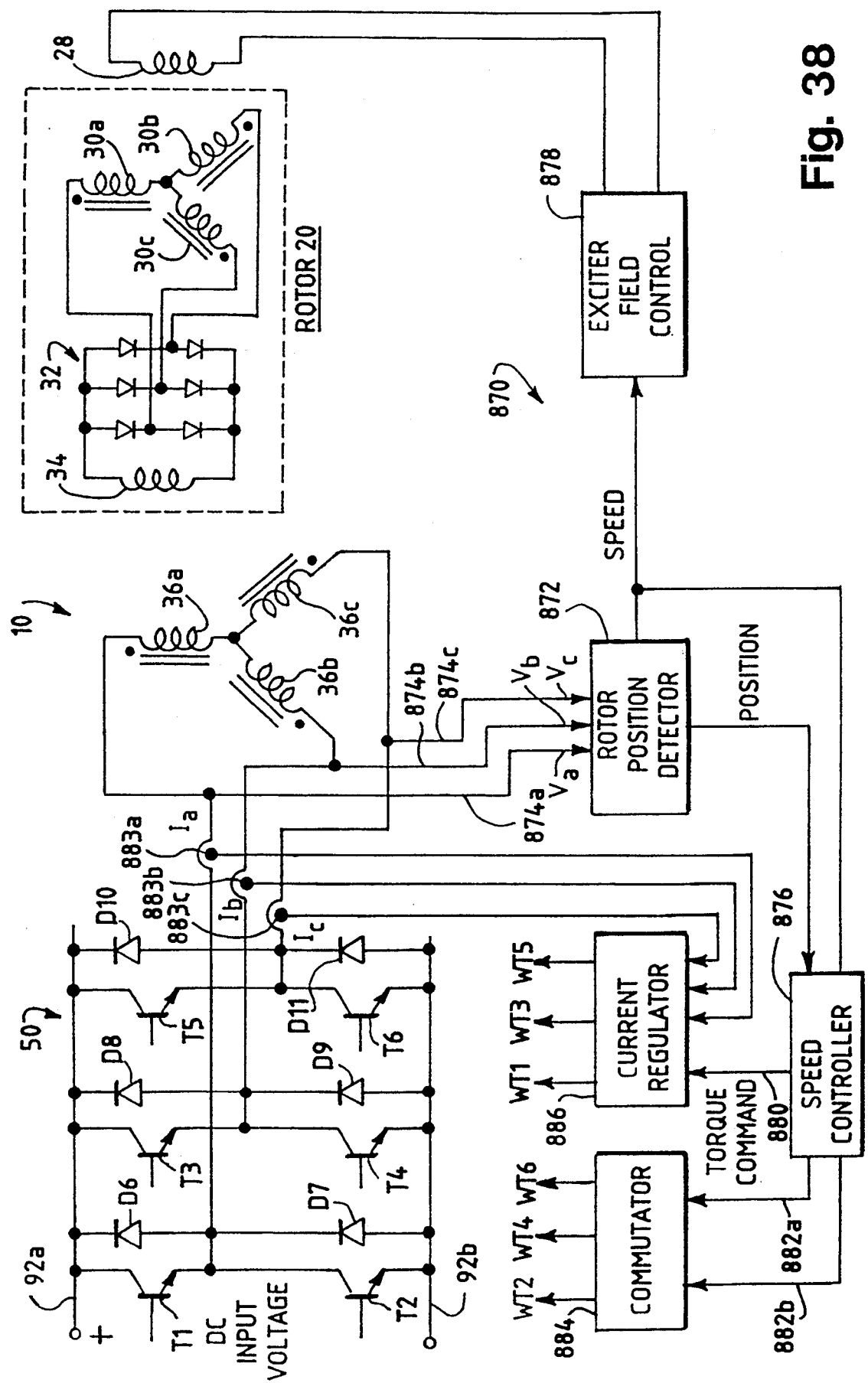
FIG. 38 comprises a combined block and schematic diagram of yet another control for the main inverter.

FIG. 38 illustrates the generator 10 including the exciter portion field winding 28, the exciter portion armature windings 30a–30c, the rotating rectifiers 32, the main generator portion field winding 34 and the main generator portion armature windings 36a–36c together with the system control 870 for operating the generator 10 in a braking mode, a plugging mode and a starting mode to convert electrical power into motive power. The system control 870 includes a rotor position detector 872 which is responsive to voltage signals $V_a$, $V_b$ and $V_c$ developed on lines 874a–874c that are coupled to the main generator portion armature phase windings 36a–36c, respectively. The rotor position detector 872 develops indications of the position and speed of the rotor 20 which are delivered to a speed controller 876. Furthermore, the speed indication is delivered to an exciter field control 878 which develops current for the exciter field winding 28. The speed controller 876 develops a torque command signal on a line 880 representing the commanded torque to be produced by the generator 10. The speed controller 876 also develops a pair of orthogonal sine and cosine signals on lines 882a and 882b which are provided to a commutator 884 that produces a first set of inverter switch control signals WT2, WT4 and WT6. The torque command signal is provided to a current regulator 886 along with current signals $I_a$, $I_b$ and $I_c$, which are developed by current sensors 883a–883c and which are indicative of the magnitudes of the currents flowing through the main generator portion armature windings 36a–36c. The current regulator 886 develops a second set of inverter switch control signals WT1, WT3 and WT5. It should be noted that the commutator 884 and the current regulator 886 can be replaced with a PWM modulator which produces inverter control signals WT1–WT6 according to known techniques, if desired.

Figure 39:
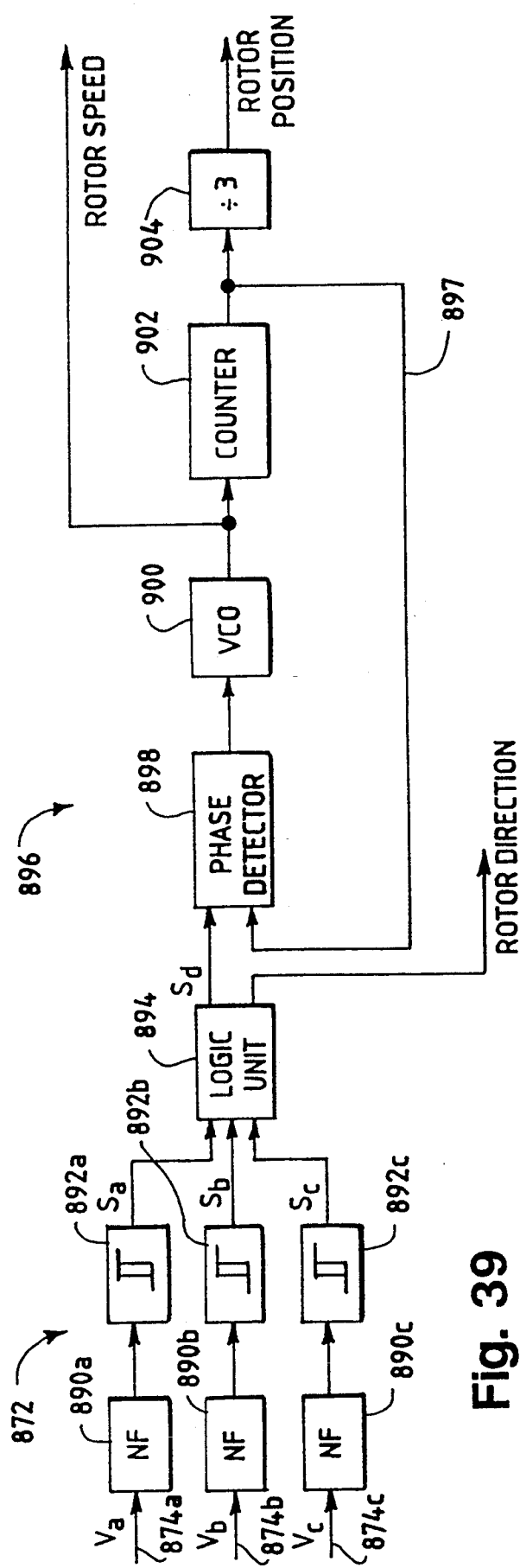
FIG. 39 comprises a block diagram of the rotor position detector of FIG. 38.
Figure 40:
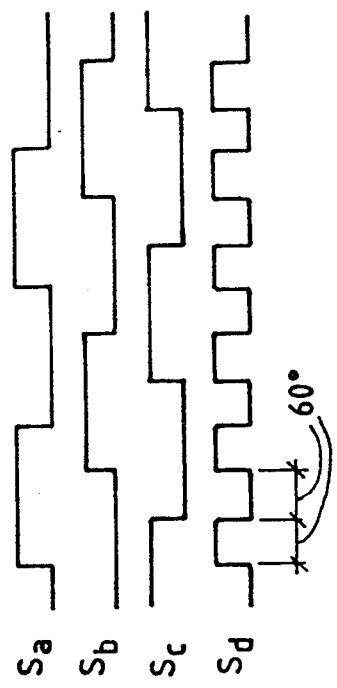
FIG. 40 comprises a series of waveform diagrams illustrating operation of the rotor position detector of FIG. 39.

The inverter control waveforms WT1–WT6 developed by the commutator 54 and the current regulator 56 control the operation of the power switches T1–T6, respectively, to operate the inverter 50 in a current mode of operation according to known techniques. Preferably, the inverter 62 is controlled according to a 120 degree conduction algorithm. If such a conduction algorithm is used, one of the armature phase windings 36a–36c is unenergized by the inverter 50 at any given time, which allows the rotor position detector 872 to use the direct method of detecting back EMF voltages described above to produce the rotor position and speed indications. Referring now to FIG. 39, the rotor position detector 872 is shown. The voltage signals $Va-V_c$ are provided through the lines 874a–874c, respectively, to notch filters 890a–890c. The notch filters 890a–890c reject PWM frequencies to avoid multiple zero crossings and improve the signal-to-noise ratio of the voltages developed by the generator 10, especially at low rotor speeds. The notch filters 890a–890c are coupled to zero crossing detectors 892a–892c, respectively. The zero crossing detectors 892a–892c are all provided with a hysteresis characteristic and produce the square-wave signals $S_a$, $S_b$ and $S_c$, respectively, which are separated in phase by 120 degrees as shown in FIG. 40. The square-wave signals $S_a$–$S_c$ are provided to a logic unit 894 which develops a square-wave signal $S_d$, also shown in FIG. 40, having pulses of 60 electrical degrees duration separated by notches of 60 electrical degrees duration. The square-wave signal $S_d$, is provided by the logic unit 894 to a phase-locked loop 896.

The phase-locked loop 896 includes a phase detector 898 which compares the phase of the square-wave signal $S_d$ to an output signal appearing on a line 897 to produce a phase error signal. This signal is proportional to the rotor speed, and hence comprises the rotor speed indication. A voltage controlled oscillator (VCO) 900 is responsive to the phase error signal and develops a VCO output signal having a frequency proportional to the magnitude of the phase error signal. A counter 902 counts the cycles of the rotor speed indication to produce the output signal on the line 897 which is fed back to the phase detector 898. The output signal is also delivered to a divider circuit 904 which divides the frequency of the output signal by a factor of three to develop the rotor position indication or signal. Other methods of generating the rotor speed and position signals could be utilized, if desired.

Figure 36:
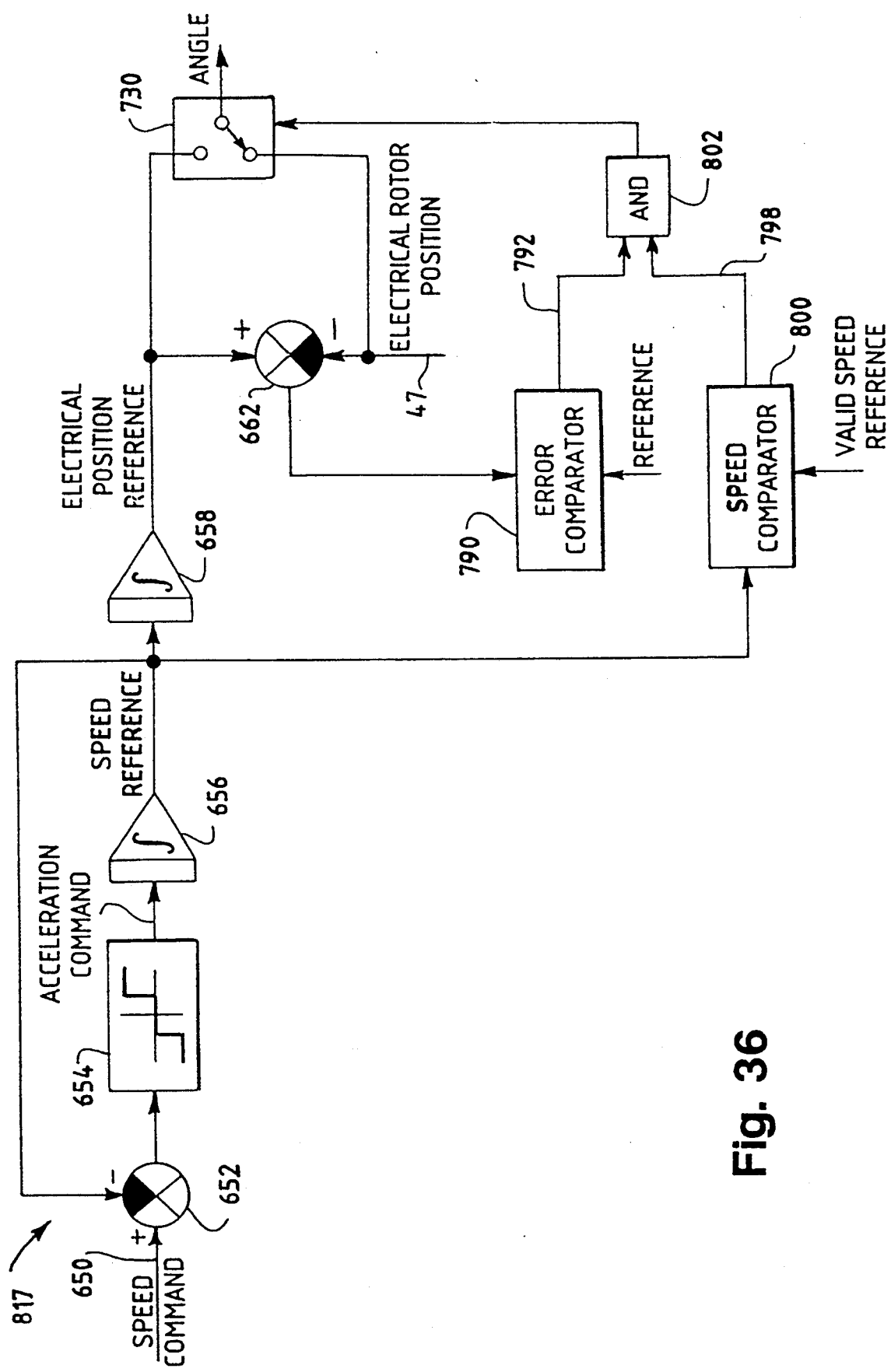
FIG. 36 comprises a block diagram of the speed controller of FIG. 33.
Figure 41:
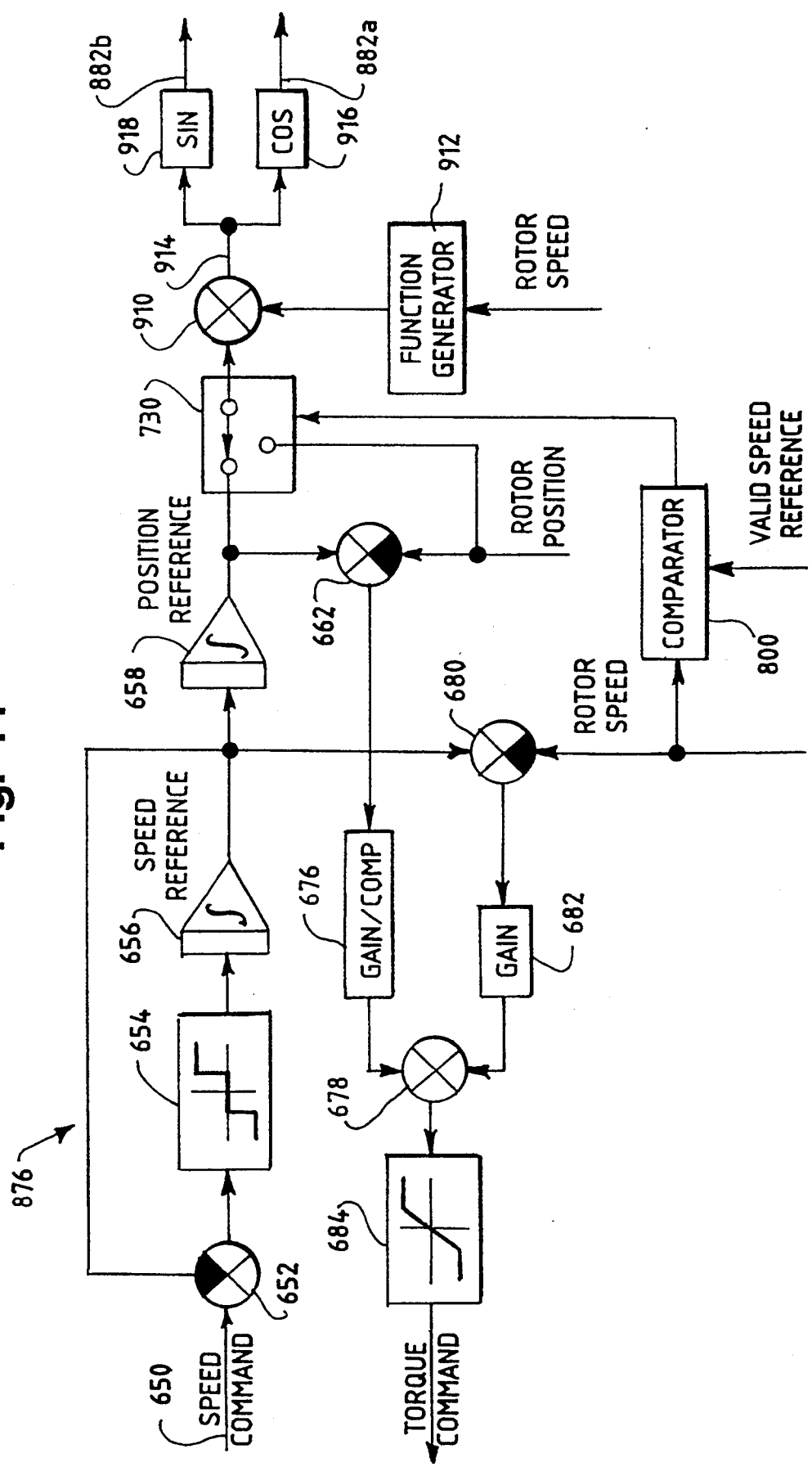
FIG. 41 comprises a block diagram of the speed controller of FIG. 38.

FIG. 41 illustrates the speed controller 876. The controller 876 includes elements described above in connection with FIGS. 28, 32 and 36 and such elements are assigned like reference numerals in these Figures. A speed command signal may be developed on the line 650 which is converted to the speed and position reference signals by the elements 652–658. The position reference signal is provided to the controllable switch 730 and to the noninverting input of the summer 662. The rotor position signal developed by the divider 904 of FIG. 39 is also provided to the controllable switch 730 and is further provided to an inverting input of the summer 662. The summer 662 produces a position error signal indicative of the difference between the position reference signal and the rotor position signal developed by the divider 904. The output of the summer 662 is conditioned by the gain and compensation unit 676 and is supplied to a first input of the summer 678. The speed error signal is developed by the summer 680 which subtracts the rotor speed indication developed by the phase detector 898 of FIG. 39 from the speed reference signal developed by the integrator 656. The speed error signal is processed by the gain unit 682 and is summed with the output of the gain and compensation unit 676 by the summer 678. The limiter 684 provides limiting for the output of the summer 678 and develops the torque command signal on the line 880 of FIG. 38. The comparator 800 described above in connection with FIGS. 32 and 36 is provided and controls the operation of the controllable switch 730.

At the initiation of the plugging and motoring modes, the controllable switch 730 is set to the position shown in FIG. 41 and passes the output of the integrator 658 to the output of the controllable switch 730, and thus to a summer 910. At this time, the speed command signal is supplied to the line 650 to initiate the derivation of the position reference signal. Also at this time, the exciter field control 878 applies power to the exciter portion 14 via the exciter field winding 28, and hence to the main generator portion field winding 34 of FIG. 38. Simultaneously, power is applied to the main generator armature windings 36a–36c via the inverter 50. The motive power shaft 18 is thus accelerated in the rotational direction necessary for start-up of the prime mover 21. When the rotor speed signal produced by the rotor position detector 872 becomes greater than or equal to the valid speed reference signal, the comparator 800 causes the controllable switch 730 to switch and thus provide the rotor position signal developed by the rotor position detector 872 to the summer 910. The controllable switch 730 is latched in such position until a new start-up sequence is initiated. In this manner, the inverter 50 is controlled according to the rotor speed reference at low rotor speeds when the rotor position signal is an unreliable indication of actual rotor position, and is controlled according to the rotor speed signal developed by the rotor position detector 872 at higher rotor speeds when the rotor position signal is a reliable indication of actual rotor position.

The summer 910 sums the output of the controllable switch 730 with a phase advance signal developed by a function generator 912, which is responsive to the speed of the motive power shaft 18 as detected by the rotor position detector 872 and which provides increasing phase advance as the rotor speed increases in a high speed range. The summer 910 develops an electrical angle command signal on a line 914 which is supplied to first and second functional blocks 916, 918. The functional blocks 916, 918 develop a sine waveform signal and a cosine waveform signal, respectively, on the lines 882a and 882b, wherein such signals are at the same frequency as the electrical angle command signal.

Figure 42:
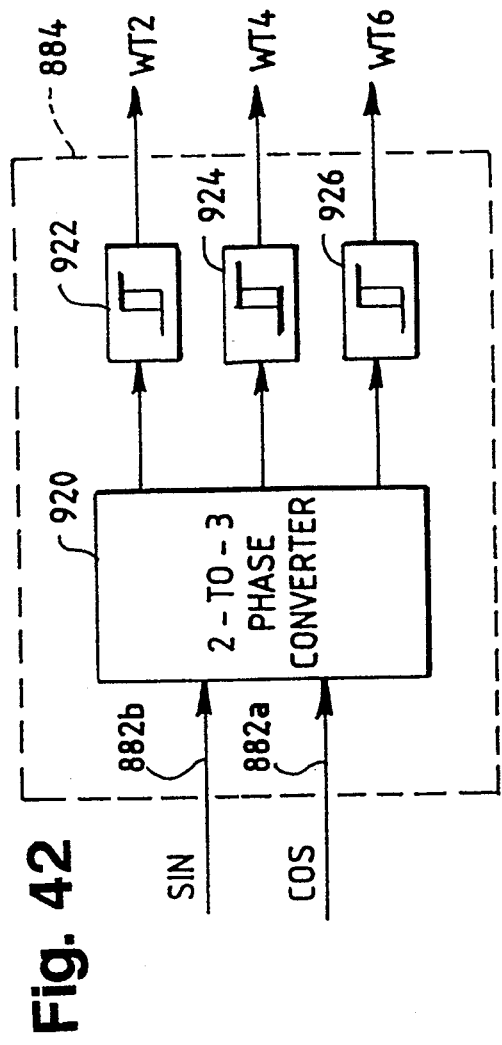
FIG. 42 comprises a block diagram of the commutator of FIG. 38.

Referring now to FIG. 42, a block diagram of the commutator 884 of FIG. 38 is shown. A 2-to-3 phase converter 920 of the form shown in FIG. 24 converts the sine and cosine signals appearing on lines 882a, 882b, into three-phase current signals which are, in turn, supplied to three zero crossing detectors 922, 924 and 926. The zero crossing detectors 922, 924 and 926 are provided with a hysteresis characteristic and convert the three-phase current signals produced by the phase converter 920 into the inverter control signals WT2, WT4 and WT6, respectively.

Figure 43:
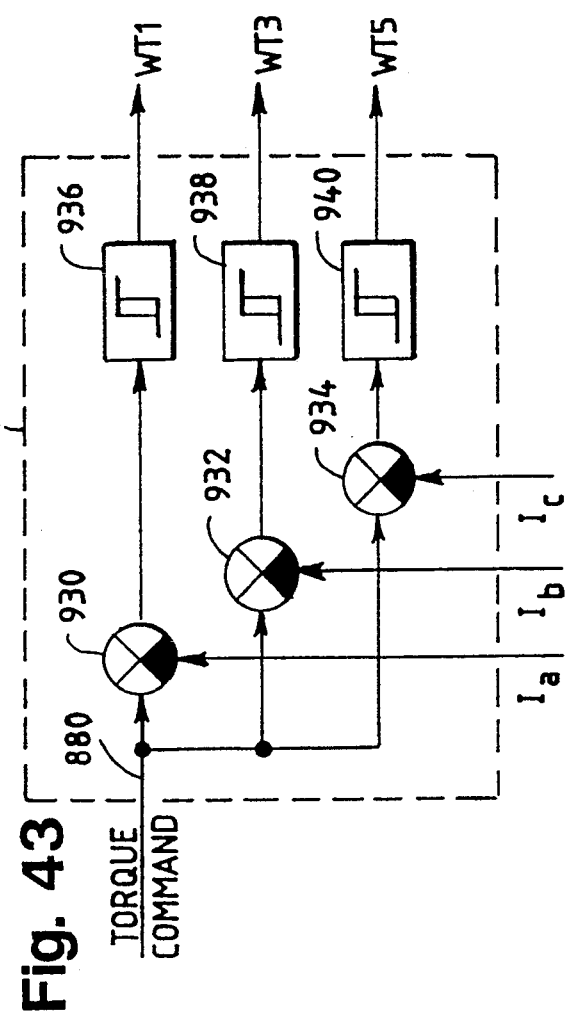
FIG. 43 comprises a block diagram of the current regulator of FIG. 38.

Referring now to FIG. 43, a block diagram of the current regulator 886 of FIG. 38 is shown in detail. The torque command signal produced by the speed controller 876 of FIG. 38 is provided over the line 880 to summers 930, 932 and 934 which subtract the current signals $I_a$, $I_b$ and $I_c$ from the torque command signal to produce three current error signals. The current error signals are delivered to three zero crossing detectors 936, 938, 940 which are provided with a hysteresis characteristic and produce the inverter control signals WT1, WT3 and WT5. Each inverter control signal comprises groups of individual pulses. As seen in FIG. 30 and as described previously the widths of the individual pulses depend upon the magnitude of the torque command signal and system conditions, such as rotational speed, the magnitude of back-EMF generated, and the commutation angle. Instead of using hysteresis control via the three zero crossing detectors 936, 938, 940, the control could be accomplished by using three proportional-integral (PI) regulators each coupled to a pulse-width modulator.

Figure 44:
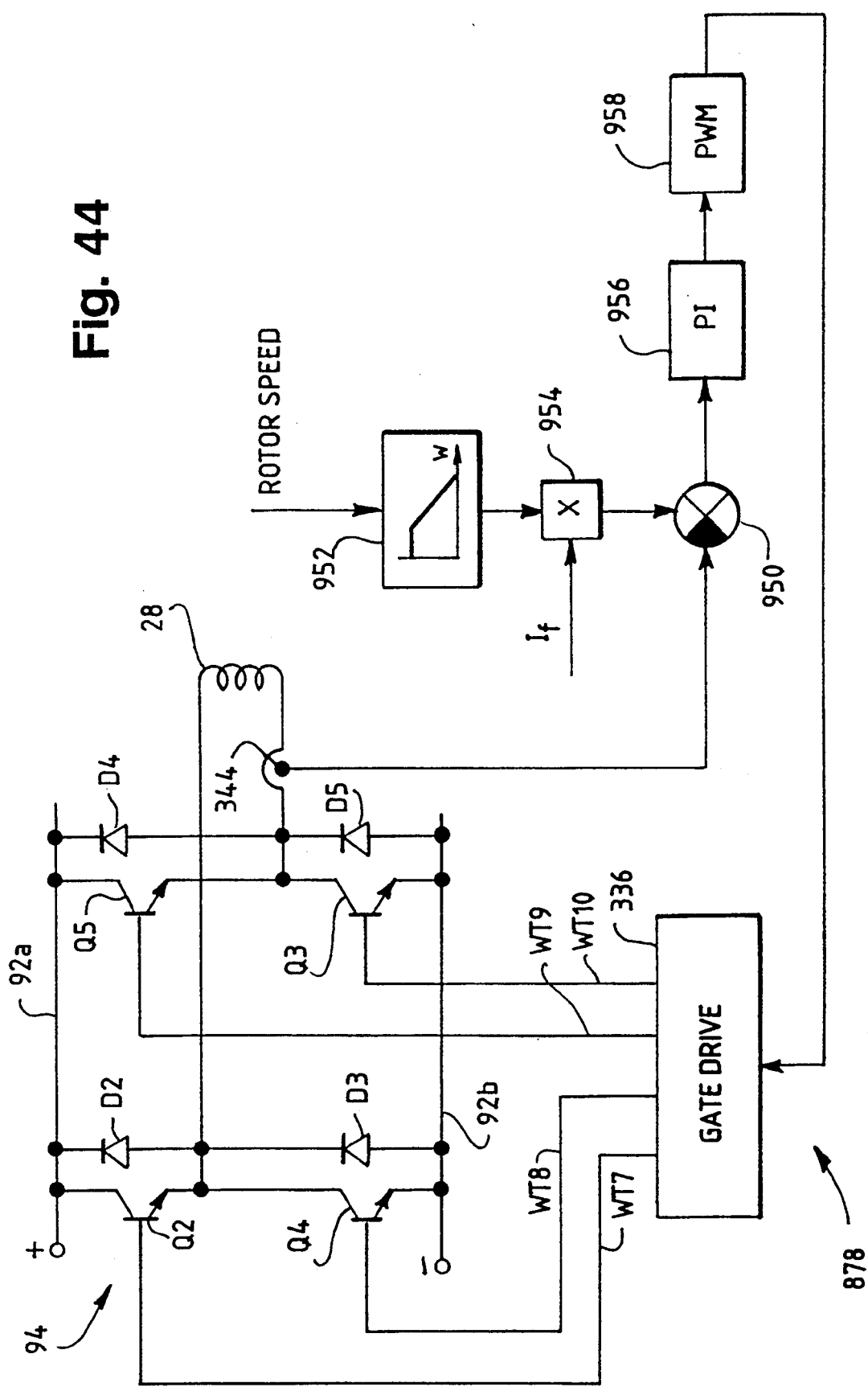
FIG. 44 comprises a combined block and schematic diagram of the exciter field control of FIG. 38.

Referring now to FIG. 44, the exciter field control 878 and the exciter field winding 28 are shown. The current sensor 344 described above in connection with FIG. 7 develops the exciter field current signal which is provided to an inverting input of a summer 950. The noninverting input of the summer 950 is provided with a field current command signal generated as a function of rotor speed. In particular, the rotor speed signal developed by the rotor position detector 872 is delivered to a function generator 952 which generates a modified speed signal having a relatively constant magnitude below a predetermined rotor speed and a magnitude that decreases at higher rotor speeds in order to produce exciter field weakening at higher rotor speeds. A multiplier 954 multiplies the modified rotor speed signal by a predetermined field current command to produce a signal indicative of the desired exciter field current which is provided to the noninverting input of the summer 950. The summer 950 subtracts the exciter field current signal from the output of the multiplier 954 to provide an exciter field winding current error signal which is delivered to a conditioner 956, preferably comprising a proportional-integral type compensator. The conditioner 956 produces a field current control signal which is provided to a pulse-width modulator 958 which provides a pulse-width modulated signal to the gate driver 336 described above in connection with FIG. 7. The gate driver 336 produces inverter control signals WT7–WT10 which control the power switches Q2–Q5, respectively, to provide a fixed-frequency, variable amplitude current through the exciter field winding 28.

In operation, the exciter field control 878 reduces the amplitude of the exciter field current at higher rotor speeds in order to maintain motor efficiency and to reduce back EMF voltages developed in the generator armature windings 36a–36c which can limit the torque producing capability of the generator 10 at high rotor speeds. In this manner, the inverter 94 produces an AC current which flows through the exciter field winding 28 and is dependent upon the rotor speed in order to control the power delivered to the prime mover 21.

During initial start-up of the prime mover 21, the rotor position detector 872 detects the rotor speed (via output of phase detector 898 of FIG. 39), rotor position (via output of divider 904) and the direction of rotor rotation (via output of logic unit 894), wherein the direction is determined by the phase relationship between phase voltages developed across the armature windings 36a–36c.

If the prime mover 21 is windmilling in the negative direction, and the rotational speed of the rotor is greater than a predetermined first level, the armature windings 36a–36c are shorted by the inverter and a braking mode of operation is initiated. During the braking mode, the exciter inverter 94 supplies current to the field winding 28, which in turn energizes the main field winding 34 on the rotor 20. Simultaneously, the main armature windings 36a–36c are all connected to a single one of the DC link conductors 92a and 92b by closing the switches T1, T3 and T5 and opening the switches T2, T4 and T6, or vice versa. This provides the necessary braking effect and slows the rotational speed of the rotor 20 to the predetermined first level.

Inasmuch as the three windings 36a–36c are all connected to the same DC potential at this time, the detector 872 is unable to develop the speed information. In order to obtain this information in the braking mode, all of the switches are intermittently opened to allow the speed information to be developed so that a determination can be made as to when to end the braking mode. The commutator 884 or the current regulator 886 can be modified in a straightforward manner to accomplish this function, as should be evident to one of ordinary skill in the art given the disclosure herein. For example, first inputs of OR gates may be connected to the outputs of the zero crossing detectors 922, 924, 926 or 936, 938, 940 and second inputs of the OR gates may be connected to a controller which supplies a signal switching between zero and one states during operation in the braking mode. The controller is, in turn, responsive to the rotor position detector 872 which detects when the speed of the prime mover exceeds a certain speed in the negative direction.

When the rotor position detector 872 senses that the rotor speed is less than the predetermined first level, the plugging mode is initiated. During the plugging mode, which can also be entered at the initial start-up if the prime mover 21 is windmilling at a speed less than the predetermined first speed, the inverter 50 is connected to the armature windings 36a–36c and provides current thereto to force the rotor 20 to slow to substantially zero speed. At that time, the motoring mode is initiated in order to drive the prime mover 21 up to a self-sustaining speed in the direction necessary for starting the prime mover 21. 10 As noted previously, at the beginning of the plugging and motoring modes, the speed command signal on the line 650 of FIG. 41 is provided to the summer 652 and the rotor speed reference is developed at the output of the integrator 658 of FIG. 41.

When the rotor 20 reaches a speed equal to the valid speed reference, the controllable switch 730 switches to provide the rotor position signal produced by the rotor position detector 872 to the summer 910, which causes the system control 870 to operate in a closed loop mode. This mode of operation continues until the prime mover 21 reaches the self-sustaining speed, at which time start-up of the prime mover 21 has been accomplished.

Figure 45:
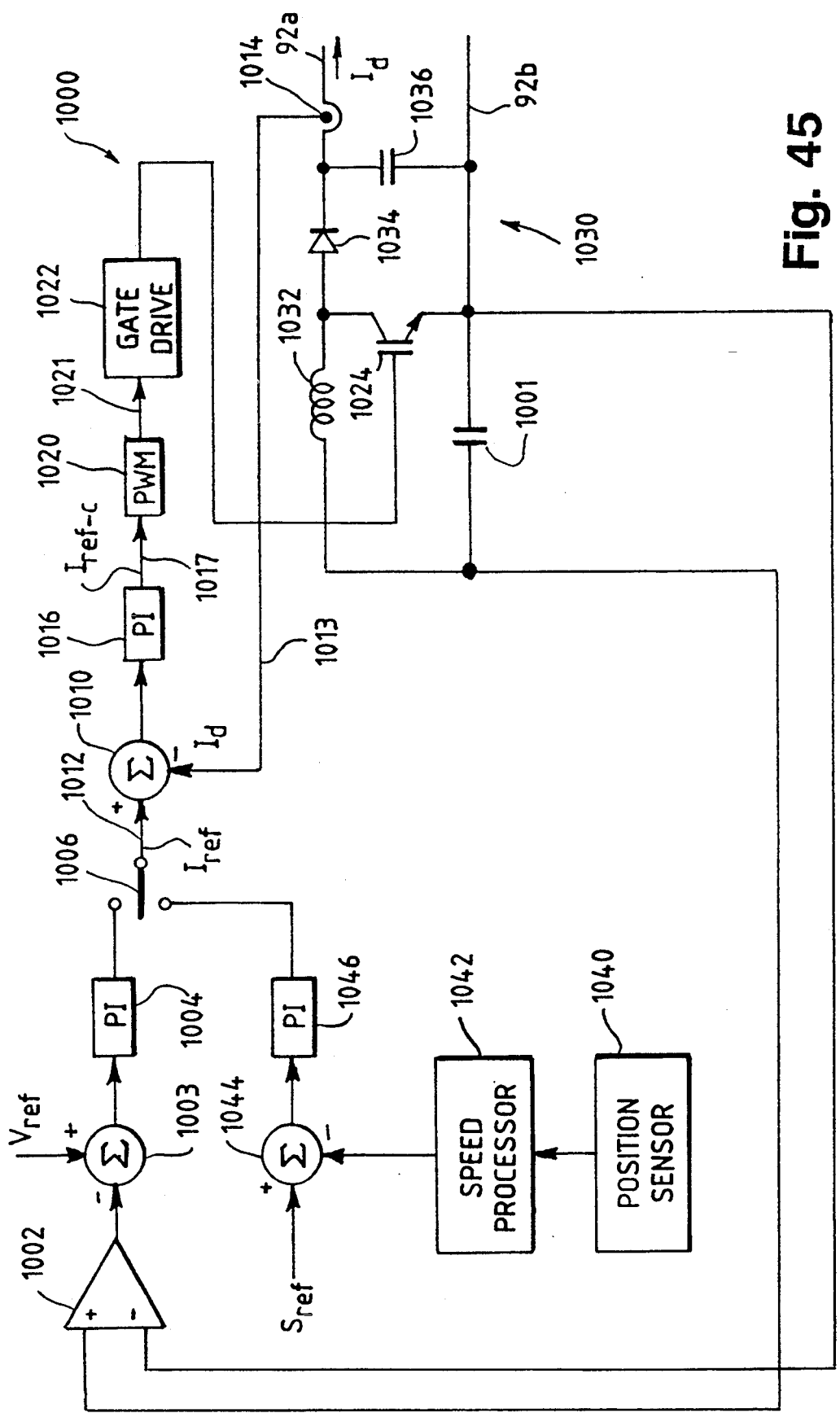
FIG. 45 comprises a combined block and schematic diagram of circuitry for controlling the voltage developed on the DC link.

FIG. 45 illustrates a DC link controller 1000 which is capable of controlling the voltage on the DC link 92 during operation in the starting and generating modes. Specifically, during the starting mode of operation, the controller 1000 converts DC power provided by either a battery 1001 or any other power source into a variable controlled voltage which is provided to the DC link 92. The battery 1001 would typically be used when a DC power source is not present or unavailable, such as during an in-air start. The controller 1000 causes an optimum magnitude of DC link current to be provided by the battery 1001 when the battery is used during the starting mode. As is known, the voltage supplied by a battery drops as more current is drawn from the battery. The optimum DC link current magnitude provided by this embodiment of the controller 1000 is that amount of current which causes the loaded battery voltage to drop to one-half of its rated (unloaded) voltage. Alternatively, due to design constraints, a voltage reference $V_{ref}$ representing the commanded loaded battery voltage can be selected to be a different fixed percentage of the rated battery voltage.

As seen in FIG. 45, the inverter controller 1000 includes a difference amplifier 1002 which receives the terminal voltages of the battery 1001. The output developed by the difference amplifier is subtracted from the voltage reference $V_{ref}$ by a summer 1003 to develop a difference signal representing the difference between the reference voltage $V_{ref}$ and the loaded battery voltage. The difference signal is amplified by a proportional-only (P) or proportional-integral (PI) amplifier 1004, and then is provided to a first terminal of a switch 1006 as a current reference signal $I_{ref}$.

The reference current $I_{ref}$ is provided to one input of a summer or difference amplifier 1010 over a line 1012. The other input of the summer 1010 is provided by a line 1013 with a sensed current signal $I_{dcs}$ representing the magnitude of the DC link current as sensed by a sensor 1014. The summer 1010 generates a signal representing the difference between the sensed DC link current and the current reference $I_{ref}$, and the resulting difference signal is amplified by a PI amplifier 1016 and provided over a line 1017 to a pulse-width modulator (PWM) 1020. The PWM 1020 generates a variable duty cycle signal which is provided by a line 1021 to a gate drive circuit 1022 connected to the base of a transistor 1024 of a DC/DC converter 1030.

When the battery 1001 is utilized during starting, the DC/DC converter 1030 is connected to the battery 1001. The DC/DC converter 1030 includes an inductor 1032, a diode 1034 and a capacitor 1036 coupled across the terminals of the battery 1001. The transistor 1024 is selectively switched by the gate drive signal generated by the circuit 1022 to provide the desired amount of DC link current $I_{dcs}$.

In operation, if the loaded battery voltage is greater than the reference voltage $V_{ref}$, meaning that the battery can supply more current, the current reference $I_{ref}$ is increased. Similarly, if the loaded battery voltage is less than $V_{ref}$, the current reference $I_{ref}$ is decreased. The amount of DC link current is then controlled to substantially match the reference current $I_{ref}$ by controlling the amount of time the transistor 1024 is switched on, which is determined by the variable duty cycle signal generated by the PWM 1020.

The controller 1000 optionally includes a position sensor 1040 which is used when the generator 10 is started from power supplied from a DC power source instead of the battery 1001, in which case the DC link current may be controlled based upon a speed reference signal $S_{ref}$ representing the rotational speed of the rotor 20. In accordance with that alternative, a sensed speed signal generated by a speed processor 1042 is compared with the speed reference signal $S_{ref}$ by a summer or difference amplifier 1044, which generates a signal representing the difference between the speed reference signal and the sensed speed signal. That difference signal is provided to a PI (or P) amplifier 1046, which generates an alternative current reference signal $I_{ref}$ at a second terminal of the switch 1006. The control of the DC link current based upon the alternative current reference signal is similar to that described above in connection with the battery current reference signal.

Figure 46:
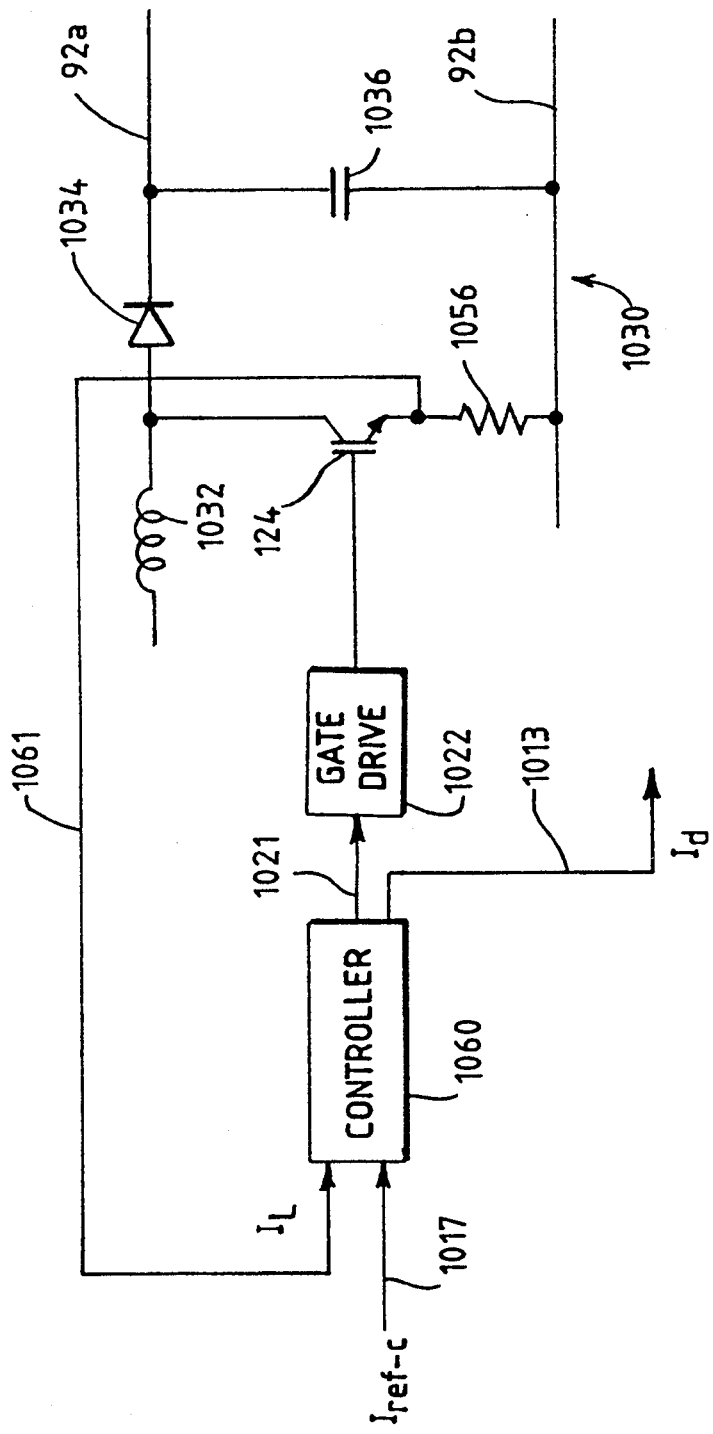
FIG. 46 comprises a combined block and schematic diagram of an alternative embodiment of a circuit for controlling the voltage on the DC link.

A portion of a second embodiment of the controller 1000 is shown in FIG. 46. The embodiment of FIG. 46 is somewhat similar to that of FIG. 45, except that the DC link current $I_d$ is generated based on the average inductor current $I_L$ which is sensed by a resistor 1056. A controller 1060 is responsive to the magnitude of a signal $I_{ref-c}$ generated on the line 1017 and an inductor current signal $I_L$ on a line 1061 and provides a variable duty cycle signal to the gate drive circuit 1022 to controllably switch the transistor 1024. The controller 1060 also generates the DC link current signal $I_{dcs}$ on the line 1013.

Figure 47:
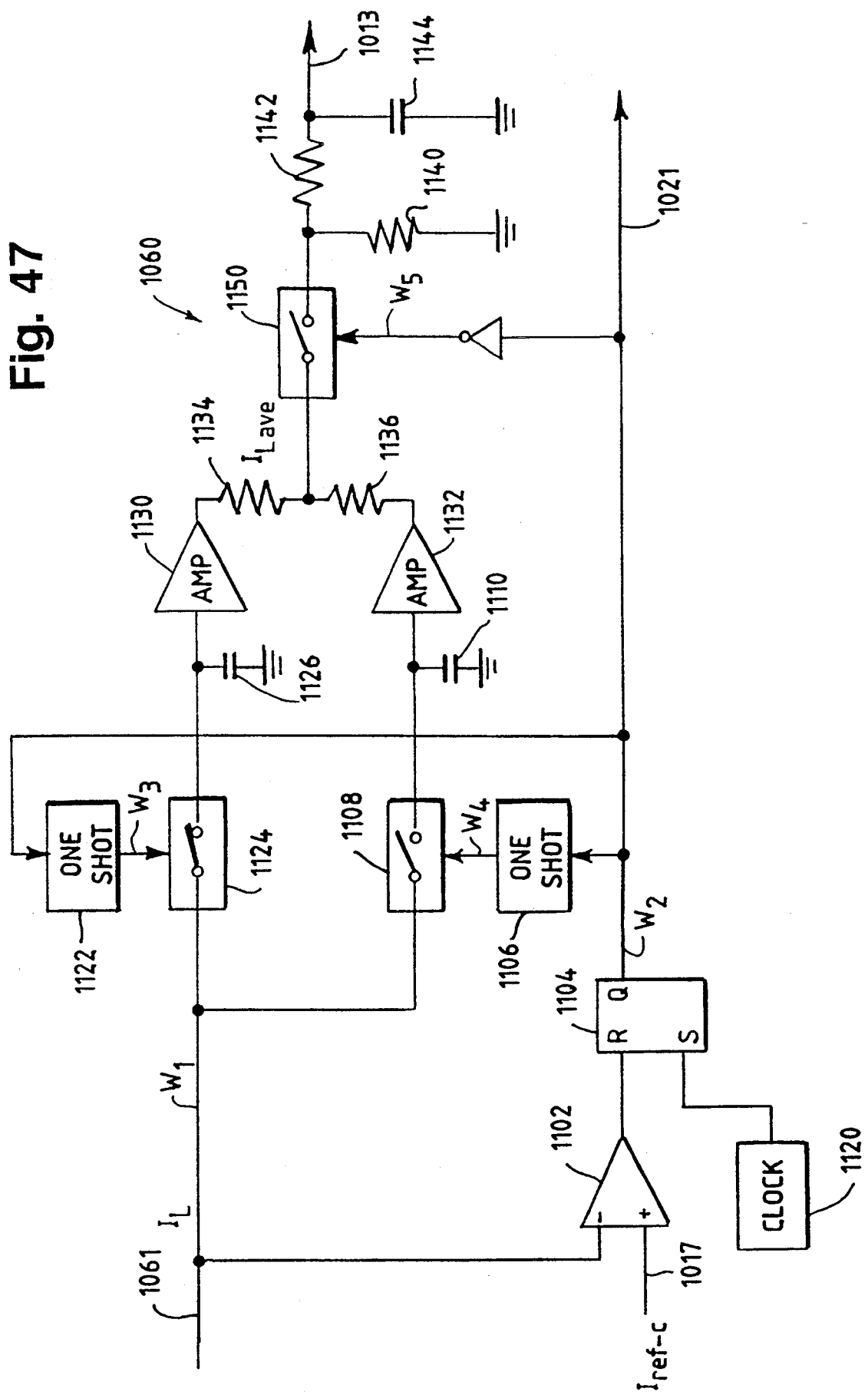
FIG. 47 comprises a combined block and schematic diagram of the controller of FIG. 46.
Figure 48:
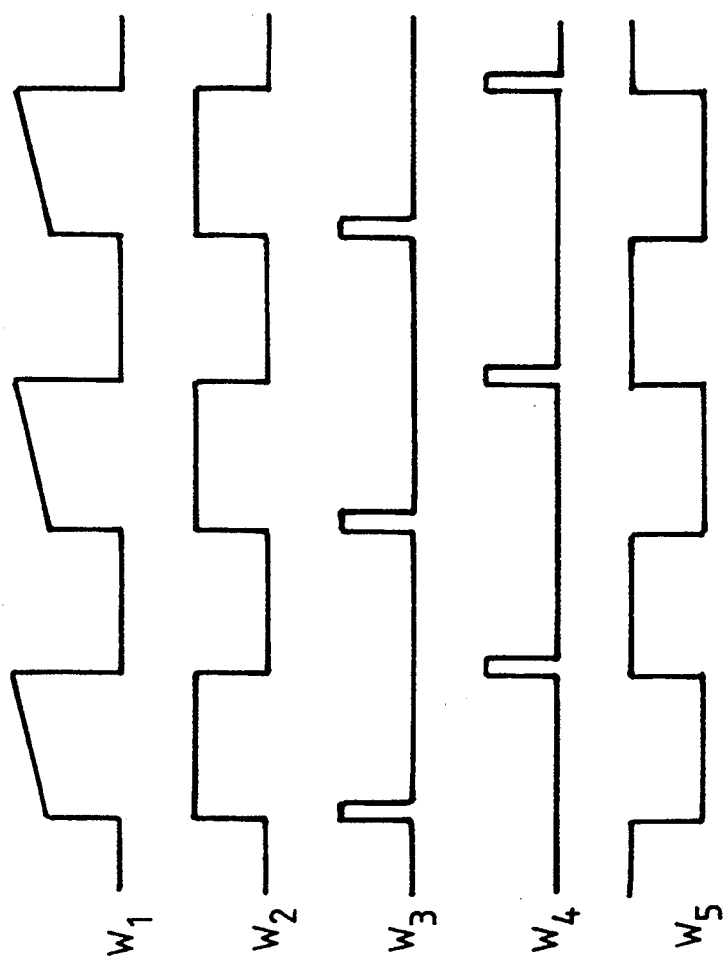
FIG. 48 comprises a set of waveform diagrams illustrating the operation of the control of FIG. 47.

A circuit diagram of the controller 1060 is shown in FIG. 47, and a number of waveforms generated during the operation of the circuit of FIG. 47 are shown in FIG. 48. Referring to FIG. 47, the controller 1060 includes a comparator 1102 which compares a signal representative of the sensed current $I_L$ via the line 1061 and compares it to the reference current signal $I_{ref-c}$. The signal on the line 1061 has a shape corresponding to that of waveform $W_1$ of FIG. 48. When the magnitude of the $I_L$ signal becomes as large as the magnitude of the $I_{ref-c}$ signal, the output of the comparator 1102 causes an SR flip-flop 1104 to change state from a high level to a low level. The output of the SR flip-flop 1104, which is illustrated in FIG. 48 as waveform $W_2$, is connected to the line 1021 which controls the gate drive circuit 1022 (FIG. 46) which turns the transistor 1024 on and off. Each time the transistor 1024 is turned off, the magnitude of the signal on the line 1061 becomes zero since there is no current through the transistor 1024 and thus no voltage across the resistor 1056.

The output of the SR flip-flop 1104 is provided to a falling-edge-triggered one-shot 1106, which generates an output signal the shape of which is illustrated in FIG. 48 as waveform $W_4$. Each time the waveform $W_2$ falls to zero, the one-shot 1106 generates a short pulse which closes a switch 1108, causing a signal representing the largest or peak magnitude of the inductor current $I_L$ to be stored in a sample-and-hold capacitor 1110.

A clock 1120 connected to the set input of the SR flip-flop 1104 periodically causes the output waveform $W_2$ of the flip-flop 1104 to change state again by rising to a relatively high level. As a result, the transistor 1024 is turned back on and a rising-edge-triggered one-shot 1122 generates a short pulse which closes a switch 1124, causing a signal representing the smallest magnitude of the inductor current $I_L$ to be stored in a sample-and-hold capacitor 1126. In operation, each of the sample-and-hold capacitors 1110, 1126 alternately stores a signal representing the largest and smallest values, respectively, of the inductor current. A signal $I_{Lave}$ representing the average value of those two periodically stored values is generated by an amplifier circuit comprising two amplifiers 1130, 1132 and two resistors 1134, 1136.

The current signal $I_d$ provided on the line 1013 is generated from the average inductor current signal $I_{Lave}$ by a filter circuit comprising a pair of resistors 1140, 1142 and a capacitor 1144. An optional switch 1150 may be used to connect the averaging circuit to the filter circuit only during certain times, such as when the transistor 1024 is off.

Figures 49, 50:
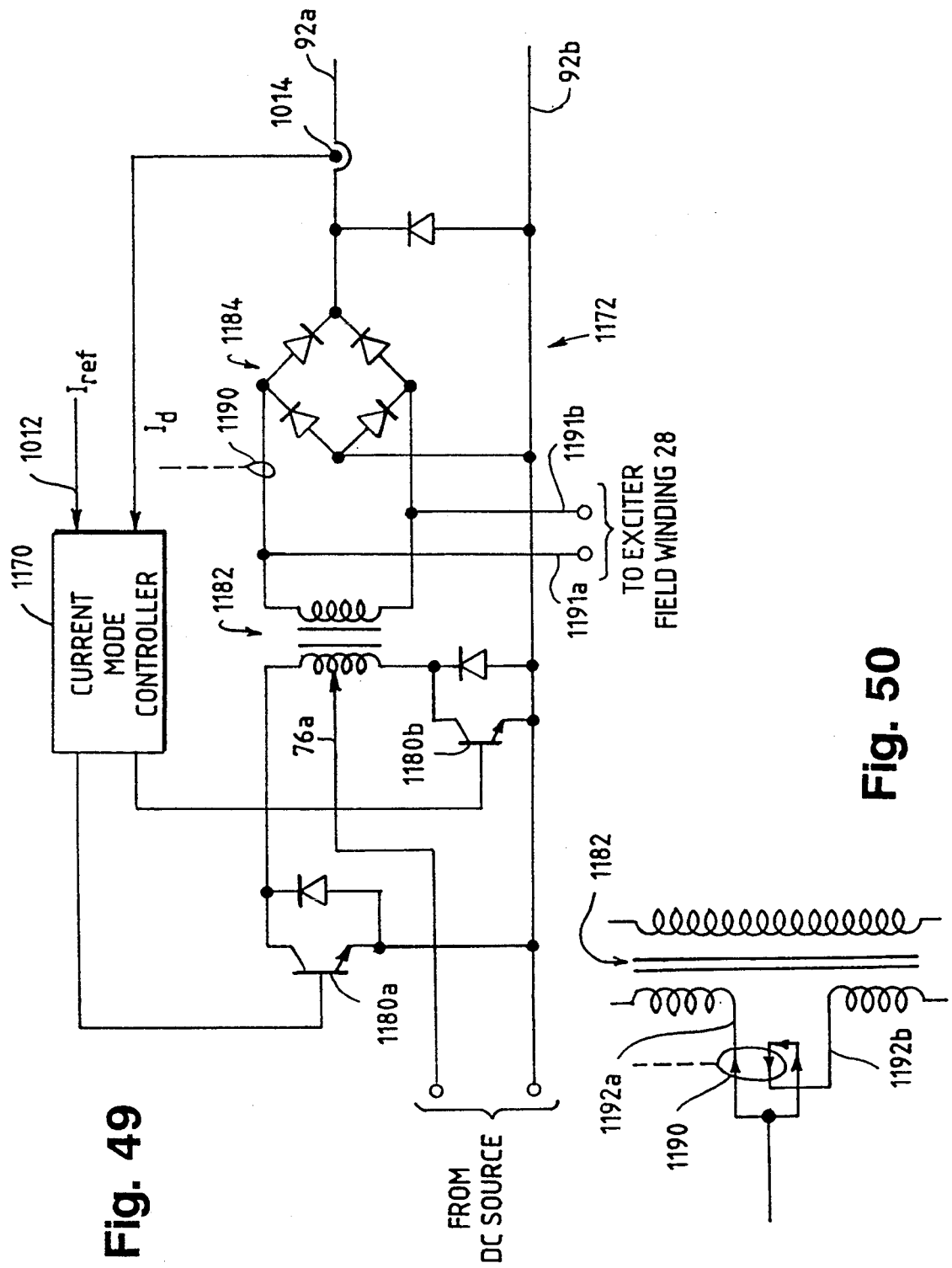
FIG. 49 comprises a combined and schematic block diagram of yet another embodiment of a circuit for controlling the voltage on the DC link.
FIG. 50 comprises a schematic diagram illustrating modifications to the control of FIG. 49 to implement still another embodiment.

A portion of another embodiment of the inverter controller 1000 is shown in FIG. 49. In that embodiment, a current mode controller 1170 controls the magnitude of the DC link current based upon the relative magnitudes of the current reference signal $I_{ref}$ on the line 1012 and the sensed current signal $I_d$ generated by the current sensor 1014. The controller 1170 is connected to a DC/DC converter 1172 which includes a pair of switching transistors 1180a, 1180b coupled to a transformer 1182 having a primary winding connected to the battery 1001 or other power source and a secondary winding connected to a diode circuit 1184.

The current mode controller 1170 operates by controlling the duty cycle of the transistors 1180a, 1180b so that the DC link current $I_d$ is controlled to the magnitude of the current reference $I_{ref}$. The current mode controller 1170 could be either a PWM or a hysteresis controller the operation of which is described above. AC current may be supplied from the DC/DC converter 1172 to the exciter field winding 28. Alternatively, power may be supplied to the exciter field winding 28 via lines 1191a, 1191b.

Instead of sensing the magnitude of the DC link current directly with the DC current sensor 1014, a current transformer may be used since current transformers, which detect AC current, are generally less expensive than DC current sensors. A conventional current transformer 1190 is schematically shown in FIG. 49 connected to sense the AC current generated by the secondary winding of the transformer 1182 and generates a signal representative of the DC link current based upon the sensed AC current. Alternatively, as shown in FIG. 50, the current transformer 1190 may be coupled to sense the AC current through a pair of lines 1192a, 1192b coupled to the primary winding of the transformer 1182, with the direction of the current in the lines 1192a, 1192b being indicated by the arrows. Instead of using the DC current sensor 1014 in the embodiment of FIG. 45, a current transformer could be used by connecting it to sense the AC current generated in the DC/DC converter 1030.

It should be noted that the various features and embodiments disclosed herein may be combined in various ways to obtain controls of varying capabilities. For example, the control of FIGS. 2A and 2B or the control of FIG. 5 may utilize the back EMF state observer 542 and the angle reconstruction unit 544 shown in FIGS. 17-22 or the rotor position detector 704 of FIG. 25 to provide an indication of rotor position to the components thereof or may utilize any other suitable rotor position detector. Also, the output of the APU controller of FIG. 2A may be supplied to the summer 262 of FIG. 5 so that the prime mover of FIG. 5 is accelerated according to the schedule of FIG. 4. Still further, the excitation controls of FIGS. 7, 37 or 44 may be used with the control of FIGS. 2A and 2B or the control of FIG. 5. In the former case, the elements 56, 58, 60, 130, 134 and 138 of FIGS. 2A and 2B would not be used and a field component command of appropriate magnitude would be provided to the summer 62. In each case, the excitation inverter 94 would be controlled by the control of FIG. 7, 37 or 44.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for operating an electromagnetic machine in a starting mode of operation wherein the electromagnetic machine includes a motive power shaft coupled to a rotor, a permanent magnet generator (PMG) having a set of armature phase windings at which a set of PMG phase outputs are produced and a main generator portion having a main armature winding, wherein the main armature winding receives electrical power from a controllable power source during the starting mode of operation, comprising:

means for detecting a magnitude of a parameter of power applied to the main armature winding relative to a stationary frame of reference;

a position sensor for detecting rotor position of the electromagnetic machine including a shaft pulse encoder which develops a cycle pulse once per revolution of the motive power shaft, means coupled to the PMG armature phase windings for deriving a number of interval pulses per revolution of the motive power shaft from the PMG phase outputs, means coupled to the developing means for measuring time periods between adjacent interval pulses and means coupled to the measuring means and responsive to the cycle pulse for transforming the measured time periods into an indication of the angular position of the motive power shaft;

a converter coupled to the position sensor and responsive to the angular position indication for converting the detected parameter magnitude into field and torque producing components relative to a rotating frame of reference; and means coupled between the converter and the power source and responsive to the field and torque producing components for controlling the power source during operation in the starting mode such that the rotor is rotated.

2. The control of claim 1, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate which is less than said first predetermined rate, means operable during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

3. A control for operating an electromagnetic machine in a starting mode of operation wherein the electromagnetic machine includes a motive power shaft coupled to a rotor and a main generator portion having a set of main armature windings, wherein the set of main armature windings receives AC power from a controllable power source and developing a back EMF voltage during the starting mode of operation, comprising:

means for detecting a magnitude of a parameter of power applied to the set of main armature windings relative to a stationary frame of reference;

a position sensor for detecting rotor position of the electromagnetic machine including means coupled to the set of main armature windings and responding to the AC power for producing a back EMF estimate signal representing an estimate of the back EMF voltage and means for transforming the back EMF estimate signal into an indication of angular position of the motive power shaft;

a converter coupled to the position sensor and responsive to the angular position indication for converting the detected parameter magnitude into field and torque producing components relative to a rotating frame of reference; and means coupled between the converter and the power source and responsive to the field and torque producing components for controlling the power source during operation in the starting mode such that the rotor is rotated.

4. The control of claim 3, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate which is less than said first predetermined rate, means operable during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

5. A control for operating an electromagnetic machine in a starting mode of operation wherein the electromagnetic machine includes a motive power shaft coupled to a rotor, a permanent magnet generator (PMG) having a set of PMG armature phase windings disposed in a stator of the electromagnetic machine and at which a set of PMG phase outputs are produced, an exciter having an exciter field winding disposed in the stator and an exciter armature winding disposed on the rotor and a main generator portion having a main field winding disposed on the rotor and coupled to the exciter armature winding and a main armature winding disposed in the stator, wherein the main armature winding and the exciter field winding receive electrical power from first and second controllable power sources, respectively, during the starting mode of operation, comprising:

means for detecting a magnitude of a parameter of power applied to the main armature winding relative to a stationary frame of reference;

a converter responsive to the detecting means for converting the detected parameter magnitude into field and torque producing components relative to a rotating frame of reference;

first means coupled between the converter and the first controllable power source and responsive to the field and torque producing components for controlling the first controllable power source during operation in the starting mode such that the first power source provides a first AC waveform at a first frequency to the main generator portion armature winding; and second means for controlling the second power source during operation in the starting mode such that the second power source provides a second AC waveform at a second frequency to the exciter field winding at the beginning of a start sequence and such that the second AC waveform changes to a third frequency less than the second frequency after the beginning of the start sequence.

6. The control of claim 5, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate which is less than said first predetermined rate, means operable during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

7. A control for operating an electromagnetic machine in a starting mode of operation wherein the electromagnetic machine includes a motive power shaft coupled to a rotor, a permanent magnet generator (PMG) having a set of PMG-armature phase windings disposed in a stator of the electromagnetic machine and at which a set of PMG phase outputs are produced, an exciter having an exciter field winding disposed in the stator and an exciter armature Winding disposed on the rotor and a main generator portion having a main field winding disposed on the rotor and coupled to the exciter armature winding and a main armature winding disposed in the stator, wherein the main armature winding and the exciter field winding receive electrical power from first and second controllable power sources, respectively, during the starting mode of operation, comprising:

means for detecting a magnitude of a parameter of power applied to the main armature winding relative to a stationary frame of reference;

a converter responsive to the detecting means for converting the detected parameter magnitude into field and torque producing components relative to a rotating frame of reference;

first means coupled between the converter and the first controllable power source and responsive to the field and torque producing components for controlling the first controllable power source during operation in the starting mode such that the first power source provides AC power to the main generator portion armature winding; and second means for controlling the second power source during operation in the starting mode such that the second power source provides AC and DC power simultaneously to the exciter field winding during operation in the starting mode.

8. The control of claim 7, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate, means operable during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

9. A control for operating an electromagnetic machine in a starting mode of operation wherein the electromagnetic machine includes a motive power shaft coupled to a rotor, a permanent magnet generator (PMG) having a set of armature phase windings at which a set of PMG phase outputs are produced and a main generator portion having a main armature winding, wherein the main armature winding receives electrical power from a controllable power source during the starting mode of operation, comprising:

means for detecting a magnitude of a parameter of power applied to the main armature winding relative to a stationary frame of reference;

a position sensor for detecting rotor position of the electromagnetic machine including a shaft pulse encoder which develops a cycle pulse once per revolution of the motive power shaft, means coupled to the PMG armature phase windings for deriving a number of interval pulses per revolution of the motive power shaft from the PMG phase outputs, means coupled to the developing means for measuring time periods between adjacent interval pulses and means coupled to the measuring means and responsive to the cycle pulse for transforming the measured time periods into an indication of the angular position of the motive power shaft;

a converter coupled to the position sensor and responsive to the angular position indication for converting the detected parameter magnitude into field and torque producing components relative to a rotating frame of reference;

means coupled to the converter for obtaining field and torque producing commands from the field and torque producing components; and means operable during the starting mode for controlling the power source in accordance with the field producing command during a first period of time and in accordance with the torque producing command during a second period of time exclusive of the first period of time such that the rotor is rotated.

10. The control of claim 9, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate which is less than said first predetermined rate, means operable during said second phase for providing fuel to the prime mover to facilitate ignition thereof and third means operable during a third phase Subsequent to the ignition of the prime mover for causing the electromagnetic machine to provide motive power to the prime mover so as to accelerate the prime mover at a third predetermined rate.

11. A control for operating an electromagnetic machine in a starting mode of operation wherein the electromagnetic machine includes a motive power shaft coupled to a rotor and a main generator portion having a set of main armature windings, wherein the set of main armature windings receives AC power from a controllable power source and developing a back EMF voltage during the starting mode of operation, comprising:

means for detecting a magnitude of a parameter of power applied to the set of main armature windings relative to a stationary frame of reference;

a position sensor for detecting rotor position of the electromagnetic machine including means coupled to the set of main armature windings and responding to the AC power for producing a back EMF estimate signal representing an estimate of the back EMF voltage and means for transforming the back EMF estimate signal into an indication of angular position of the motive power shaft;

a converter coupled to the position sensor and responsive to the angular position indication for converting the detected parameter magnitude into field and torque producing components relative to a rotating frame of reference;

means coupled to the converter for obtaining field and torque producing commands from the field and torque producing components; and means operable during the starting mode for controlling the power source in accordance with the field producing command during a first period of time and in accordance with the torque producing command during a second period of time exclusive of the first period of time such that the rotor is rotated.

12. The control of claim 11, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate which is less than said first predetermined rate, means operable-during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

13. A control for operating an electromagnetic machine in a starting mode of operation wherein the electromagnetic machine includes a motive power shaft coupled to a rotor, a permanent magnet generator (PMG) having a set of PMG armature phase windings disposed in a stator of the electromagnetic machine and at which a set of PMG phase outputs are produced, an exciter having an exciter field winding disposed in the stator and an exciter armature winding disposed on the rotor and a main generator portion having a main field winding disposed on the rotor and coupled to the exciter armature winding and a main armature winding disposed in the stator, wherein the main armature winding and the exciter field winding receive electrical power from first and second controllable power sources, respectively, during the starting mode of operation, comprising:

means for detecting a magnitude of a parameter of power applied to the main armature winding relative to a stationary frame of reference;

a converter responsive to the detecting means for converting the detected parameter magnitude into field and torque producing components relative to a rotating frame of reference;

means coupled to the converter for obtaining field and torque producing commands from the field and torque producing components;

means operable during the starting mode for controlling the first controllable power source in accordance with the field producing command during a first period of time and in accordance with the torque producing command during a second period of time exclusive of the first period of time such that the first power source provides a first AC waveform at a first frequency to the main generator portion armature winding; and second means for controlling the second power source during operation in the starting mode such that the second power source provides a second AC waveform at a second frequency to the exciter field winding at the beginning of a start sequence and such that the second AC waveform changes to a third frequency less than the second frequency after the beginning of the start sequence.

14. The control of claim 13, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate which is less than said first predetermined rate, means operable during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

15. A control for operating an electromagnetic machine in a starting mode of operation wherein the electromagnetic machine includes a motive power shaft coupled to a rotor, a permanent magnet generator (PMG) having a set of PMG armature phase windings disposed in a stator of the electromagnetic machine and at which a set of PMG phase outputs are produced, an exciter having an exciter field winding disposed in the stator and an exciter armature winding disposed on the rotor and a main generator portion having a main field winding disposed on the rotor and coupled to the exciter armature winding and a main armature winding disposed in the stator, wherein the main armature winding and the exciter field winding receive electrical power from first and second controllable power sources, respectively, during the starting mode of operation, comprising:

means for detecting a magnitude of a parameter of power applied to the main armature winding relative to a stationary frame of reference;

a converter responsive to the detecting means for converting the detected parameter magnitude into field and torque producing components relative to a rotating frame of reference;

means coupled to the converter for obtaining field and torque producing commands from the field and torque producing components;

means operable during the starting mode for controlling the first controllable power source in accordance with the field producing command during a first period of time and in accordance with the torque producing command during a second period of time exclusive of the first period of time such that the first power source provides AC power to the main generator portion armature winding; and second-means for controlling the second power source during operation in the starting mode such that the second power source provides AC and DC power simultaneously to the exciter field winding during operation in the starting mode.

16. The control of claim 15, wherein the control includes means for igniting a prime mover and the electromagnetic machine is operated to bring the prime mover up to self-sustaining speed and further including first means operable during a first phase prior to ignition of the prime mover for causing the electromagnetic machine to provide motive power to the prime mover so as to accelerate the prime mover at a first predetermined rate, second means operable during a second phase subsequent to said first phase for causing the electromagnetic machine to provide motive power to the prime mover so as to accelerate the prime mover at a second predetermined rate, means operable during said second phase for providing fuel to the prime mover to facilitate ignition thereof and third means operable during a third phase subsequent to the ignition of the prime mover for causing the electromagnetic machine to provide motive power to the prime mover so as to accelerate the prime mover at a third predetermined rate.

17. A starting system control for controlling an electromagnetic machine having a rotor and a set of main armature windings to start a prime mover which is connected to the electromagnetic machine by a motive power shaft, comprising:

means for sensing a terminal voltage of the electromagnetic machine to determine a back EMF voltage induced within one of the armature windings;

means coupled to the sensing means for developing an indication of rotor speed and an indication of rotor position in accordance with the back EMF voltage;

means for determining the direction of rotation of the motive power shaft;

means responsive to the indications of the rotor speed and the rotor position and further responsive to the determined direction of rotation of the motive power shaft for operating the electromagnetic machine in one of a plurality of operating modes including a braking mode, a plugging mode and a motoring mode to bring the prime mover up to a self-sustaining speed;

first means operable during a first phase of the motoring mode prior to ignition of the prime mover for causing the electromagnetic machine to provide motive power to the prime mover so as to accelerate the prime mover at a first predetermined rate;

second means operable during a second phase of the motoring mode subsequent to said first phase for causing the electromagnetic machine to provide motive power to the prime mover so as to accelerate the prime mover at a second predetermined rate which is less than said first predetermined rate;

means operable during said second phase of the motoring mode for providing fuel to the prime mover to facilitate ignition thereof; and third means operable during a third phase of the motoring mode subsequent to the ignition of the prime mover for causing the electromagnetic machine to provide motive power to the prime mover so as to accelerate the prime mover at a third predetermined rate.

18. A control for operating an electromagnetic machine as a motor wherein the electromagnetic machine includes a rotatable rotor and a set of armature phase windings each of which has a reluctance associated therewith and develops back EMF when the machine is operated as a motor, comprising:

first sensing means for sensing the reluctance associated with the armature windings;

second sensing means for sensing the back EMF developed by the armature windings;

third sensing means responsive to the first and second sensing means for sensing rotor position based upon the sensed reluctance when the machine rotor is rotating below a certain speed and based upon the sensed back EMF when the machine rotor is rotating above the certain speed; and controlling means for controlling electrical power applied to the armature windings in dependence upon the sensed rotor position.

19. The control of claim 18, wherein the control includes means for igniting a prime mover and the electromagnetic machine is operated to bring the prime mover up to self-sustaining speed and further including first causing means operable during a first phase prior to ignition of the prime mover for causing the electromagnetic machine to provide motive power to the prime mover so as to accelerate the prime mover at a first predetermined rate, second causing means operable during a second phase subsequent to said first phase for causing the electromagnetic machine to provide motive power to the prime mover so as to accelerate the prime mover at a second predetermined rate which is less than said first predetermined rate, providing means operable during said second phase for providing fuel to the prime mover to facilitate ignition thereof and third causing means operable during a third phase subsequent to the ignition of the prime mover for causing the electromagnetic machine to provide motive power to the prime mover so as to accelerate the prime mover at a third predetermined rate.

20. The control of claim 18, wherein the electrical power is developed by a controllable power source comprising an inverter, a DC link connected to said inverter, said DC link providing a DC link current to said inverter during the starting mode of operation and a controller coupled to said DC link for controlling the magnitude of the DC link current provided to said inverter by said DC link.

* * * * *